( 12 ) United States Patent
Uchida et al.

(10) Patent No.: US 12,039,704 B2
(45) Date of Patent: Jul. 16, 2024

(54) IMAGE PROCESSING APPARATUS, IMAGE PROCESSING METHOD AND COMPUTER-READABLE MEDIUM

(71) Applicant: CANON KABUSHIKI KAISHA, Tokyo (JP)

(72) Inventors: Hiroki Uchida, Tokyo (JP); Yoshihiko Iwase, Kanagawa (JP); Osamu Sagano, Tokyo (JP); Ritsuya Tomita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 271 days.

(21) Appl. No.: 17/182,402

(22) Filed: Feb. 23, 2021

(65) Prior Publication Data

US 2021/0183019 A1 Jun. 17, 2021

Related U.S. Application Data

(63) Continuation of application No. PCT/JP2019/023650, filed on Jun. 14, 2019.

(30) Foreign Application Priority Data

Sep. 6, 2018 (JP) .................................. 2018-166817
Mar. 29, 2019 (JP) .................................. 2019-068663

(51) Int. Cl.
  *G06T 5/70* (2024.01)
  *G06N 3/08* (2023.01)
  (Continued)

(52) U.S. Cl.
  CPC ................. *G06T 5/70* (2024.01); *G06N 3/08* (2013.01); *G06T 5/50* (2013.01); *G06T 5/90* (2024.01);
  (Continued)

(58) Field of Classification Search
  None
  See application file for complete search history.

(56) References Cited

U.S. PATENT DOCUMENTS 5,467,442 A 11/1995 Tsubota et al.
8,870,377 B2 10/2014 Iwase et al.
(Continued)

FOREIGN PATENT DOCUMENTS

CN 102802505 A 11/2012
CN 104080400 A 10/2014
(Continued)

OTHER PUBLICATIONS

Sheet, Debdoot, "Deep learning of tissue specific speckle representations in optical coherence tomography and deeper exploration for in situ histology", 2015 IEEE 12th.*
(Continued)

*Primary Examiner* — Jiangeng Sun
(74) *Attorney, Agent, or Firm* — Carter, DeLuca & Farrell LLP

(57) ABSTRACT

An image processing apparatus includes: an obtaining unit configured to obtain a first image of an eye to be examined; an image quality improving unit configured to generate a second image with at least one of lower noise and higher contrast than the obtained first image using the obtained first image as an input data of a learned model, wherein the learned model has been obtained by using training data including a second image with at least one of lower noise and higher contrast than a first image of an eye to be examined; and a display controlling unit configured to cause the obtained first image and the generated second image to be switched, juxtaposed or superimposed and displayed on a display unit.

11 Claims, 25 Drawing Sheets

(51) Int. Cl.
  *G06T 5/50* (2006.01)
  *G06T 5/90* (2024.01)
(52) U.S. Cl.
  CPC ............... *G06T 2207/20081* (2013.01); *G06T 2207/20084* (2013.01); *G06T 2207/20224* (2013.01); *G06T 2207/30041* (2013.01)

(56) References Cited

U.S. PATENT DOCUMENTS

| | | | |
|---|---|---|---|
| 9,053,536 B2 | 6/2015 | Imamura et al. | |
| 9,149,183 B2 | 10/2015 | Iwase et al. | |
| 9,265,418 B2 | 2/2016 | Iwase | |
| 9,436,994 B2 | 9/2016 | Furukawa et al. | |
| 9,439,562 B2 | 9/2016 | Natsuhori et al. | |
| 9,566,002 B2 | 2/2017 | Nakahara et al. | |
| 9,824,273 B2 | 11/2017 | Iwase et al. | |
| 10,482,326 B2 | 11/2019 | Iwase et al. | |
| 10,529,045 B2 | 1/2020 | Iwase et al. | |
| 10,552,672 B2 | 2/2020 | Iwase et al. | |
| 10,588,505 B2 | 3/2020 | Natsuhori et al. | |
| 10,872,237 B2 | 12/2020 | Iwase et al. | |
| 2002/0097247 A1* | 7/2002 | Ohba | G06T 1/0007 348/E7.087 |
| 2006/0017851 A1* | 1/2006 | Ebihara | H04N 21/4318 348/E9.057 |
| 2006/0026101 A1* | 2/2006 | Ogura | E02F 9/26 705/50 |
| 2007/0182836 A1* | 8/2007 | Chino | H04N 25/00 348/E9.01 |
| 2009/0097728 A1 | 4/2009 | Lee | |
| 2011/0091128 A1 | 4/2011 | Jeon | |
| 2013/0136326 A1 | 5/2013 | Iwase et al. | |
| 2013/0195340 A1* | 8/2013 | Iwase | A61B 3/0025 382/131 |
| 2014/0232899 A1* | 8/2014 | Ootsuki | H04N 23/741 348/222.1 |
| 2016/0063720 A1 | 3/2016 | Han | |
| 2017/0154413 A1 | 6/2017 | Yu et al. | |
| 2017/0252002 A1 | 9/2017 | Mine et al. | |
| 2018/0012359 A1 | 1/2018 | Prentasic et al. | |
| 2018/0018757 A1 | 1/2018 | Suzuki | |
| 2018/0122077 A1* | 5/2018 | Wada | G06T 5/70 |
| 2018/0137605 A1 | 5/2018 | Otsuka et al. | |
| 2018/0144447 A1 | 5/2018 | Tate et al. | |
| 2018/0153395 A1* | 6/2018 | Goto | G01B 9/02091 |
| 2018/0199807 A1 | 7/2018 | Ohta | |
| 2018/0214087 A1 | 8/2018 | Balaji et al. | |
| 2020/0034964 A1* | 1/2020 | Shimamura | G06T 7/20 |
| 2021/0104313 A1 | 4/2021 | Mizobe et al. | |
| 2021/0158525 A1* | 5/2021 | Iwase | A61B 3/0025 |
| 2021/0183019 A1 | 6/2021 | Uchida et al. | |

FOREIGN PATENT DOCUMENTS

| | | | |
|---|---|---|---|
| CN | 104471389 A | | 3/2015 |
| CN | 107157512 A | | 9/2017 |
| JP | H01-170438 A | | 7/1989 |
| JP | 06180569 A | | 6/1994 |
| JP | H06-180569 A | | 6/1994 |
| JP | H11-031214 A | | 2/1999 |
| JP | 2001014444 A | | 1/2001 |
| JP | 2008-119195 A | | 5/2008 |
| JP | 2011-013334 A | | 1/2011 |
| JP | 2011028371 A | * | 2/2011 |
| JP | 2011171843 A | | 9/2011 |
| JP | 2011-200635 A | | 10/2011 |
| JP | 2013090194 A | | 5/2013 |
| JP | 2014002497 A | | 1/2014 |
| JP | 2015129987 A | | 7/2015 |
| JP | 2015171437 A | | 10/2015 |
| JP | 2015198757 A | | 11/2015 |
| JP | 2015198757 A | * | 11/2015 |
| JP | 2017006384 A | * | 1/2017 |
| JP | 2017-047113 A | | 3/2017 |
| JP | 2017-077413 A | | 4/2017 |
| JP | 2017094097 A | | 6/2017 |
| JP | 2017159027 A | | 9/2017 |
| JP | 2017-189608 A | | 10/2017 |
| JP | 2017-221555 A | | 12/2017 |
| JP | 2018005841 A | | 1/2018 |
| JP | 2018007078 A | | 1/2018 |
| JP | 2018033717 A | | 3/2018 |
| JP | 2018055516 A | | 4/2018 |
| JP | 2018068748 A | | 5/2018 |
| JP | 2018077786 A | | 5/2018 |
| JP | 2018084982 A | | 5/2018 |
| JP | 2018089160 A | | 6/2018 |
| JP | 2018114068 A | | 7/2018 |
| JP | 2018-153611 A | | 10/2018 |
| JP | 2019025044 A | | 2/2019 |
| WO | 2009107770 A1 | | 9/2009 |
| WO | 2010050333 A1 | | 5/2010 |
| WO | 2013057932 A1 | | 4/2013 |
| WO | 2017030276 A2 | | 2/2017 |
| WO | 2017143300 A1 | | 8/2017 |
| WO | 2017-155015 A1 | | 9/2017 |
| WO | 2018-069768 A1 | | 4/2018 |
| WO | WO-2019240257 A1 | * | 12/2019 ........... A61B 3/0025 |

OTHER PUBLICATIONS

Notice of Reasons for Refusal issued by the Japan Patent Office on Feb. 1, 2022 in corresponding JP Patent Application No. 2019-068663, with English translation.

Decision of Refusal issued by the Japan Patent Office on Jan. 5, 2023 in corresponding JP Patent Application No. 2019-068663, with English translation.

Notice of Reasons for Refusal issued by the Japan Patent Office on Jul. 26, 2022 in corresponding JP Patent Application No. 2019-068663, with English translation.

International Preliminary Report on Patentability issued on Mar. 9, 2021 by the International Bureau on behalf of the Japan Patent Office acting as International Searching Authority in corresponding International Application No. PCT/JP2019/023650, with English translation.

International Preliminary Report on Patentability issued on Dec. 15, 2020 by the International Bureau on behalf of the Japan Patent Office acting as International Searching Authority in corresponding International Application No. PCT/JP2019/023640, with English translation.

International Search Report issued on Aug. 13, 2019 by the Japan Patent Office acting as International Searching Authority in corresponding International Application No. PCT/JP2019023657, with English translation.

International Search Report issued by the Japan Patent Office on Feb. 4, 2020 in corresponding International Application No. PCT/JP2019/045301, with English translation.

International Preliminary Report on Patentability issued on Apr. 8, 2021 by the International Bureau of WIPO on behalf of the Japan Patent Office acting as International Searching Authority in corresponding International Application No. PCT/JP2019/023657, with English translation.

International Search Report issued in International Application No. PCT/JP2019/023640 dated Sep. 3, 2019, pp. 1-2.

Devalla Sripad Krishna, A Deep Learning Approach to Denoise Optical Coherence Tomography Images of the Optic Nerve Head, [online], Sep. 27, 2018, [retrieved on Aug. 19, 2019], Retrieved from the Internet: <URL: https://arxiv.org/pdf/1809.10589v1.pdf>.

Devalla Sripad Krishna, Drunet: A Dliated-Residual U-Net Deep Learning Network to Digitally Strain Optic Nerve Head Tissues in Optical Coherence Tomography Images, [online], Mar. 1, 2018, [retrieved on Aug. 19, 2019], Retrieved from the Internet: <URL: https://arxiv.org/pdf/1803.00232v1.pdf>.

Sheet Debdoot, Deep Learning of Tissue Specific Speckle Representations in Optical Coherence Tomography and Deeper Exploration for In Situ Histology, 2015 IEEE 12th International Symposium on Biomedical Imaging (ISBI), Apr. 2015, pp. 777-780.

(56) References Cited

OTHER PUBLICATIONS

International Search Report issued in International Application No. PCT/JP2019/023650 dated Sep. 3, 2019, pp. 1-2, English Translation.
Notice of Reasons for Refusal issued by the Japanese Patent Office on Nov. 28, 2023 in corresponding JP Patent Application No. 2022-197060, with English translation.
Chinese Office Action issued in corresponding CN Patent Application No. 201980057669.5, dated Jan. 4, 2024, with English translation.
Chinese Office Action issued in corresponding CN Patent Application No. 201980040325.3, dated Sep. 26, 2023, with English translation.
Chinese Office Action issued in corresponding CN Patent Application No. 201980093906.3, dated Sep. 27, 2023, with English translation.
Notice of Reasons for Refusal issued by the Japanese Patent Office on Jul. 11, 2023 in corresponding JP Patent Application No. 2022-118982, with English translation.
Hasegawa, "AI, noise reduction treatment" PixelShine Innervision (Jun. 2017) pp. 31-34, vol. 32, No. 7, with English abstract.
Notice of Reasons for Refusal issued by the Japanese Patent Office on Sep. 21, 2023 in corresponding JP Patent Application No. 2022-118982, with English translation.
Notice of Reasons for Refusal issued by the Japanese Patent Office on Aug. 1, 2023 in corresponding JP Patent Application No. 2022-197060, with English translation.
Office Action issued by the Chinese Patent Office on Jul. 25, 2023 in corresponding CN Patent Application No. 201980093820.0, with partial English translation.
Chinese Office Action issued in corresponding CN Patent Application No. 201980066871.4, dated Jan. 8, 2024, with English translation.
Chinese Office Action issued in corresponding CN Patent Application No. 201980040325.3, dated Mar. 20, 2024, with English translation.

* cited by examiner

IMAGE PROCESSING APPARATUS, IMAGE PROCESSING METHOD AND COMPUTER-READABLE MEDIUM

CROSS-REFERENCE TO RELATED APPLICATIONS

This application is a Continuation of international Patent Application No. PCT/JP2019/023650, filed Jun. 14, 2019, which claims the benefit of Japanese Patent Application No. 2018-166817, filed Sep. 6, 2018, and Japanese Patent Application No. 2019-068663, filed Mar. 29, 2019, all of which are hereby incorporated by reference herein in their entirety.

BACKGROUND OF THE INVENTION

Field of the Invention

The present invention relates to an image processing apparatus, an image processing method and a computer-readable medium.

Description of the Related Art

An apparatus (OCT apparatus) that utilizes optical coherence tomography (OCT) is in practical use as a method for nondestructively and noninvasively obtaining tomographic images of an object under examination, such as a living organism. An OCT apparatus is widely used in particular as an ophthalmic apparatus that acquires images for ophthalmic diagnosis.

In OCT, a tomographic image of an object under examination can be obtained by causing light reflected from a measurement object and light reflected from a reference mirror to interfere with each other, and analyzing the intensity of the interference light. Time domain OCT (TD-OCT) is known as one kind of such OCT. In TD-OCT, depth information for the object under examination is obtained by successively changing the position of the reference mirror.

Spectral domain OCT (SD-OCT) and swept source OCT (SS-OCT) are also known. In SD-OCT, interference light obtained by causing light interference using low-coherence light is divided, and depth information is replaced with frequency information to thereby acquire the frequency information. In SS-OCT, interference light is acquired by using light whose wavelength has been divided in advance using a wavelength-swept light source. Note that, SD-OCT and SS-OCT are also referred to collectively as "Fourier domain OCT (FD-OCT)".

By using OCT, tomographic images that are based on depth information of the object under examination can be acquired. Further, by integrating acquired three-dimensional tomographic images in the depth direction and projecting the integrated image onto a two-dimensional plane, a front image of the measurement object can be generated. Conventionally, to improve the image quality of these images, images are acquired a plurality of times and averaging processing is performed. However, in such a case, it takes time to perform imaging a plurality of times.

Japanese Patent Application Laid-Open No. 2018-5841 discloses technology that, in order to respond to the rapid advances being made in medical techniques and also to correspond to simple imaging in an emergency, converts a previously acquired image into an image with higher resolution by means of an artificial intelligence engine. According to this technology, for example, images acquired by performing imaging a fewer number of times can be converted into an image with a higher resolution.

However, even when an image has a high resolution, there are cases in which it cannot be said that the image is an image that is suitable for image diagnosis. For example, even when the resolution of an image is high, if there is a large amount of noise or the contrast is low or the like in the image, in some cases an object that should be observed cannot be appropriately ascertained.

In this regard, one objective of the present invention is to provide an image processing apparatus, an image processing method and a computer-readable medium having stored thereon a program, which can generate an image that is more suitable for image diagnosis than in the conventional technology.

SUMMARY OF THE INVENTION

An image processing apparatus according to one embodiment of the present invention includes: an obtaining unit configured to obtain a first image of an eye to be examined; an image quality improving unit configured to generate a second image with at least one of lower noise and higher contrast than the obtained first image using the obtained first image as an input data of a learned model, wherein the learned model has been obtained by using training data including a second image with at least one of lower noise and higher contrast than a first image of an eye to be examined; and a display controlling unit configured to cause the obtained first image and the generated second image to be switched, juxtaposed or superimposed and displayed on a display unit.

An image processing apparatus according to another embodiment of the present invention includes: an obtaining unit configured to obtain a first image of an eye to be examined; an image quality improving unit configured to generate, from the obtained first image, a second image with higher image quality than the obtained first image using a learned model; a comparing unit configured to compare the obtained first image and the generated second image; and a display controlling unit configured to cause comparison result obtained by the comparing unit to be displayed on a display unit.

Further features of the present invention will become apparent from the following description of exemplary embodiments with reference to the attached drawings.

DESCRIPTION OF THE EMBODIMENTS

Figure 1:
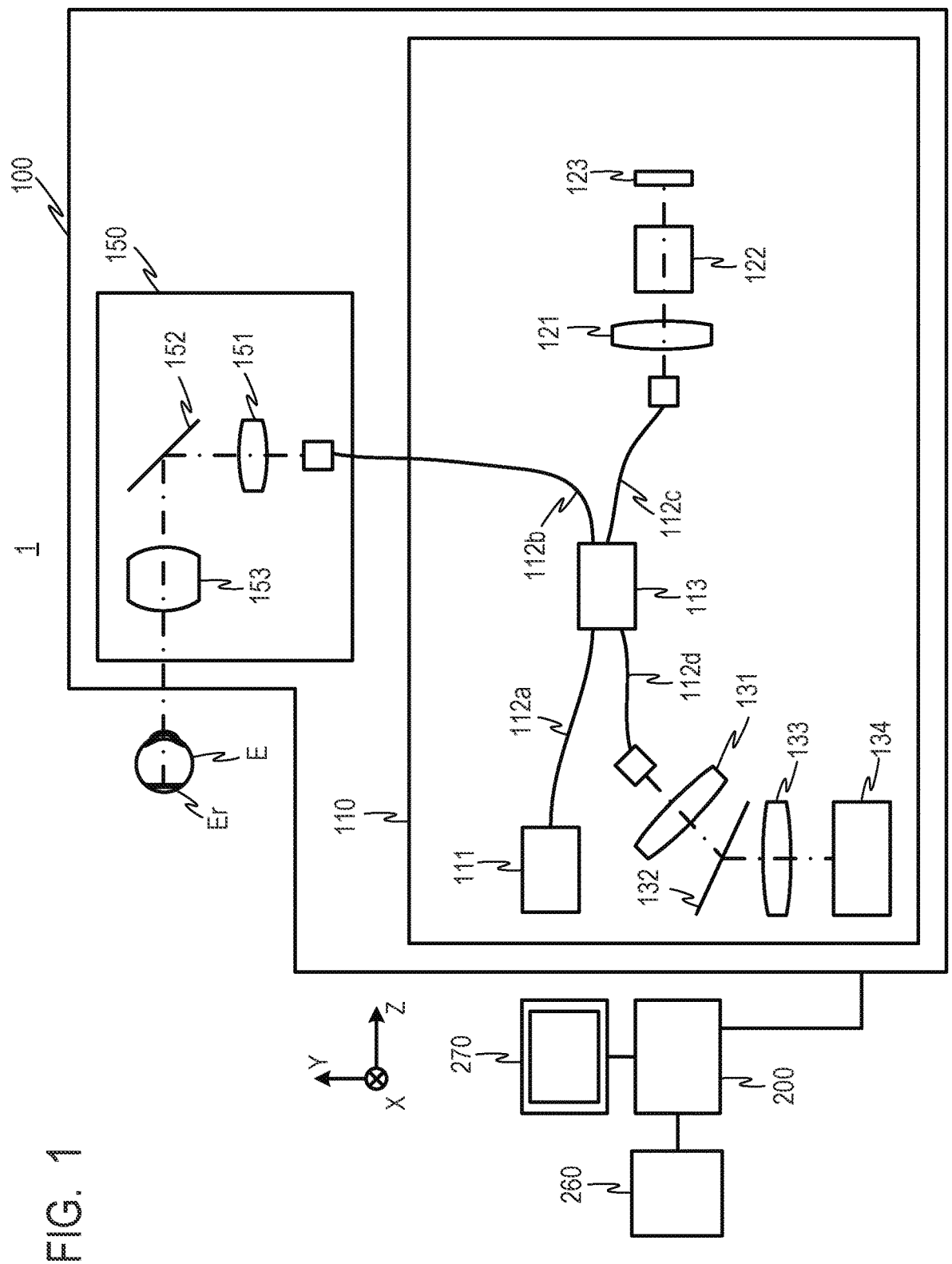
FIG. 1 is a view illustrating a schematic configuration of an OCT apparatus according to Embodiment 1.

Exemplary embodiments of the present invention will now be described in detail in accordance with the accompanying drawings.

However, the dimensions, materials, shapes and relative positions of the components described in the following embodiments are not determinate, and can be changed according to a configuration of an apparatus to which the present invention is applied or to various conditions. Further, identical or functionally similar elements are denoted by the same reference numerals in different drawings.

In the following embodiments, while an eye to be examined is given as an example of an object under examination, another organ of a human or the like may be taken as the object under examination. Further, an OCTA (OCT angiography) image of an eye to be examined is described as an example of an image on which image quality improving processing is performed using a learned model relating to a machine learning model (machine learning engine). Note that, the term "OCTA" refers to angiography that uses OCT without using a contrast medium. In OCTA, an OCTA, image (front blood vessel image is generated by integrating three-dimensional motion contrast data obtained based on depth information of the object under examination in the depth direction, and projecting the integrated data onto a two-dimensional plane.

Here, the term "motion contrast data" refers to data obtained by repeatedly imaging approximately the same location of an object under examination, and detecting changes over time in the object during the imaging. Note that, the phrase "approximately the same location" refers to a position that is the same to a degree that is allowable for generating motion contrast data, and includes a location that deviates slightly from a location that is strictly the same location. Motion contrast data is obtained by, for example, calculating changes over time in phases, vectors or intensities of complex OCT signals based on differences, ratios or correlations or the like.

Important points relating to image quality improving processing using a learned model relating to a machine learning model will now be mentioned. By performing image quality improving processing on an image using a learned model relating to a machine learning model, although on one hand a high-quality image can be obtained from a small number of images, on the other hand in some cases tissue that does not actually exist is visualized in an image or tissue that originally exists is not visualized in an image. Consequently, there is the problem that it is difficult to determine the authenticity of tissue visualized in an image subjected to image quality improving by performing image quality improving processing using a learned model.

Therefore, in the following embodiments, an image processing apparatus is provided which, by using a machine learning model, can generate an image that is more suitable for image diagnosis than in the conventional technology, and with respect to such an image, can also easily determine the authenticity of tissue visualized in the image.

Note that, although an OCTA image is described in the following embodiments, an image on which image quality improving processing is performed is not limited thereto, and may be a tomographic image or an intensity en-face image or the like. Here, the term "en-face image" refers to a front image generated by, with respect to three-dimensional data of the object under examination, projecting or integrating data within a predetermined depth range determined based on two reference planes onto a two-dimensional plane. Examples of en-face images include an intensity en-face image that is based on an intensity tomographic image and an OCTA image that is based on motion contrast data.

Embodiment 1

Hereunder, an optical coherence tomography apparatus (OCT apparatus) and an image processing method according to Embodiment 1 of the present invention are described referring to FIG. 1 to FIG. 7. FIG. 1 is a schematic configuration of an OCT apparatus according to the present embodiment.

An OCT apparatus 1 according to the present embodiment includes an OCT imaging unit 100, a controlling unit (image processing apparatus) 200, an inputting unit 260, and a display unit 270.

The OCT imaging unit 100 includes an imaging optical system of an SD-OCT apparatus, and acquires a signal including tomographic information of an eye to be examined E, based on interference light generated by causing return light from the eye to be examined E at which measuring light was irradiated through a scanning unit, and reference light corresponding to the measuring light to interfere with each other. An optical interference unit 110 and a scanning optical system 150 are provided in the OCT imaging unit 100.

The controlling unit 200 can control the OCT imaging unit 100, generate an image from a signal obtained from the OCT imaging unit 100 or another apparatus (not illustrated), and process a generated/acquired image. The display unit 270 is any display such as an LCD display, and can display a GUI for operating the OCT imaging unit 100 and the controlling unit 200, a generated image, an image on which any kind of processing was performed, and various kinds of information such as patient information.

The inputting unit 260 is used for operating the controlling unit 200 by operating the GUI and by inputting information. The inputting unit 260 includes, for example, a pointing device such as a mouse, a touchpad, a trackball, a touch panel display or a stylus pen, and a keyboard. Note that, in the case of using a touch panel display, the display unit 270 and the inputting unit 260 can be constituted integrally with each other. Note that, although in the present embodiment the OCT imaging unit 100, the controlling unit 200, the inputting unit 260 and the display unit 270 are assumed to be separate units to each other, some or all of these units may be constituted integrally with each other.

A light source 111, a coupler 113, a collimating optical system 121, a dispersion compensation optical system 122, a reflection mirror 123, a lens 131, a diffraction grating 132, an imaging lens 133, and a line sensor 134 are provided in the optical interference unit 110 in the OCT imaging unit 100. The light source 111 is a low-coherence light source that emits near-infrared light. Light emitted from the light source 111 propagates through an optical fiber 112a and enters the coupler 113 that is a light splitting unit. The light that entered the coupler 113 is split into measuring light which travels toward a scanning optical system 150 side, and reference light which travels toward a reference light optical system side that includes the collimating optical system 121, the dispersion compensation optical system 122 and the reflection mirror 123. The measuring light enters an optical fiber 112b and is guided to the scanning optical system 150. On the other hand, the reference light enters an optical fiber 112c and is led to the reference light optical system.

The reference light that entered the optical fiber 112c is emitted from a fiber end, and is incident on the dispersion compensation optical system 122 through the collimating optical system 121 and is guided to the reflection mirror 123. The reference light that is reflected by the reflection mirror 123 follows the optical path in an opposite direction and enters the optical fiber 112c once again. The dispersion compensation optical system 122 is a component for compensating for dispersion of the optical system with respect to the scanning optical system 150 and the eye to be examined E that is the object under examination, and causing the dispersion of the measuring light to match with the dispersion of the reference light. The reflection mirror 123 is configured to be drivable in a direction of an optical axis of the reference light by a driving unit (not illustrated) controlled by the controlling unit 200, and can cause an optical path length of the reference light to change relatively with respect to an optical path length of the measuring light and cause the optical path lengths of the reference light and the measuring light to match.

On the other hand, the measuring light that entered the optical fiber 112b is emitted from the fiber end, and is incident on the scanning optical system 150. The scanning optical system 150 is an optical system configured to be movable relatively with respect to the eye to be examined E. The scanning optical system 150 is configured to be drivable in front, rear, upward, downward, left and right directions with respect to an axis of an eyeball of the eye to be examined E by a driving unit (not illustrated) controlled by the controlling unit 200, and can perform alignment with respect to the eye to be examined E. Note that, the scanning optical system 150 may be configured to include the light source 111, the coupler 113 and the reference light optical system or the like.

A collimating optical system 151, a scanning unit 152 and a lens 153 are provided in the scanning optical system 150. Light emitted from the fiber end of the optical fiber 112b is substantially collimated by the collimating optical system 151, and is incident on the scanning unit 152.

The scanning unit 152 has two galvanometer mirrors capable of rotating a mirror surface, one of which deflects light in a horizontal direction and the other of which deflects light in a vertical direction. The scanning unit 152 deflects the incident light according to control by the controlling unit 200. By this means, the scanning unit 152 can scan the measuring light on a fundus Er of the eye to be examined E in two directions, namely, a main scanning direction that is a direction perpendicular to the paper surface (X-direction) and a sub-scanning direction that is a direction parallel to the paper surface (Y-direction). Note that, the main scanning direction and the sub-scanning direction are not limited to the X-direction and the Y-direction, and it suffices that the main scanning direction and the sub-scanning direction are directions which are perpendicular to the depth direction (Z-direction) of the eye to be examined E, and which intersect with each other. Therefore, for example, the main scanning direction may be the Y-direction, and the sub-scanning direction may be the X-direction.

The measuring light scanned by the scanning unit 152 forms an illumination spot on the fundus Er of the eye to be examined E via the lens 153. Upon receiving in-plane deflection by the scanning unit 152, each illumination spot moves (scans) over the fundus Er of the eye to be examined E. Return light of the measuring light which was reflected and scattered from the fundus Er at the position of the illumination spot follows along the optical path in the opposite direction, enters the optical fiber 112b, and returns to the coupler 113.

As described above, the reference light reflected by the reflection mirror 123 and the return light of the measuring light from the fundus Er of the eye to be examined E are returned to the coupler 113 and interfere with each other to become interference light. The interference light passes through the optical fiber 112d and is emitted to the lens 131. The interference light is substantially collimated by the lens 131, and is incident on the diffraction grating 132. The diffraction grating 132 has a periodic structure, and splits the incident interference light. The interference light that was split is imaged on the line sensor 134 by the imaging lens 133 whose focal state can be changed. The line sensor 134 outputs a signal corresponding to the intensity of light irradiated onto each sensor unit to the controlling unit 200. The controlling unit 200 can generate a tomographic image of the eye to be examined E based on the interference signal output from the line sensor 134.

Tomographic information pertaining to the depth direction at one point of the eye to be examined E can be acquired through the series of operations described above. Such a series of operations is referred to as an "A-scan".

Further, by driving the galvanometer mirror of the scanning unit 152, interference light at one point adjacent to the eye to be examined E is generated, and tomographic information in the depth direction at one point adjacent to the eye to be examined E is acquired. By performing the A-scan a plurality of times in an arbitrary transverse direction (main scanning direction) by repeating this series of controls, two-dimensional tomographic information of the eye to be examined E can be acquired in the aforementioned transverse direction and the depth direction. Such an operation is referred to as a "B-scan". The controlling unit 200 can construct one B-scan image by collecting a plurality of A-scan images based on interference signals acquired by the A-scans. Hereinafter, the B-scan image is referred to as a "two-dimensional tomographic image".

In addition, tomographic information can be acquired at another position (an adjacent scanning line) of the eye to be examined E by slightly driving the galvanometer mirror of the scanning unit 152 in the sub-scanning direction that is orthogonal to the main scanning direction. By collecting a plurality of B-scan images by repeating this operation, the controlling unit 200 can acquire a three-dimensional tomographic image in a predetermined range of the eye to be examined E.

Figure 2:
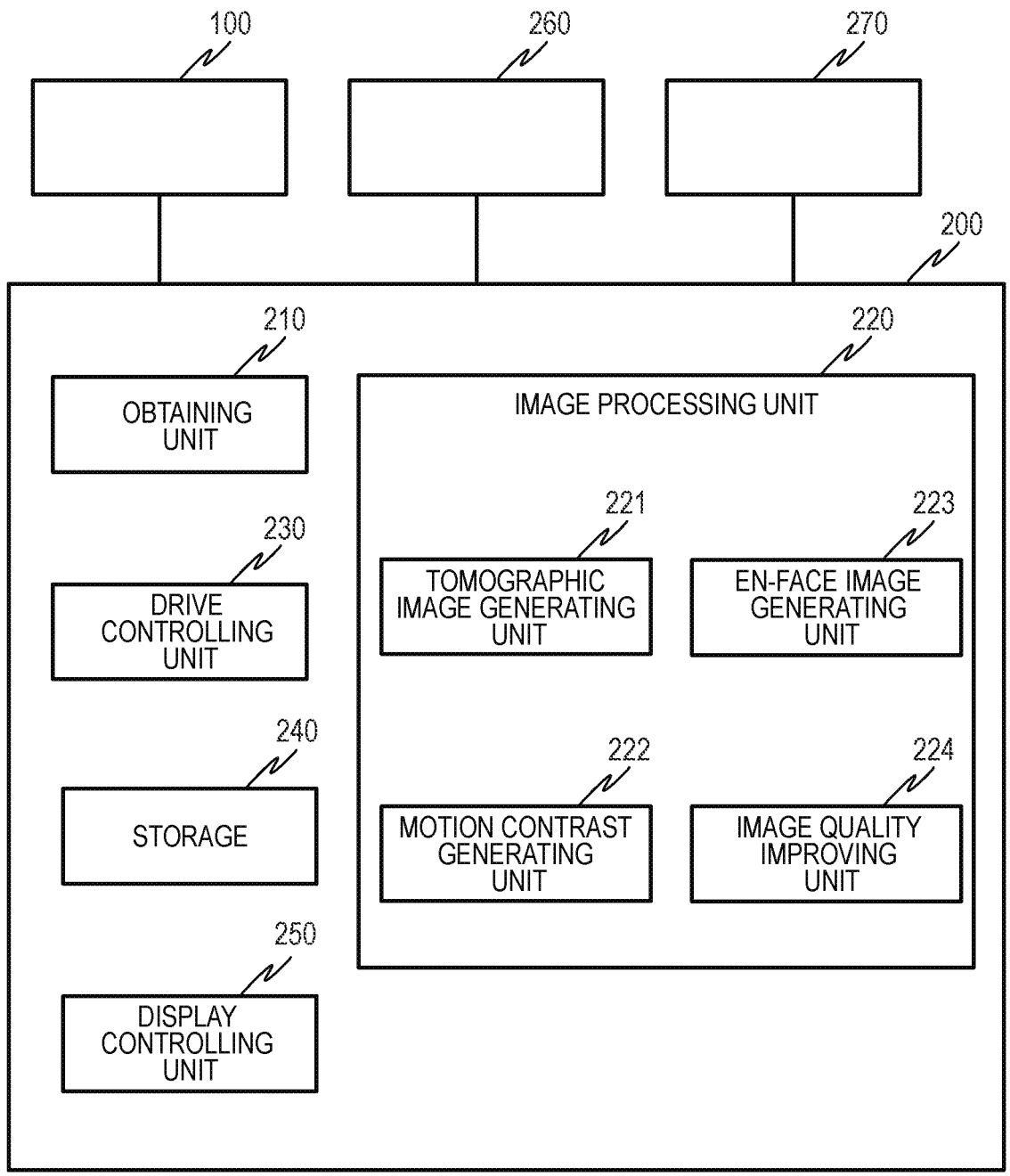
FIG. 2 is a view illustrating a schematic configuration of a controlling unit according to Embodiment 1.

Next, the controlling unit 200 will be described referring to FIG. 2. FIG. 2 illustrates a schematic configuration of the controlling unit 200. An obtaining unit 210, an image processing unit 220, a drive controlling unit 230, a storage 240 and a display controlling unit 250 are provided in the controlling unit 200.

The obtaining unit 210 can obtain data of an output signal of the line sensor 134 corresponding to an interference signal of the eye to be examined E, from the OCT imaging unit 100. Note that, the data of the output signal that the obtaining unit 210 obtains may be an analog signal or a digital signal. In a case where the obtaining unit 210 obtains an analog signal, the controlling unit 200 can convert the analog signal into a digital signal.

Further, the obtaining unit 210 can obtain tomographic data generated by the image processing unit 220, and various kinds of images such as a two-dimensional tomographic image, a three-dimensional tomographic image, a motion contrast image and an en-face image. Here, the term "tomographic data" refers to data including information relating to a cross-section of an object under examination, and includes a signal obtained by subjecting an interference signal obtained by OCT to Fourier transformation, a signal obtained by subjecting the relevant signal to any processing, and a tomographic image or the like based on these signals.

In addition, the obtaining unit 210 obtains an imaging conditions group (for example, information relating to the imaging date and time, an imaged site name, an imaged region, an imaging angle of view, an imaging system, an image resolution and gradation, an image size, an image filter, and the image data format) of the image to be subjected to image processing. Note that the imaging conditions group is not limited to the example of an imaging conditions group described in the foregoing. Further, the imaging conditions group need not include all of the conditions mentioned in the foregoing example, and may include some of these conditions.

Specifically, the obtaining unit 210 obtains the imaging conditions of the OCT imaging unit 100 when imaging the relevant image. Further, depending on the data format of the image, the obtaining unit 210 can also obtain an imaging conditions group that is stored in a data structure constituting the image. Note that, in a case where imaging conditions are not stored in the data structure of the image, the obtaining unit 210 can also separately obtain an imaging information group that includes an imaging conditions group from a storage apparatus or the like that stores the imaging conditions.

Further, the obtaining unit 210 can also obtain information for identifying the eye to be examined, such as a subject identification number, from the inputting unit 260 or the like. Note that, the obtaining unit 210 may obtain various kinds of data, various kinds of images or various kinds of information from the storage 240 or another apparatus (not illustrated) connected to the controlling unit 200. The obtaining unit 210 can store various kinds of data or images that were obtained in the storage 240.

The image processing unit 220 can generate a tomographic, image or an en-face image or the like from data obtained by the obtaining unit 210 or data stored in the storage 240, and can perform image processing on a generated or obtained image. A tomographic image generating unit 221, a motion contrast generating unit 222, an en-face image generating unit 223 and an image quality improving unit 224 are provided in the image processing unit 220.

The tomographic image generating unit 221 can subject the interference signal data obtained by the obtaining unit 210 to wavenumber conversion, Fourier transformation, absolute value conversion (acquisition of amplitude) or the like to generate tomographic data, and can generate a tomographic image of the eye to be examined E based on the tomographic data. The interference signal data obtained by the obtaining unit 210 may be data of a signal that was output from the line sensor 134, or may be data of an interference signal obtained from the storage 240 or an apparatus (not illustrated) connected to the controlling unit 200. Note that, any known method may be adopted as a method for generating a tomographic image, and a detailed description thereof is omitted here.

The tomographic image generating unit 221 can also generate a three-dimensional tomographic image based on the generated tomographic images of a plurality of sites. The tomographic image generating unit 221, for example, can generate a three-dimensional tomographic image by arranging tomographic images of a plurality of sites side-by-side in one coordinate system. Here, the tomographic image generating unit 221 may generate a three-dimensional tomographic image based on tomographic images of a plurality of sites obtained from the storage 240 or an apparatus (not illustrated) connected to the controlling unit 200.

The motion contrast generating unit 222 can generate a two-dimensional motion contrast image using a plurality of tomographic images obtained by imaging approximately the same location. Further, the motion contrast generating unit 222 can generate a three-dimensional motion contrast image by arranging generated two-dimensional motion contrast images of respective sites side-by-side in one coordinate system.

In the present embodiment, the motion contrast generating unit 222 generates a motion contrast image based on decorrelation values between a plurality of tomographic images obtained by imaging approximately the same location of the eye to be examined E.

Specifically, the motion contrast generating unit 222 acquires a plurality of tomographic images on which alignment was performed with respect to a plurality of tomographic images obtained by imaging approximately the same location for which the imaging times are continuous with each other. Note that, various known methods can be used as the alignment method. For example, one reference image is selected among the plurality of tomographic images, the degree of similarity with the other tomographic images is calculated while changing the position and angle of the reference image, and the amount of displacement of each tomographic image relative to the reference image is calculated. Alignment of the plurality of tomographic images is then performed by correcting each tomographic image based on the calculation results. Note that, processing for the alignment may be performed by a separate component from the motion contrast generating unit 222. Further, the alignment method is not limited to this method, and alignment may be performed by any known method.

The motion contrast generating unit 222 uses the following mathematical expression 1 to calculate decorrelation values for each two tomographic images whose imaging times are continuous with each other among the plurality of tomographic images on which alignment was performed.

[Expression 1]

$$M(x, z) = 1 - 2 \times \frac{A(x, z) \times B(x, z)}{A(x, z)^2 \times B(x, z)^2}$$ mathematical expression 1

Here, A(x,z) represents the amplitude at a position (x,z) of a tomographic image A, and B(x,z) represents the amplitude at the same position (x,z) of a tomographic image B. A decorrelation value M (x,z) obtained as a result takes a value from 0 to 1, and becomes closer to 1 as the difference between the two amplitude values increases. Note that, although a case of using two-dimensional tomographic images on the X-Z plane has been described in the present embodiment, for example two-dimensional tomographic images on the Y-Z plane or the like may be used. In such a case, the position (x,z) max be replaced with the position (y,z) or the like. Note that, the decorrelation value may be determined based on intensity values of the tomographic images, or may be determined based on values of interference signals corresponding to the tomographic images.

The motion contrast generating unit 222 determines pixel values of the motion contrast image based on the decorrelation value M(x,z) at each position (pixel position), and generates a motion contrast image. Note that, although in the present embodiment the motion contrast generating unit 222 calculates decorrelation values with respect to tomographic images whose imaging times are continuous with each other, a method for calculating motion contrast data is not limited thereto. The imaging times of two tomographic images for which a decorrelation value M is obtained need not be continuous with each other, and it suffices that imaging times relating to the respective tomographic image which correspond to each other are within a predetermined time interval. Therefore, for example, for the purpose of extracting an object for which a change over time is small, two tomographic images for which the imaging interval is longer than a normal specified time may be extracted from an acquired plurality of tomographic images and the decorrelation values may be calculated. Further, instead of a decorrelation value, a variance value or a value obtained by dividing the maximum value by the minimum value (maximum value/minimum value) or the like may be determined.

Note that, a method for generating a motion contrast image is not limited to the aforementioned method, and any other known method may also be used.

The en-face image generating unit 223 can generate an en-face image (OCTA image) that is a front image from a three-dimensional motion contrast image which the motion contrast generating unit 222 generated. Specifically, the en-face image generating unit 223 can generate an OCTA image that is a front image by projecting the three-dimensional motion contrast image on a two-dimensional plane based on, for example, two arbitrary reference planes in the depth direction (Z direction) of the eye to be examined E. Further, the en-face image generating unit 223 can generate an intensity en-face image in a similar manner from a three-dimensional tomographic image which the tomographic image generating unit 221 generated.

The en-face image generating unit 223, more specifically, for example, determines a representative value of pixel values in the depth direction at each position in the X-Y direction of a region surrounded by two reference planes, determines a pixel value at each position based on the representative value, and generates an en-face image. In this case, examples of the representative value include an average value, median value or maximum value of pixel values within a range in the depth direction of the region surrounded by the two reference planes.

Note that, a reference plane may be a plane along a layer boundary at a cross-section of the eye to be examined E, or may be a plane. Hereinafter, a range in the depth direction between reference planes for generating an en-face image is referred to as an "en-face image generation range". Further, the method for generating an en-face image according to the present embodiment is one example, and the en-face image generating unit 223 may generate an en-face image using any known method.

The image quality improving unit 224 uses a learned model that is described later to generate a high quality OCTA image based on an OCTA image generated by the en-face image generating unit 223. Further, the image quality improving unit 224 may generate a high quality tomographic image or a high quality intensity en-face image based on a tomographic image generated by the tomographic image generating unit 221 or an intensity en-face image generated by the en-face image generating unit 223. Note that, the image quality improving unit 224 can also generate a high quality image based on various kinds of images that the obtaining unit 210 obtained from the storage 240 or another apparatus (not illustrated) connected to the controlling unit 200, and not just based on an OCTA image that was imaged using the OCT imaging unit 100 or the like. In addition, the image quality improving unit 224 may perform image quality improving processing on a three-dimensional motion contrast image or a three-dimensional tomographic image, and not just an OCTA image or a tomographic image.

The drive controlling unit 230 can control driving of components such as the light source 111, the scanning optical system 150, the scanning unit 152 and the imaging lens 133 of the OCT imaging unit 100 which is connected to the controlling unit 200. The storage 240 can store various kinds of data obtained by the obtaining unit 210, and various kinds of data and images such as a tomographic image or an OCTA image which was generated and processed by the image processing unit 220. Further, the storage 240 can store attributes (name, age, or the like) of a subject, information relating to the eye to be examined such as measurement results (axial length of eyeball, intraocular pressure, or the like) acquired using other inspection equipment, imaging parameters, image analysis parameters, and parameters set by the operator. Note that, a configuration may also be adopted in which these images and information are stored in an external storage apparatus (not illustrated). The storage 240 can also store a program for carrying out the functions of the respective components of the controlling unit 200 by being executed by a processor.

The display controlling unit 250 can cause various kinds of information obtained by the obtaining unit 210 and various kinds of images such as a tomographic image, an OCTA image and a three-dimensional motion contrast image which were generated and processed by the image processing unit 220 to be displayed on the display unit 270. The display controlling unit 250 can also cause information that was input by a user and the like to be displayed on the display unit 270.

The controlling unit 200 may be constituted, for example, by using a general-purpose computer. Note that, the controlling unit 200 may be constituted by using a dedicated computer of the OCT apparatus 1. The controlling unit 200 is equipped with a CPU (central processing unit) (not illustrated) or MPU (micro processing unit) and a storage medium including a memory such as an optical disk or ROM (read only memory). The respective components other than the storage 240 of the controlling unit 200 may be constituted by a software module that is executed by a processor such as a CPU or an MPU. Further, the respective components in question may be constituted by a circuit that serves a specific function such as an ASIC, or an independent apparatus or the like. The storage 240, for example, may be constituted by any storage medium such as an optical disk or a memory.

Note that, the controlling unit 200 may include one or a plurality of processors such as a CPU and storage media such as ROM. Therefore, each component of the controlling unit 200 may be configured to function in a case where at least one or more processors and at least one storage medium are connected, and at least one or more processors executes a program stored in at least one storage medium. Note that, the processor is not limited to a CPU or an MPU, and may be a GPU (graphics processing unit) or the like.

Figure 3A:
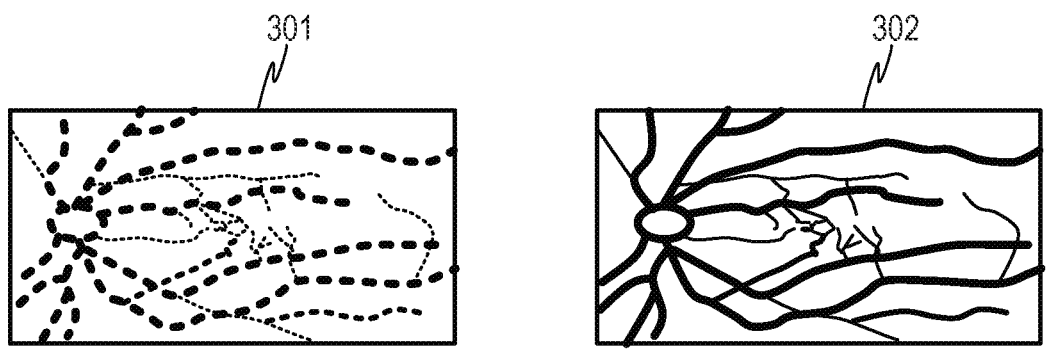
FIG. 3A is a view illustrating an example of training data according to Embodiment 1.
Figure 3B:
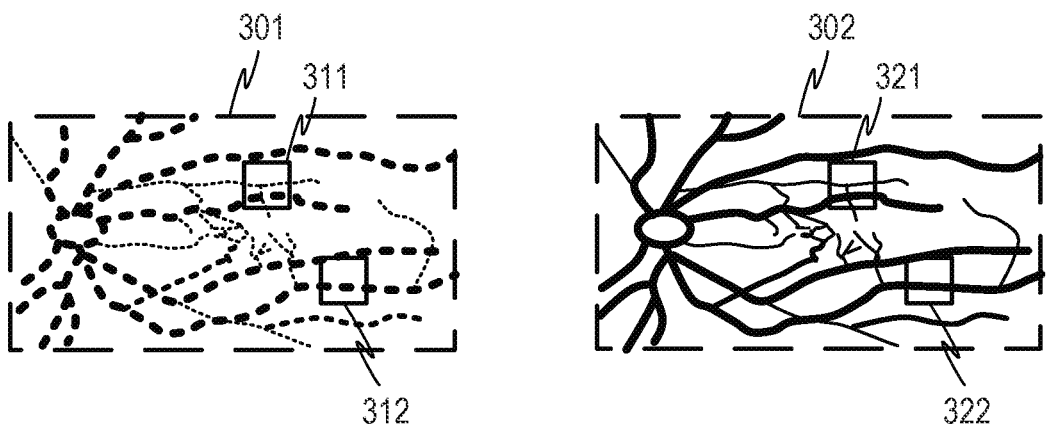
FIG. 3B is a view illustrating an example of training data according to Embodiment 1.
Figure 4:
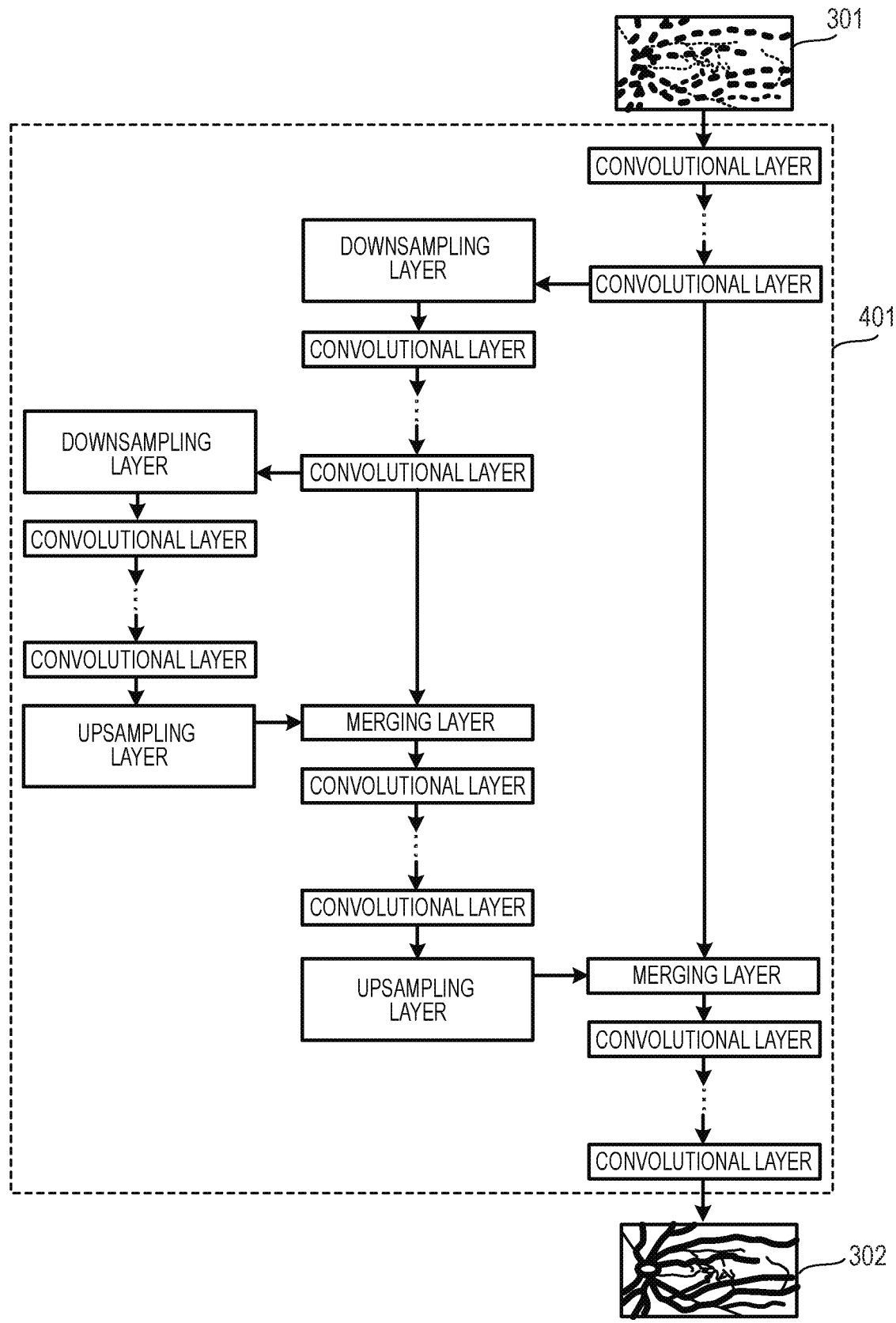
FIG. 4 is a view illustrating an example of a configuration of a learned model according to Embodiment 1.

Next, a learned model relating to a machine learning model in accordance with a machine learning algorithm such as deep learning according to the present embodiment is described referring to FIG. 3A to FIG. 4. A learned model according to the present embodiment generates and outputs an image on which image quality improving processing was performed based on an input image according to the learning tendency.

In the present description the term "image quality improving processing" refers to converting an input image into an image with image quality that is more suitable for image diagnosis, and the term "high quality image" refers to an image that has been converted into an image with image quality that is more suitable for image diagnosis. Here, the content of image quality which is suitable for image diagnosis depends on what it is desired to diagnose using various kinds of image diagnosis. Therefore, while it is not possible to say so unconditionally, for example, image quality that is suitable for image diagnosis includes image quality in which the amount of noise is low, the contrast is high, the imaging target is displayed in colors and gradations which make the imaging target easy to observe, the image size is large and the resolution is high. In addition, image quality that is suitable for image diagnosis can include image quality such that objects or gradations which do not actually exist that were rendered during the process of image generation are removed from the image.

The term "learned model" refers to, with respect to a machine learning model in accordance with any machine learning algorithm such as deep learning, a model which performed training (learning) using appropriate training data in advance. However, it is assumed that the learned model is not a model that does not perform further learning, and is a model that can also perform incremental learning. The training data is composed of one or more pair groups composed of input data and ground truth (correct answer data). In the present embodiment, a pair composed of input data and ground truth is constituted by an OCTA image, and an OCTA image obtained by subjecting a plurality of OCTA images including the aforementioned OCTA image to averaging processing such as addition averaging.

An averaged image that underwent averaging processing is a high quality image that is suitable for image diagnosis because pixels that are commonly visualized in a source image group are enhanced. In this case, as a result of pixels commonly visualized being enhanced, the generated high quality image is a high contrast image in which a difference between a low intensity region and a high intensity region is clear. In addition, for example, in an averaged image, random noise that is generated at each round of imaging can be reduced, and a region that was not rendered well in a source image at a certain time point can be subjected to interpolation using another source image group.

Note that, among the pair groups constituting the training data, pairs that do not contribute to improving image quality can be removed from the training data. For example, if the image quality of a high quality image that is ground truth included in one pair of the training data is not suitable for image diagnosis, there is a possibility that an image output by a learned model that learned using the relevant training data will have image quality that is not suitable for image diagnosis. Therefore, by removing pairs for which the image quality of the ground truth is not suitable for image diagnosis from the training data, the possibility of the learned model generating an image with image quality that is not suitable for image diagnosis can be reduced.

Further, in a case where the average intensity or an intensity distribution differs greatly in an image group which is a pair, there is a possibility that a learned model that learned using the relevant training data will output an image which is not suitable for image diagnosis which has an intensity distribution that greatly differs from the intensity distribution of the low quality image. Therefore, a pair of input data and ground truth in which the average intensity or an intensity distribution differs greatly can be removed from the training data.

In addition, in a case where the structure or position of an imaging target to be rendered differs greatly in an image group which is a pair, there is a possibility that a learned model that learned using the relevant training data will output an image which is not suitable for image diagnosis in which the imaging target is rendered with a structure or at a position that greatly differs from the low quality image. Therefore, a pair of input data and ground truth in which the structure or position of the imaging target to be rendered differs greatly between the input data and ground truth can also be removed from the training data.

By using the learned model that has performed learning in this way, in a case where an OCTA image obtained by one round of imaging (examination) is input, the image quality improving unit 224 can generate a high quality OCTA image for which the contrast was increased or noise was reduced or the like by averaging processing. Therefore, the image quality improving unit 224 can generate a high quality image that is suitable for image diagnosis based on a low quality image that is an input image.

Next, images used when performing learning will be described. An image group constituting a pair group composed of an OCTA, image 301 and a high quality OCTA image 302 constituting training data is created using rectangular region images of a certain image size whose positional relationships correspond. The manner in which the images in question are created will now be described referring to FIG. 3A and FIG. 3B.

First, a case is described in which one pair group constituting the training data is taken as being composed of the OCTA image 301 and the high quality OCTA image 302. In this case, as illustrated in FIG. 3A, a pair is formed in which the entire OCTA image 301 is taken as input data, and the entire high quality OCTA image 302 is taken as ground truth. Note that, although in the example illustrated in FIG. 3A a pair composed of input data and ground truth is formed by using each image in its entirety, a pair is not limited thereto.

For example, as illustrated in FIG. 3B, a pair may be formed in which a rectangular region image 311 in the OCTA image 301 is adopted as input data, and a rectangular region image 321 that is a corresponding imaged region in the OCTA image 302 is adopted as ground truth.

Note that, when performing learning, the scanning range (imaging angle of view) and scanning density (number of A-scans and number of B-scans) can be normalized to make the image sizes uniform, so that the rectangular region sizes when performing learning can be made uniform. Further, the rectangular region images illustrated in FIG. 3A and FIG. 3B are examples of rectangular region sizes when the respective rectangular region sizes are used for performing learning separately from each other.

Further, the number of rectangular regions can be set to one in the example illustrated in FIG. 3A, and can be set to a plurality of rectangular regions in the example illustrated in FIG. 3B. For example, in the example illustrated in FIG. 3B, a pair can also be constituted in which a rectangular region image 312 in the OCTA image 301 is adopted as input data and a rectangular region image 322 that is a corresponding imaged region in the high quality OCTA image 302 is adopted as ground truth. Thus, pairs of rectangular region images which are different to each other can be created from a pair composed of one OCTA image and one high quality OCTA image. Note that, the content of pair groups constituting the training data can be enhanced by creating a large number of pairs of rectangular region images while changing the positions of the regions to different coordinates in the OCTA image and the high quality OCTA image that are the source images.

Although the rectangular regions are illustrated discretely in the example illustrated in FIG. 3B, the OCTA image and the high quality OCTA image that are the source images can each be divided into a group of rectangular region images of a uniform image size continuously and without gaps. Alternatively, the OCTA image and the high quality OCTA image that are the source images may each be divided into a rectangular region image group at random positions which correspond to each other. In this way, selecting images of smaller regions as a pair composed of input data and ground truth as the rectangular regions, a large amount of pair data can be generated from the OCTA image 301 and the high quality OCTA image 302 constituting the original pair. Consequently, the time required for training the machine learning model can be shortened.

Next, as one example of a learned model according to the present embodiment, a convolutional neural network (CNN) that performs image quality improving processing with respect to an input tomographic image is described referring to FIG. 4. FIG. 4 illustrates an example of a configuration 401 of a learned model which the image quality improving unit 224 uses.

The learned model illustrated in FIG. 4 is constituted by a plurality of layer groups that are responsible for processing to process an input value group for output. Note that, the types of layers included in the configuration 401 of the learned model are a convolutional layer, a downsampling layer, an upsampling layer, and a merging layer.

The convolutional layer is a layer that performs convolutional processing with respect to an input value group according to parameters such as the kernel size of the filters, the number of filters, the value of a stride, and the dilation value which are set. Note that, the number of dimensions of the kernel size of the filter may be changed according to the number of dimensions of an input image.

The downsampling layer is a layer that performs processing for making the number of output value groups less than the number of input value groups by thinning out or combining the input value groups. Specifically, for example, max pooling processing is available as such processing.

The upsampling layer is a layer that performs processing for making the number of output value groups greater than the number of input value groups by duplicating an input value group or adding a value interpolated from an input value group. Specifically, for example, linear interpolation processing is available as such processing.

The merging layer is a layer that performs processing that inputs, from a plurality of sources, value groups such as an output value group of a certain layer or a pixel value group constituting an image, and merges the value groups by concatenating or adding the value groups.

Note that, as parameters that are set for convolutional layer groups included in the configuration 401 illustrated in FIG. 4, it is possible to perform image quality improving processing of a certain accuracy by, for example, setting the kernel size of the filters to a width of three pixels and a height of three pixels, and the number of filters to 64. However, it is necessary to pay attention in this regard because if the settings of parameters with respect to layer groups and node groups constituting a neural network differ, in some cases the degrees to which a tendency trained based on training data is reproducible in the output data will differ. In other words, in many cases, the appropriate parameters will differ according to the form at the time of implementation, and therefore parameters can be changed to preferable values as needed.

Further, there are also cases where the CNN can obtain better characteristics by changing the configuration of the CNN, and not just by using a method that changes parameters as described above. The term "better characteristics" refers to, for example, the accuracy of image quality improving processing increasing, the time taken for image quality improving processing becoming shorter, and the time required for training of the machine learning model becoming shorter.

Although not illustrated in the drawings, as a modification of the configuration of the CNN, for example, a batch normalization layer or an activation layer that uses a rectifier linear unit may be incorporated after the convolutional layer or the like.

When data is input to a learned model of a machine learning model of this kind, data in accordance with the design of the machine learning model is output. For example, output data is output that has a high probability of corresponding to the input data in accordance with a tendency for which the machine learning model was trained using training data. In the case of the learned model according to the present embodiment, when the OCTA image 301 is input, the high quality OCTA image 302 is output in accordance with a tendency for which the machine learning model was trained using training data.

Note that, in a case where learning is performed in a manner in which images are divided into regions, the learned model outputs rectangular region images that are high quality OCTA images corresponding to the respective rectangular regions. In this case, first, the image quality improving unit 224 divides the OCTA image 301 that is the input image into a rectangular region image group based on the image size when performing learning, and inputs the group of divided rectangular region images into the learned model. Thereafter, the image quality improving unit 224 arranges the respective images of a group of rectangular region images that are high quality OCTA images output from the learned model, according to the same positional relationship as that of the respective images of the rectangular region image group that was input to the learned model, and combines the rectangular region images. By this means, the image quality improving unit 224 can generate a high quality OCTA image 302 corresponding to the input OCTA image 301.

Figure 5:
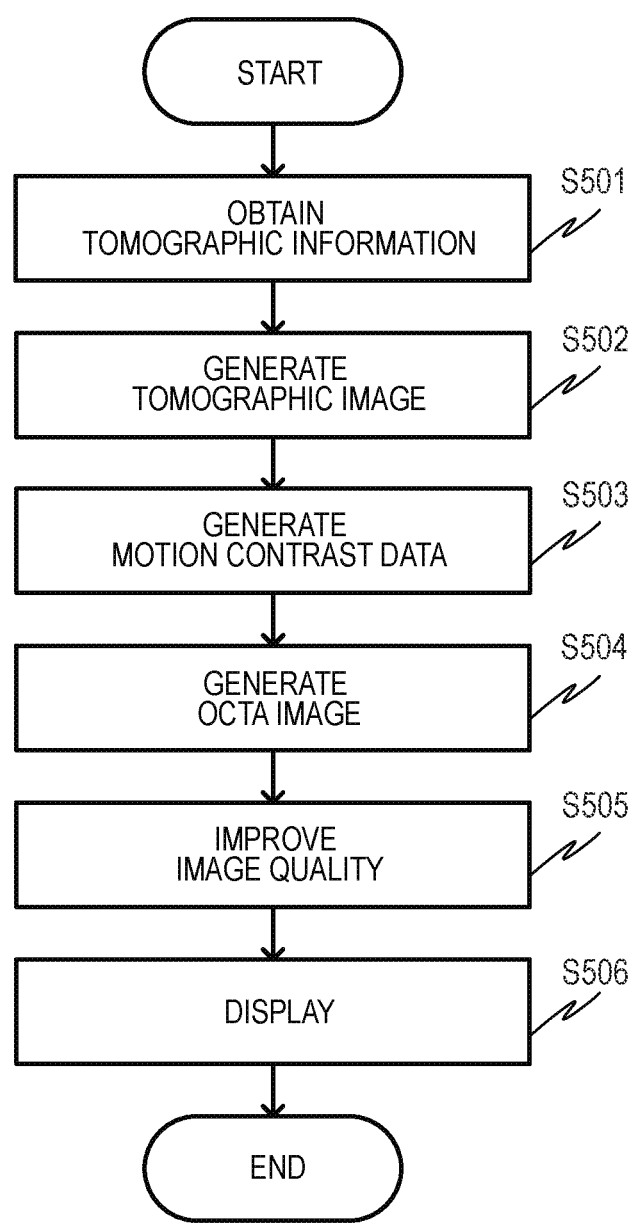
FIG. 5 is a flowchart of a series of image processing operations according to Embodiment 1.

Next, a series of image processing operations according to the present embodiment will be described referring to FIG. 5 to FIG. 7. FIG. 5 is a flowchart illustrating the series of image processing operations according to the present embodiment.

First, in step S501, the obtaining unit 210 obtains a plurality of items of three-dimensional tomographic information obtained by imaging the eye to be examined E a plurality of times. The obtaining unit 210 may obtain the tomographic information of the eye to be examined E using the OCT imaging unit 100, or may obtain the tomographic information from the storage 240 or another apparatus that is connected to the controlling unit 200.

Here, a case where tomographic information of the eye to be examined E is obtained by using the OCT imaging unit 100 will be described. First, the operator has the patient who is the subject sit down in front of the scanning optical system 150, performs alignment, inputs patient information into the controlling unit 200 or the like, and thereafter starts the OCT imaging. The drive controlling unit 230 of the controlling unit 200 drives the galvanometer mirror of the scanning unit 152 to scan approximately the same location of the eye to be examined a plurality of times and thereby obtains a plurality of items of tomographic information (interference signals) at approximately the same location of the eye to be examined. Thereafter, the drive controlling unit 230 slightly drives the galvanometer mirror of the scanning unit 152 in the sub-scanning direction orthogonal to the main scanning direction, and obtains a plurality of items of tomographic information at another location (adjacent scanning line) of the eye to be examined E. By repeating this control, the obtaining unit 210 obtains a plurality of items of three-dimensional tomographic information in a predetermined range of the eye to be examined E.

Next, in step S502, the tomographic image generating unit 221 generates a plurality of three-dimensional tomographic images based on the obtained plurality of items of three-dimensional tomographic information. Note that, in a case where, in step S501, the obtaining unit 210 obtains a plurality of three-dimensional tomographic images from the storage 240 or another apparatus that is connected to the controlling unit 200, step S502 can be omitted.

In step S503, the motion contrast generating unit 222 generates three-dimensional motion contrast data (a three-dimensional motion contrast image) based on the plurality of three-dimensional tomographic images. Note that, the motion contrast generating unit 222 may obtain a plurality of items of motion contrast data based on three or more tomographic images acquired with respect to approximately the same location, and generate an average value of the plurality of items of motion contrast data as final motion contrast data. Note that, in a case where, in step S501, the obtaining unit 210 obtains three-dimensional motion contrast data from the storage 240 or another apparatus that is connected to the controlling unit 200, step S502 and step S503 can be omitted.

In step S504, with respect to the three-dimensional motion contrast data, the en-face image generating unit 223 generates an OCTA image according to an instruction from the operator or based on a predetermined en-face image generation range. Note that, in a case where, in step S501, the obtaining unit 210 obtains an OCTA image from the storage 240 or another apparatus that is connected to the controlling unit 200, step S502 to step S504 can be omitted.

In step S505, the image quality improving unit 224 performs image quality improving processing on the OCTA image using the learned model. The image quality improving unit 224 inputs the OCTA image into the learned model, and generates a high quality OCTA image based on the output from the learned model Note that, in a case where the learned model has performed learning in a manner in which images are divided into regions, the image quality improving unit 224 first divides the OCTA image that is the input image into a rectangular region image group based on the image size at the time of learning, and inputs the group of divided rectangular region images into the learned model. Thereafter, the image quality improving unit 224 arranges the respective images of a group of rectangular region images that are high quality OCTA images output from the learned model, according to the same positional relationship as that of the respective images of the rectangular region image group that was input to the learned model, and combines the rectangular region images to thereby generate a final high quality OCTA image.

In step S506, the display controlling unit 250 causes the display unit 270 to switch from displaying the original OCTA image (first image) to displaying the high quality OCTA image (second image) generated by the image quality improving unit 224. As described above, in image quality improving processing that uses a machine learning model, in some cases a blood vessel that does not actually exist is visualized in an OCTA image or a blood vessel that originally exists is not visualized in the OCTA image. In this regard, by the display controlling unit 250 causing the display unit 270 to switch from displaying the original OCTA image to displaying the generated high quality OCTA image, a determination as to whether a blood vessel is a blood vessel that was newly generated by image quality improving processing or is a blood vessel that also existed in the original image can be facilitated. When the display processing by the display controlling unit 250 ends, the series of image processing operations ends.

Figure 6A:
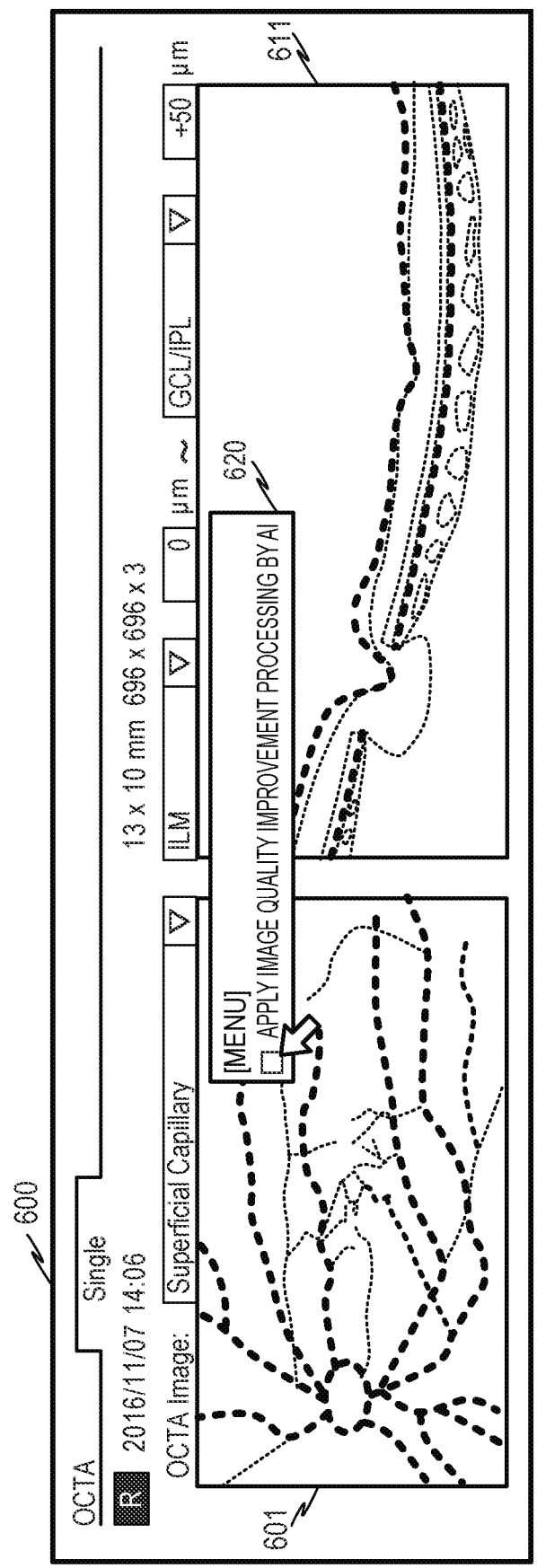
FIG. 6A is a view illustrating an example of a report screen that switches between and displays images obtained before and after image quality improving processing.
Figure 6B:
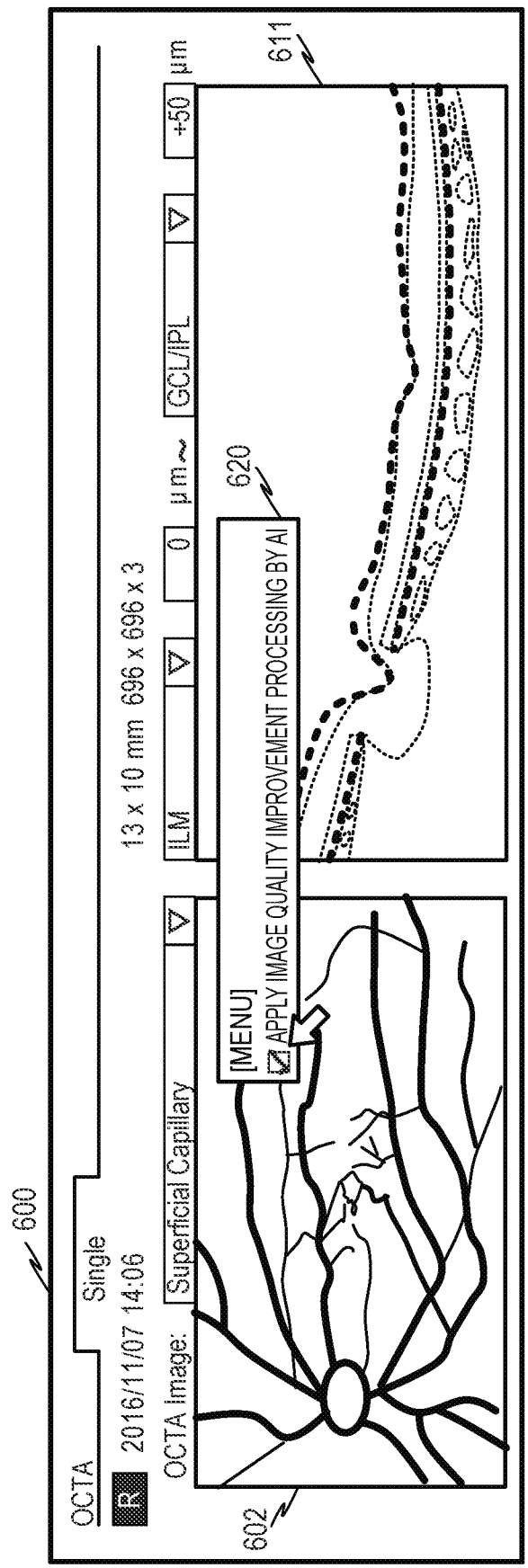
FIG. 6B is a view illustrating an example of a report screen that switches between and displays images obtained before and after image quality improving processing.
Figure 7:
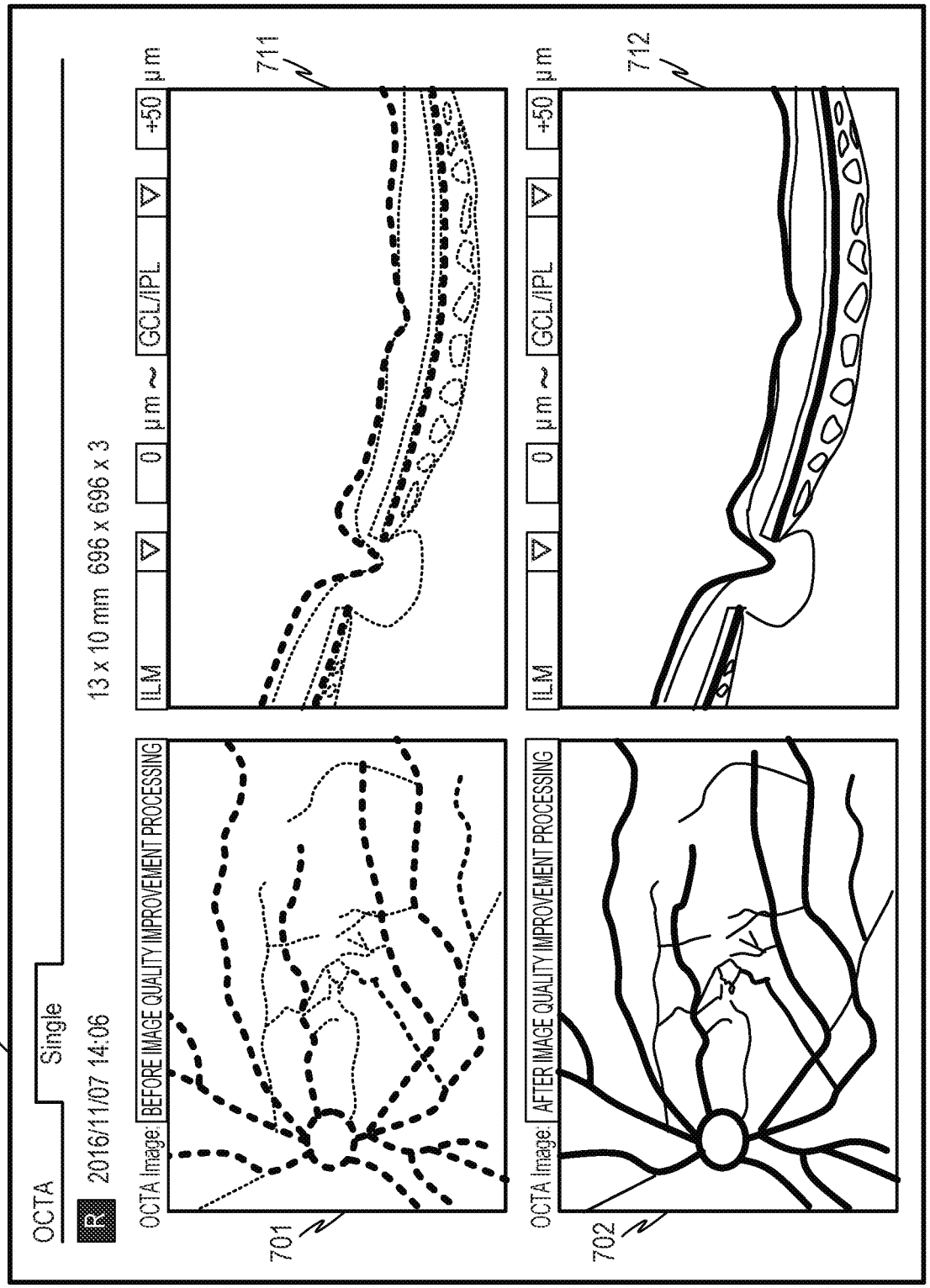
FIG. 7 is a view illustrating an example of a report screen on which images obtained before and after image quality improving processing are juxtaposed and displayed.

Next, the method for operating the controlling unit 200 is described referring to FIG. 6A to FIG. 7. FIG. 6A and FIG. 6B illustrate an example of a report screen that switches between and displays images before and after image quality improving processing. A tomographic image 611 and an OCTA image 601 before image quality improving processing are illustrated on a report screen 600 illustrated in FIG. 6A. The tomographic image 611 and an OCTA image 602 (high quality OCTA image) after image quality improving processing are illustrated on the report screen 600 illustrated in FIG. 6B.

On the report screen 600 illustrated in FIG. 6A, when the operator uses the mouse as one example of the inputting unit 260 and presses the right button of the mouse over the OCTA image 601, a pop-up menu 620 for selecting whether or not to perform image quality improving processing is displayed. When the operator selects to perform image quality improving processing on the pop-up menu 620, the image quality improving unit 224 executes image quality improving processing with respect to the OCTA image 601.

As illustrated in FIG. 6B, the display controlling unit 250 then causes the display on the report screen 600 to switch from displaying the OCTA image 601 before performing image quality improving processing to displaying the OCTA image 602 after performing the image quality improving processing. Note that, it is also possible to open the pop-up menu 620 by pressing the right button of the mouse over the OCTA image 602 once again, and to cause the display to switch to displaying the OCTA image 601 before performing the image quality improving processing.

Note that, although an example has been described in which switching between displaying images before and after image quality improving processing is performed by using the pop-up menu 620 that is displayed according to an operation in which the operator presses the right button of the mouse, apart from a pop-up menu, any other method may also be performed as a method for switching images. For example, switching of images may also be performed using a button provided on the report screen (for example, a button 3420 illustrated in FIG. 18, FIG. 20A and FIG. 20B), a pull-down menu, a radio button, a check box or a keyboard operation. In addition, switching of a displayed image may be performed by operation of a mouse wheel or a touch operation on a touch panel display.

The operator can arbitrarily switch between displaying the OCTA image 601 before performing the image quality improving processing and the OCTA image 602 after performing the image quality improving processing by the above method. Therefore, the operator can easily view and compare the OCTA images before and after the image quality improving processing, and can easily confirm a change between the OCTA images that was caused by the image quality improving processing. Accordingly, the operator can easily identify a blood vessel that does not actually exist which was visualized in the OCTA image by the image quality improving processing or that a blood vessel which originally existed has disappeared from the OCTA image due to the image quality improving processing, and can easily determine the authenticity of tissue visualized in the images.

Note that, although in the aforementioned display method the images before and after image quality improving processing are switched and displayed, a similar effect can be obtained by displaying these images in a juxtaposed or superimposed manner. FIG. 7 illustrates an example of a report screen in a case where images before and after image quality improving processing are displayed in a juxtaposed manner. On a report screen 700 illustrated in FIG. 7, an OCTA image 701 before image quality improving processing and an OCTA image 702 after image quality improving processing are displayed in a juxtaposed manner.

In this case also, the operator can easily view and compare the images before and after image quality improving processing, and can easily confirm a change between the images that was caused by the image quality improving processing. Therefore, the operator can easily identify a blood vessel that does not actually exist which was visualized in the OCTA image by the image quality improving processing or that a blood vessel which originally existed has disappeared from the OCTA image due to the image quality improving processing, and can easily determine the authenticity of tissue visualized in the images. Note that, in the case of displaying the images before and after image quality improving processing in a superimposed manner, the display controlling unit 250 can set a degree of transparency with respect to at least one image among the images before and after image quality improving processing, and cause the images before and after image quality improving processing to be displayed in a superimposed manner on the display unit 270.

Further, as described above, the image quality improving unit 224 may also perform image quality improving processing using a learned model on a tomographic image or an intensity en-face image, and not just an OCTA image. In such case, as a pair of the training data of the learned model, a pair can be used in which a tomographic image or intensity en-face image before averaging is adopted as input data, and a tomographic image or intensity en-face image after averaging is adopted as ground truth. Note that, in this case, the learned model may be a single learned model which performed learning using training data such as an OCTA image or a tomographic image, or a plurality of learned models which performed learning for respective kinds of images may be used as learned models. In a case where a plurality of learned models are used, the image quality improving unit 224 can use a learned model corresponding to the kind of image that is the object to perform the image quality improving processing. Note that, the image quality improving unit 224 may perform image quality improving processing using a learned model with respect to a three-dimensional motion contrast image or a three-dimensional tomographic image, and the training data in this case can also be prepared in the same manner as described above.

In FIG. 7, a tomographic image 711 before image quality improving processing and a tomographic image 712 after image quality improving processing are displayed in a juxtaposed manner. Note that, the display controlling unit 250 may cause the tomographic images or intensity en-face images before and after image quality improving processing to be switched and displayed on the display unit 270, similarly to the OCTA, images before and after image quality improving processing that are illustrated in FIG. 6A and FIG. 6B. Further, the display controlling unit 250 may cause the tomographic images or intensity en-face images before and after image quality improving processing to be displayed in a superimposed manner on the display unit 270. In these cases also, the operator can easily view and compare the images before and after the image quality improving processing, and can easily confirm a change between the images caused by the image quality improving processing. Therefore, the operator can easily identify tissue that does not actually exist which was visualized in the image by the image quality improving processing or that tissue which originally existed has disappeared from the image due to the image quality improving processing, and can easily determine the authenticity of tissue visualized in the images.

As described above, the controlling unit 200 according to the present embodiment includes the image quality improving unit 224 and the display controlling unit 250. The image quality improving unit 224 generates, from a first image of an eye to be examined, a second image subjected to at least one of noise reduction and contrast enhancement compared to the first image, using a learned model. The display controlling unit 250 causes the first image and the second image to be switched, juxtaposed or superimposed and displayed on the display unit 270. Note that, the display controlling unit 250 can switch between the first image and the second image and display the relevant switched image on the display unit 270 according to an instruction from the operator.

By this means, the controlling unit 200 can generate a high quality image in which noise is reduced and/or contrast is enhanced from a source image. Therefore, the controlling unit 200 can generate an image that is more suitable for image diagnosis in comparison to the conventional technology, such as a clearer image or an image in which a site or lesion that it is desired to observe is enhanced.

Further, the operator can easily view and compare the images before and after the image quality improving processing, and can easily confirm a change between the images caused by the image quality improving processing. Therefore, the operator can easily identify tissue that does not actually exist which was visualized in the image by the image quality improving processing or that tissue which originally existed has disappeared from the image due to the image quality improving processing, and can easily determine the authenticity of tissue visualized in the images.

Although an averaged image is used as the ground truth of the training data for the learned model according to the present embodiment, the training data is not limited thereto. For example, a high quality image obtained by performing maximum a posteriori processing (MAP estimation processing) with respect to a source image group may be used as ground truth of the training data. In MAP estimation processing, a likelihood function is obtained based on the probability density of each pixel value in a plurality of images, and a true signal value (pixel value) is estimated using the obtained likelihood function.

A high quality image obtained by MAP estimation processing is a high contrast image that is based on pixel values that are close to the true signal values. Further, since the estimated signal values are determined based on the probability density, randomly generated noise is reduced in a high quality image obtained by MAP estimation processing. Therefore, by using a high quality image obtained by MAP estimation processing as training data, the learned model can generate, from an input image, a high quality image that is suitable for image diagnosis in which noise is reduced and which has high contrast. Note that, with regard to the method for generating a pair of input data and ground truth of the training data, a method that is similar to a case where an averaged image is used as training data may be performed.

Further, as ground truth of the training data, a high quality image obtained by applying smoothing filter processing to a source image may be used. In this case, the learned model can generate a high quality image in which random noise is reduced from an input image. In addition, an image obtained by applying gradation conversion processing to a source image may also be used as ground truth of the training data.

In this case, the learned model can generate a high quality image with enhanced contrast from an input image. Note that, with regard to the method for generating a pair of input data and ground truth of the training data, a method that is similar to a case where an averaged image is used as training data may be performed.

Note that, the input data of the training data may be an image obtained from an imaging apparatus having the same image quality tendency as the OCT imaging unit 100. Further, the ground truth of the training data may be a high quality image obtained by high-cost processing such as processing using the method of successive approximation, or may be a high quality image obtained by imaging an object under examination corresponding to the input data using an imaging apparatus with higher performance than the OCT imaging unit 100. In addition, the ground truth may be a high quality image obtained by performing rule-based noise reduction processing that is based on the structure of the object under examination or the like. Here, the noise reduction processing can include, for example, processing that replaces a high intensity pixel that is only one pixel which is clearly noise that appears in a low intensity region with the average value of neighboring low-intensity pixel values. Thus, as training data, the learned model may adopt an image imaged by an imaging apparatus with higher performance than the imaging apparatus used to image an input image, or an image obtained by an imaging process that involves a greater number of processes than the imaging process used to obtain the input image.

Note that, although it has been described that the image quality improving unit 224 generates a high quality image in which noise is reduced or contrast is enhanced by using a learned model, image quality improving processing by the image quality improving unit 224 is not limited thereto. It suffices that, as described above, the image quality improving unit 224 can generate an image with image quality that is more suitable for image diagnosis by image quality improving processing.

Further, in the case of causing images before and after image quality improving processing to be displayed in a juxtaposed manner on the display unit 270, in accordance with an instruction from the operator, the display controlling unit 250 max enlarge and display any of the images among the images before and after image quality improving processing that are being displayed in a juxtaposed manner on the display unit 270. More specifically, for example, on the report screen 700 illustrated in FIG. 7, if the operator selects the OCTA image 701, the display controlling unit 250 can enlarge and display the OCTA image 701 on the report screen 700. Further, if the operator selects the OCTA image 702 after image quality improving processing, the display controlling unit 250 can enlarge and display the OCTA image 702 on the report screen 700, in this case, an image that the operator wishes to observe among the images before and after image quality improving processing can be observed in more detail by the operator.

In addition, in a case where the generation range of an en-face image such as an OCTA image is changed according to an instruction of the operator, the controlling unit 200 may change the display from the images that are being displayed in a juxtaposed manner to an image that is based on the changed generation range and an image that was subjected to image quality improving. More specifically, when the operator changes the en-face image generation range through the inputting unit 260, the en-face image generating unit 223 generates an en-face image before image quality improving processing based on the changed generation range. The image quality improving unit 224 generates a high quality en-face image from the en-face image that was newly generated by the en-face image generating unit 223, using a learned model. Thereafter, the display controlling unit 250 causes the display unit 270 to change from displaying the en-face images before and after image quality improving processing that are being displayed in a juxtaposed manner to displaying the newly generated en-face images before and after image quality improving processing. In such a case, while the operator arbitrarily changes the range in the depth direction that the operator desires to observe, the operator can observe en-face images before and after image quality improving processing based on the changed range in the depth direction.

(Modification 1)

As described above, in an image on which image quality improving processing was performed using a learned model, tissue that does not actually exist may be visualized, or tissue that originally exists may not be visualized. Therefore, a misdiagnosis may occur due to an operator performing an image diagnosis based on such an image. Therefore, when displaying an OCTA image or tomographic image or the like after image quality improving processing on the display unit 270, the display controlling unit 250 may also display information to the effect that the image in question is an image on which image quality improving processing was performed using a learned model. In this case, the occurrence of a misdiagnosis by the operator can be suppressed. Note that, the display form may be any form as long as the form is such that it can be understood that the image is a high quality image obtained using a learned model.

(Modification 2)

In Embodiment 1, an example was described in which image quality improving processing is applied to an OCTA image or a tomographic image or the like obtained by one round of imaging (examination). In this regard, image quality improving processing using a learned model can also be applied to a plurality of OCTA images or tomographic images or the like obtained by performing imaging (examination) a plurality of times. In Modification 2, a configuration in which images obtained by applying image quality improving processing using a learned model to a plurality of OCTA images or tomographic images or the like are displayed simultaneously is described referring to FIG. 8A and FIG. 8B.

Figure 8A:
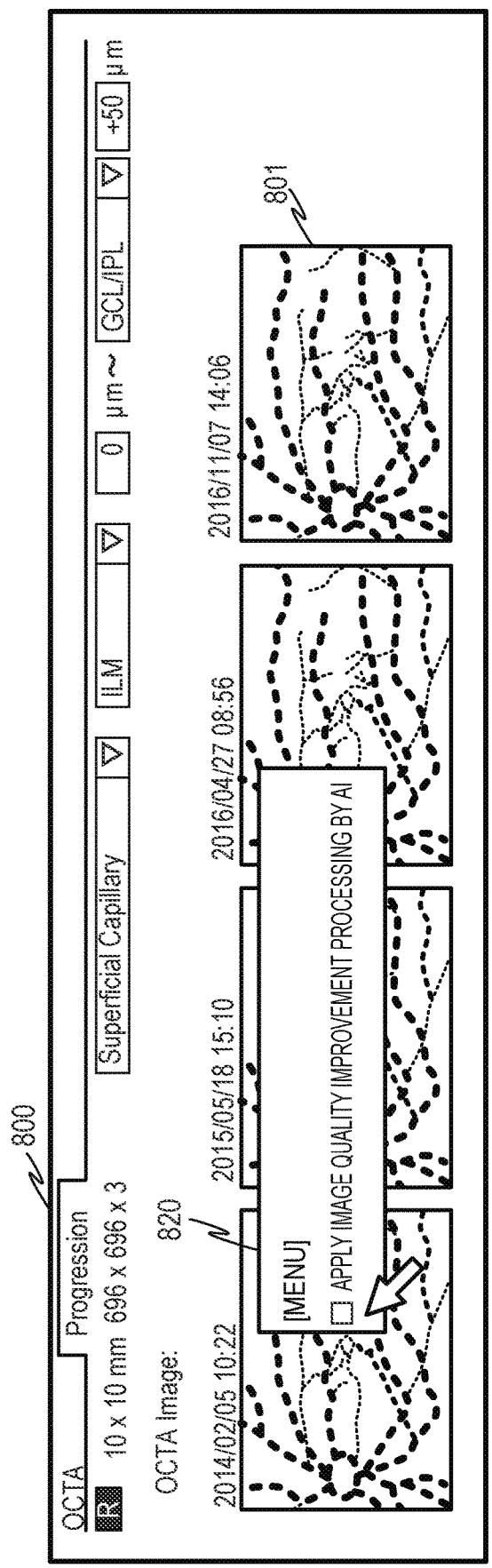
FIG. 8A is a view illustrating an example of a report screen on which a plurality of images to which image quality improving processing was applied are displayed simultaneously.
Figure 8B:
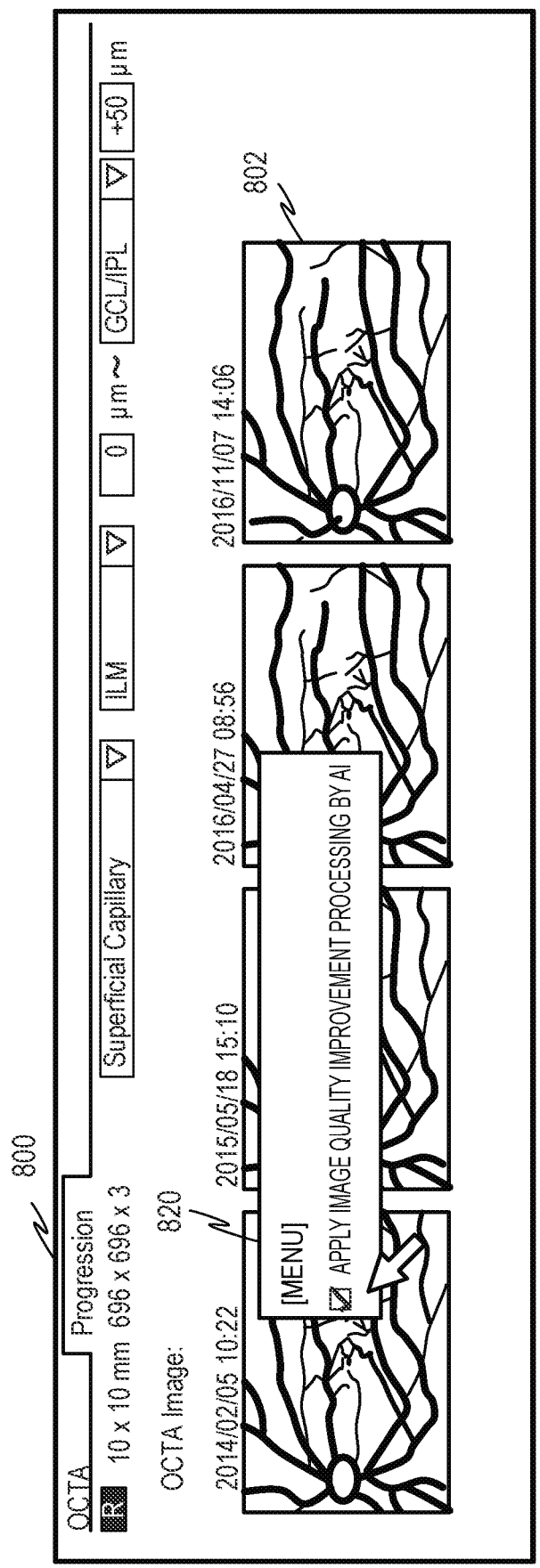
FIG. 8B is a view illustrating an example of a report screen on which a plurality of images to which image quality improving processing was applied are displayed simultaneously.

FIG. 8A and FIG. 8B each illustrate an example of a time-series report screen for displaying a plurality of OCTA images obtained by imaging the same eye to be examined a plurality of times over time. On a report screen 800 illustrates in FIG. 8A, a plurality of OCTA images 801 before performing image quality improving processing are displayed side by side in chronological order. The report screen 800 also includes a pop-up menu 820, and it is possible for the operator to select whether or not to apply image quality improving processing by operating the pop-up menu 820 through the inputting unit 260.

If the operator selects to apply image quality improving processing, the image quality improving unit 224 applies image quality improving processing using a learned model to all of the OCTA images that are being displayed. Subsequently, as illustrated in FIG. 8B, the display controlling unit 250 switches from displaying the plurality of OCTA images 801 that were being displayed to displaying a plurality of OCTA images 802 after performing image quality improving processing.

Further, if the operator selects not to apply image quality improving processing on the pop-up menu 820, the display controlling unit 250 switches from displaying the plurality of OCTA images 802 after image quality improving processing that were being displayed to displaying the plurality of OCTA images 801 before image quality improving processing.

Note that, in the present modification an example has been described in which a plurality of OCTA images obtained before and after image quality improving processing using a learned model are simultaneously switched and displayed. However, a plurality of tomographic images or intensity en-face images or the like obtained before and after image quality improving processing using a learned model may be simultaneously switched and displayed. Note that, the operation method is not limited to a method that uses the pop-up menu 820, and any operation method may be adopted such as a method that uses a button, a pull-down menu, a radio button or a check box provided on the report screen, or an operation with respect to a keyboard, a mouse wheel or a touch panel.

Embodiment 2

A learned model outputs output data that has a high probability of corresponding to the input data according to a learning tendency. In this regard, when the learned model performs learning using a group of images having a similar image quality tendency to each other as training data, an image that underwent image quality improving more effectively can be output with respect to an image that has the similar tendency in question. Therefore, in Embodiment 2, image quality improving processing is performed more effectively by performing the image quality improving processing by means of a plurality of learned models that underwent learning using training data constituted by pair groups that were grouped for each imaging condition such as the imaged site or for each en-face image generation range.

Figure 9:
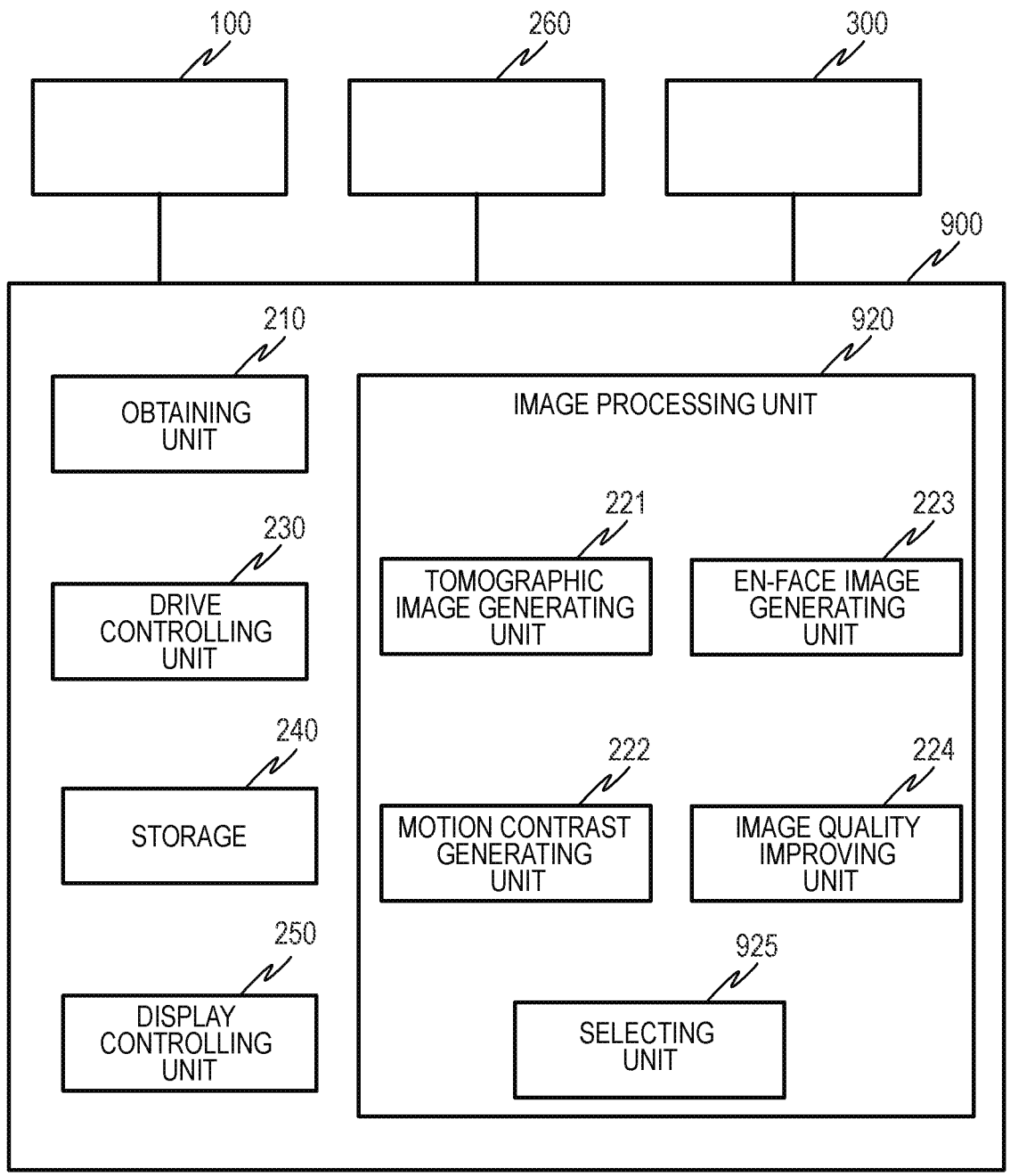
FIG. 9 is a view illustrating a schematic configuration of a controlling unit according to Embodiment 2.
Figure 10:
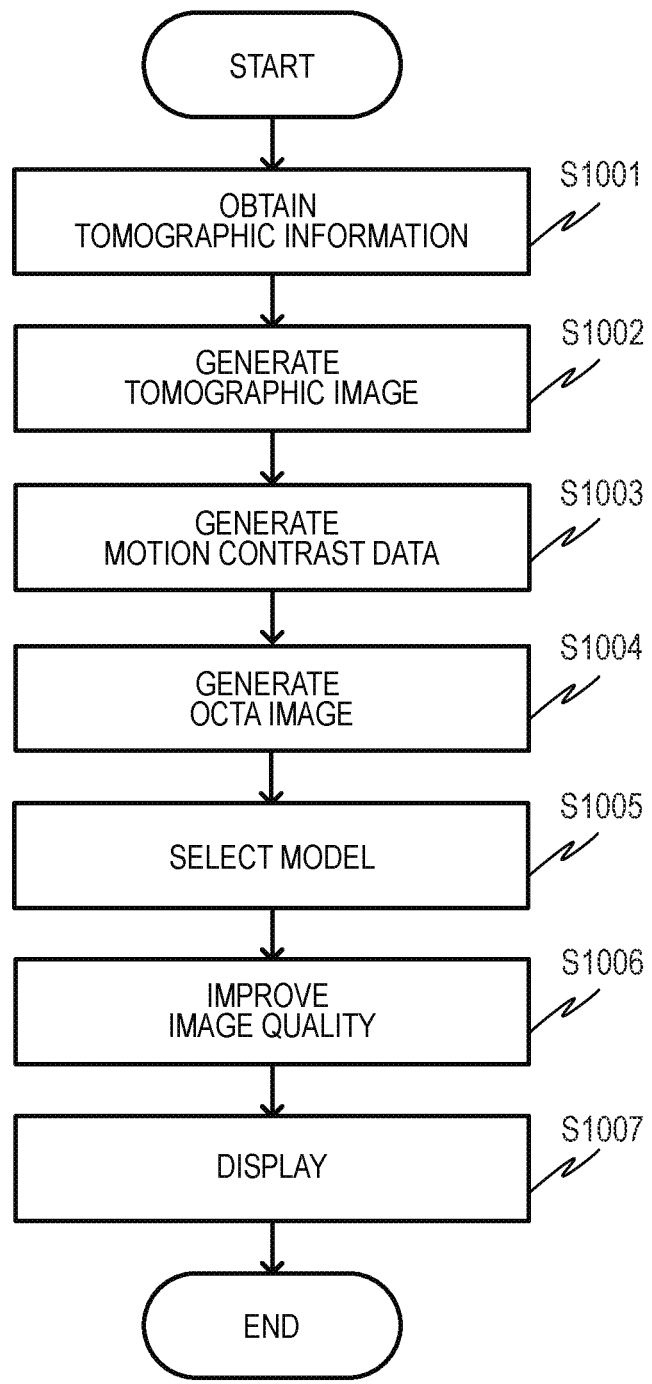
FIG. 10 is a flowchart of a series of image processing operations according to Embodiment 2.

Hereunder, an OCT apparatus according to the present embodiment is described referring to FIG. 9 and FIG. 10. Note that, since a configuration of the OCT apparatus according to the present embodiment is the same as the configuration of the OCT apparatus 1 according to Embodiment 1 with the exception of the controlling unit, components that are the same as components illustrated in FIG. 1 are denoted by the same reference numerals as in Embodiment 1, and a description of the components is omitted hereunder. Hereunder, the OCT apparatus according to the present embodiment is described centering on differences from the OCT apparatus 1 according to Embodiment 1.

FIG. 9 illustrates a schematic configuration of a controlling unit 900 according to the present embodiment. Note that, apart from an image processing unit 920 and a selecting unit 925, the components of the controlling unit 900 according to the present embodiment are the same as the respective components of the controlling unit 200 according to Embodiment 1. Therefore, components that are the same as components illustrated in FIG. 2 are denoted by the same reference numerals as in Embodiment 1, and a description of the components is omitted hereunder.

In addition to the tomographic image generating unit 221, the motion contrast generating unit 222, the en-face image generating unit 223 and the image quality improving unit 224, the selecting unit 925 is also provided in the image processing unit 970 of the controlling unit 900.

The selecting unit 925 selects a learned model to be used by the image quality improving unit 224 from among a plurality of learned models, based on an en-face image generation range or an imaging condition of an image on which image quality improving processing is to be performed by the image quality improving unit 224. The image quality improving unit 224 performs image quality improving processing on a target OCTA image or tomographic image or the like using the learned model selected by the selecting unit 925, and generates a high quality OCTA image or a high quality tomographic image.

Next, the plurality of learned models according to the present embodiment will be described. As mentioned above, a learned model outputs output data that has a high probability of corresponding to the input data in accordance with a learning tendency. In this regard, when the learned model performs learning using a group of images having a similar image quality tendency to each other as training data, an image that underwent image quality improving more effectively can be output with respect to an image that has the similar tendency in question. Therefore, in the present embodiment, a plurality of learned models are prepared that underwent learning using training data composed of pair groups that were grouped according to imaging conditions including conditions such as an imaged site, imaging system, imaged region, imaging angle of view, scanning density and image resolution or for each en-face image generation range.

More specifically, for example, a plurality of learned models such as a learned model for which OCTA images in which the macular area was set as the imaged site were adopted as training data, and a learned model for which OCTA images in which the optic nerve head was set as the imaged site were adopted as training data are prepared. Note that, the macular area and the optic nerve head are each one example of an imaged site, and other imaged sites may be included. Further, a learned model for which OCTA images for each specific imaged region of an imaged site such as the macular area or the optic nerve head were adopted as training data may be prepared.

Further, for example, visualization of structures such as a blood vessel that are visualized in an OCTA image differs significantly between a case where the retina is imaged with a wide angle of view and low density, and a case where the retina is imaged with a narrow angle of view and high density. Therefore, learned models that performed learning for each set of training data according to an imaging angle of view and a scanning density may be prepared. In addition, examples of imaging systems include an SD-OCT imaging system and an SS-OCT imaging system, and the image quality, the imaging range, and the penetration depth in the depth direction and the like differ according to the differences between these imaging systems. Therefore, learned models that performed learning using training data in accordance with respective kinds of imaging systems may be prepared.

Further, normally it is rare to generate an OCTA image in which blood vessels of all layers of the retina are extracted at once, and it is common to generate an OCTA image in which only blood vessels present in a predetermined depth range are extracted. For example, with respect to depth ranges such as a shallow layer, a deep layer and an outer layer of the retina, and a shallow choroidal layer, OCTA images are generated in which blood vessels are extracted in the respective depth ranges. On the other hand, the form of a blood vessel that is visualized in an OCTA image differs greatly depending on the depth range. For example, blood vessels visualized in a shallow layer of the retina form a low-density, thin and clear blood vessel network, while blood vessels visualized in a shallow choroidal layer are visualized with a high density and it is difficult to clearly distinguish individual blood vessels. Therefore, learned models that performed learning using respective sets of training data according to the generation ranges of an en-face image such as an OCTA, image may be prepared.

Although an example in which an OCTA, image is adopted as training data has been described here, similarly to Embodiment 1, in a case of performing image quality improving processing with respect to a tomographic image or an intensity en-face image or the like, these images can be adopted as training data. In such a case, a plurality of learned models that performed learning using respective sets of training data according to imaging conditions or en-face image generation ranges of these images are prepared.

Next, a series of image processing operations according to the present embodiment is described referring to FIG. 10. FIG. 10 is a flowchart illustrating a series of image processing operations according to the present embodiment. Note that, a description regarding processing that is the same as in the series of image processing operations according to Embodiment 1 is omitted as appropriate.

First, in step S1001, similarly to step S501 according to Embodiment 1, the obtaining unit 210 obtains a plurality of items of three-dimensional tomographic information obtained by imaging the eye to be examined E a plurality of times. The obtaining unit 210 may obtain the tomographic information of the eye to be examined E using the OCT imaging unit 100, or may obtain the tomographic information from the storage 240 or another apparatus that is connected to the controlling unit 200.

The obtaining unit 210 also obtains an imaging conditions group relating to the tomographic information. Specifically, the obtaining unit 210 can obtain imaging conditions such as the imaged site and the imaging system when the imaging relating to the tomographic information was performed. Note that, depending on the data format of the tomographic information, the obtaining unit 210 may obtain an imaging conditions group stored in the data structure constituting the data of the tomographic information. Further, in a case where imaging conditions are not stored in the data structure of the tomographic information, the obtaining unit 210 can obtain an imaging information group from a server or database or the like that stores a file in which the imaging conditions are described. Further, the obtaining unit 210 may estimate an imaging information group from an image based on the tomographic information by any known method.

Further, in a case where the obtaining unit 210 obtains a plurality of three-dimensional tomographic images, a plurality of items of three-dimensional motion contrast data, or a plurality of OCTA images or the like, the obtaining unit 210 obtains an imaging conditions group relating to the obtained images or data. Note that, in the case of using only a plurality of learned models that performed learning using respective kinds of training data according to generation ranges of OCTA images or intensity en-face images for image quality improving processing, the obtaining unit 210 need not obtain an imaging conditions group of a tomographic image.

The processing from step S1002 to step S1004 is the same as the processing from step S502 to S504 according to Embodiment 1, and hence a description of the processing is omitted here. Upon the en-face image generating unit 223 generating an OCTA image in step S1004, the processing shifts to step S1005.

In step S1005, the selecting unit 925 selects a learned model to be used by the image quality improving unit 224, based on the imaging conditions group or generation range relating to the generated OCTA image and information pertaining to the training data relating to the plurality of learned models. More specifically, for example, in a case where the imaged site in the OCTA image is the optic nerve head, the selecting unit 925 selects a learned model that performed learning using an OCTA image of the optic nerve head as training data. Further, for example, in a case where the generation range of the OCTA image is a shallow layer of the retina, the selecting unit 925 selects a learned model that performed learning using, as training data, an OCTA image for which a shallow layer of the retina was set as the generation range.

Note that, the selecting unit 925 may select a learned model that performed learning using, as training data, an image having a similar tendency with regard to the image quality, even if the imaging conditions group or generation range relating to the generated OCTA image and the information pertaining to the training data of the learned model do not completely match. In this case, for example, the selecting unit 925 may include a table in which the correlation between imaging condition groups or generation ranges relating to OCTA images and the learned models to be used is described.

In step S1006, the image quality improving unit 224 uses the learned model selected by the selecting unit 925 to perform image quality improving processing on the OCTA image generated in step S1004, to thereby generate a high quality OCTA image. The method for generating the high quality OCTA image is the same as in step S505 according to Embodiment 1, and hence a description thereof is omitted here.

Step S1007 is the same as step S506 according to Embodiment 1, and hence a description thereof is omitted here. When the high quality OCTA image is displayed on the display unit 270 in step S1007, the series of image processing operations according to the present embodiment ends.

As described above, the controlling unit 900 according to the present embodiment includes the selecting unit 925 that selects a learned model to be used by the image quality improving unit 224 from a plurality of learned models. The selecting unit 925 selects a learned model to be used by the image quality improving unit 224 based on a range in the depth direction for generating the OCTA image on which image quality improving processing is to be performed.

For example, the selecting unit 925 can select a learned model based on a display site in an OCTA image to be subjected to image quality improving processing and a range in the depth direction for generating the OCTA image. Further, for example, the selecting unit 925 may select a learned model to be used by the image quality improving unit 224 based on an imaged site including a display site in an OCTA image on which image quality improving processing is to be performed, and a range in the depth direction for generating the OCTA image. In addition, for example, the selecting unit 925 may select a learned model to be used by the image quality improving unit 224 based on an imaging condition of the OCTA image on which image quality improving processing is to be performed.

Therefore, the controlling unit 900 can perform image quality improving processing more effectively by performing the image quality improving processing by means of a plurality of learned models that underwent learning using training data constituted by pair groups that were grouped for each imaging condition or for each en-face image generation range.

Note that, although in the present embodiment an example is described in which the selecting unit 925 selects a learned model based on an imaging condition such as the imaged site or a generation range relating to an OCTA image, a configuration may be adopted so as to change a learned model based on a condition other than the aforementioned conditions. The selecting unit 925, for example, may select a learned model according, to a projection method (maximum intensity projection method or average intensity projection method) when generating an OCTA image or an intensity en-face image, or whether or not artifact removal processing to remove an artifact caused by a blood vessel shadow has been performed. In this case, learned models that performed learning using respective kinds of training data according to projection methods and whether or not artifact removal processing has been performed can be prepared.

(Modification 3)

In Embodiment 2, the selecting unit 925 automatically selects an appropriate learned model according to an imaging condition or a generation range of an en-face image or the like. In this regard, there are also cases where the operator wishes to manually select image quality improving processing to be applied to an image. Therefore, the selecting unit 925 may select a learned model according to an instruction of the operator.

Further, there are also cases where the operator wishes to change the image quality improving processing applied to an image. Therefore, the selecting unit 925 may change the learned model to change the image quality improving processing to be applied to an image according to an instruction of the operator.

Figure 11A:
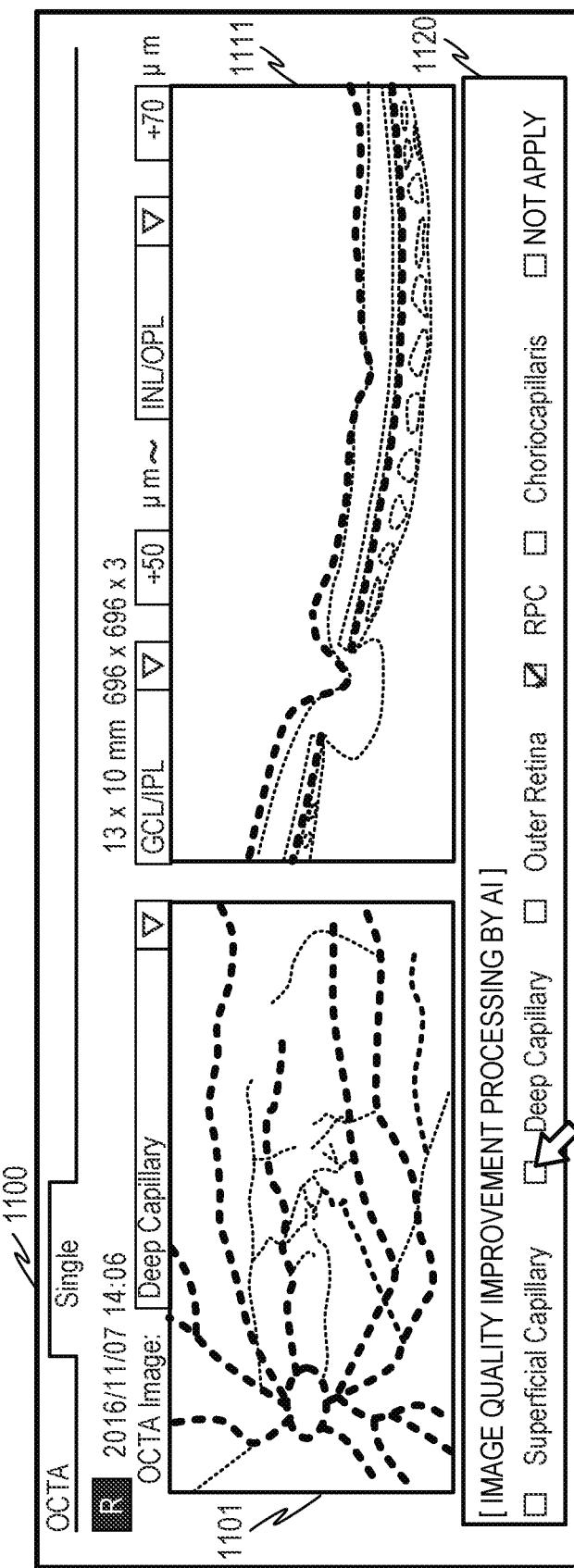
FIG. 11A is a view illustrating an example of changing image quality improving processing.
Figure 11B:
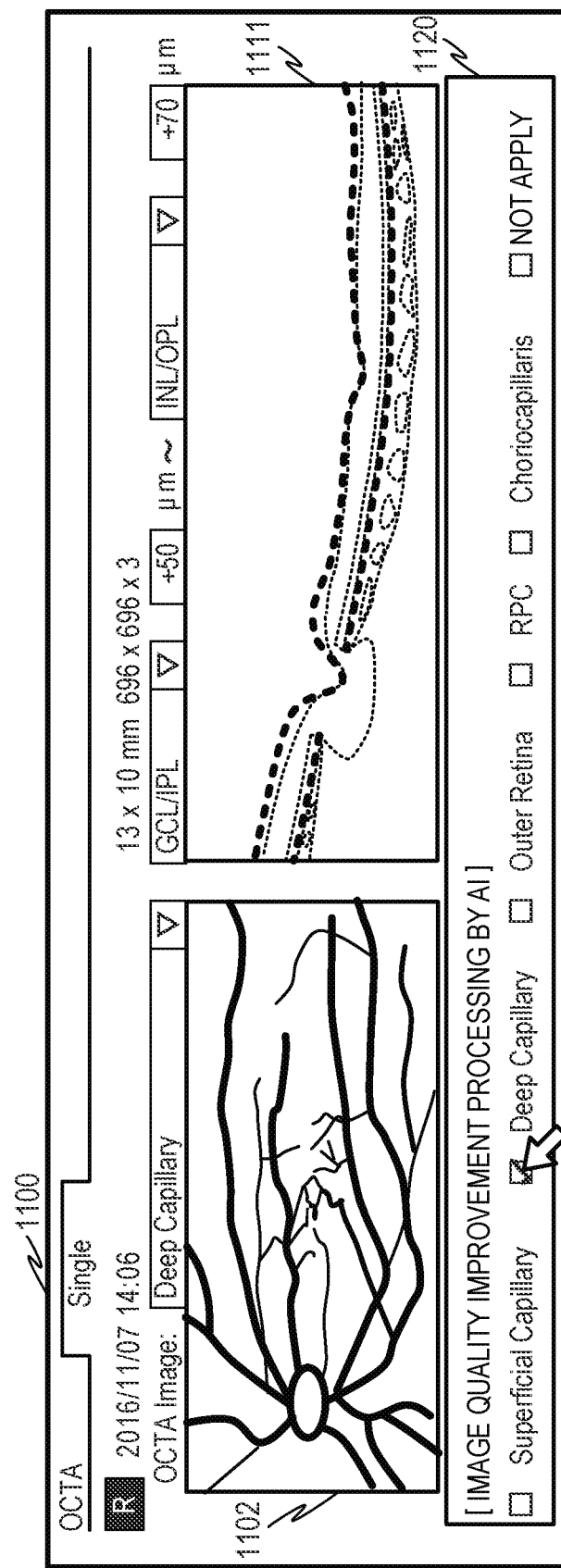
FIG. 11B is a view illustrating an example of changing image quality improving processing.

Hereunder, an operation method when manually changing the image quality improving processing to be applied to an image is described referring to FIG. 11A and FIG. 11B. FIG. 11A and FIG. 11B each illustrate an example of a report screen that switches between and displays images before and after image quality improving processing. On a report screen 1100 illustrated in FIG. 11A, a tomographic image 1111 and an OCTA image 1101 to which image quality improving processing using an automatically selected learned model has been applied are shown. On the report screen 1100 illustrated in FIG. 11B, the tomographic image 1111 and an OCTA image 1102 to which image quality improving processing using a learned model according to an instruction of the operator has been applied are shown. Further, on the report screen 1100 illustrated in FIG. 11A and FIG. 11B, a processing specifying section 1120 for changing the image quality improving processing applied to the OCTA image is shown.

The OCTA image 1101 displayed on the report screen 1100 illustrated in FIG. 11A is an OCTA image in which deep capillaries in the macular area are visualized. On the other hand, the image quality improving processing applied to the OCTA image using a learned model that was automatically selected by the selecting unit 925 is processing suitable for radial peripapillary capillaries (RPC). Therefore, with regard to the OCTA image 1101 displayed on the report screen 1100 illustrated in FIG. 11A, the image quality improving processing that has been applied to the OCTA image is not the optimal processing with respect to the blood vessels extracted in the OCTA image.

Therefore, the operator selects "Deep Capillary" in the processing specifying section 1120 through the inputting unit 260. In response to a selection instruction from the operator, the selecting unit 925 thanes the learned model used by the image quality improving unit 224 to a learned model that performed learning using an OCTA image relating to deep capillaries of the macular area as training data.

The image quality improving unit 224 performs image quality improving processing on the OCTA image once more using the learned model which was changed to by the selecting unit 925. As illustrated in FIG. 11B, the display controlling unit 250 causes the high quality OCTA image 1102 which was newly generated by the image quality improving unit 224 to be displayed on the display unit 270.

Thus, by configuring the selecting unit 925 so as to change a learned model in response to an instruction of the operator, the operator can respecify appropriate image quality improving processing to be performed with respect to the same OCTA image. Further, specification of the image quality improving processing may be performed any number of times.

Here, an example has been illustrated in which the controlling unit 900 is configured so that the image quality improving processing to be applied to an OCTA image can be manually changed. In this regard, the controlling unit 900 may also be configured so that it is possible to manually change the image quality improving processing to be applied to a tomographic image or an intensity en-face image or the like.

Further, although the report screen illustrated in FIG. 11A and FIG. 11B is of a form which switches between and displays images before and after image quality improving processing, the report screen may be of a form which displays images before and after image quality improving processing in a juxtaposed manner or a superimposed manner. In addition, the form of the processing specifying section 1120 is not limited to the form illustrated in FIG. 11A and FIG. 11B, and may be any form which allows an instruction to be issued with respect to image quality improving processing or a learned model. Further, the kinds of image quality improving processing illustrated in FIG. 11A and FIG. 11B are one example, and another kind of image quality improving processing that is in accordance with training data used for a learned model may also be included.

Further, similarly to Modification 2, a plurality of images to which image quality improving processing was applied may be simultaneously displayed. At such time, a configuration may also be adopted so that a specification regarding which image quality improving processing to apply can be made. An example of a report screen in such a case is illustrated in FIG. 12E and FIG. 12B.

Figure 12A:
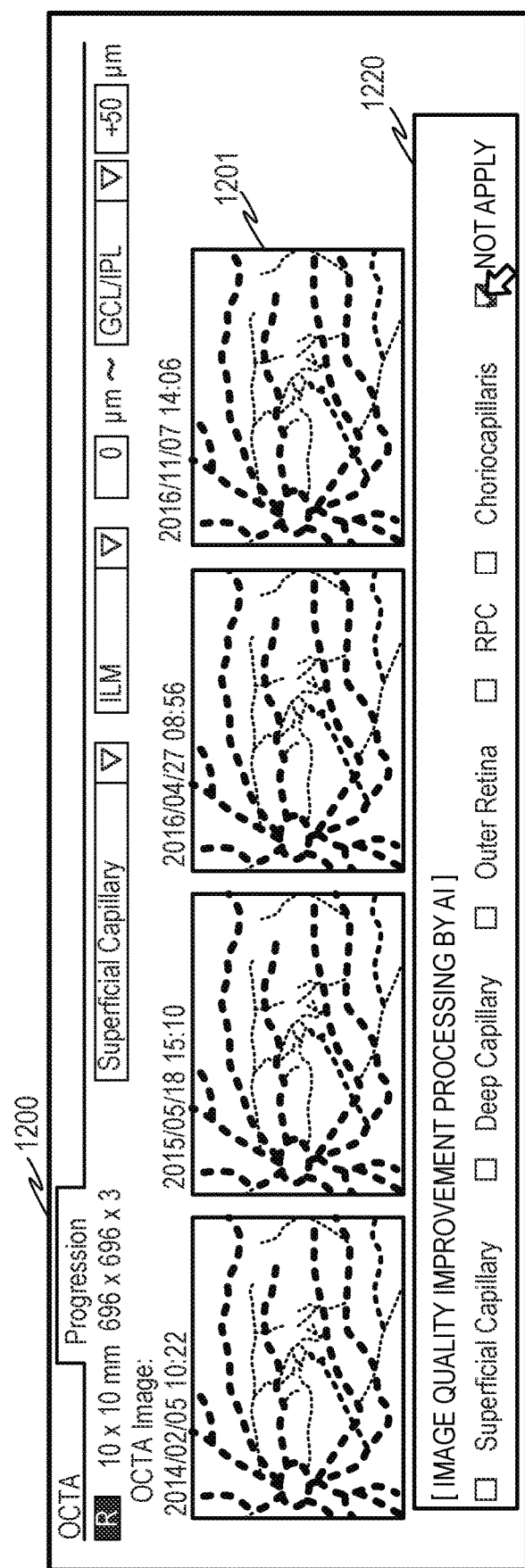
FIG. 12A is a view illustrating an example of a report screen on which a plurality of images to which image quality improving processing was applied are displayed simultaneously.
Figure 12B:
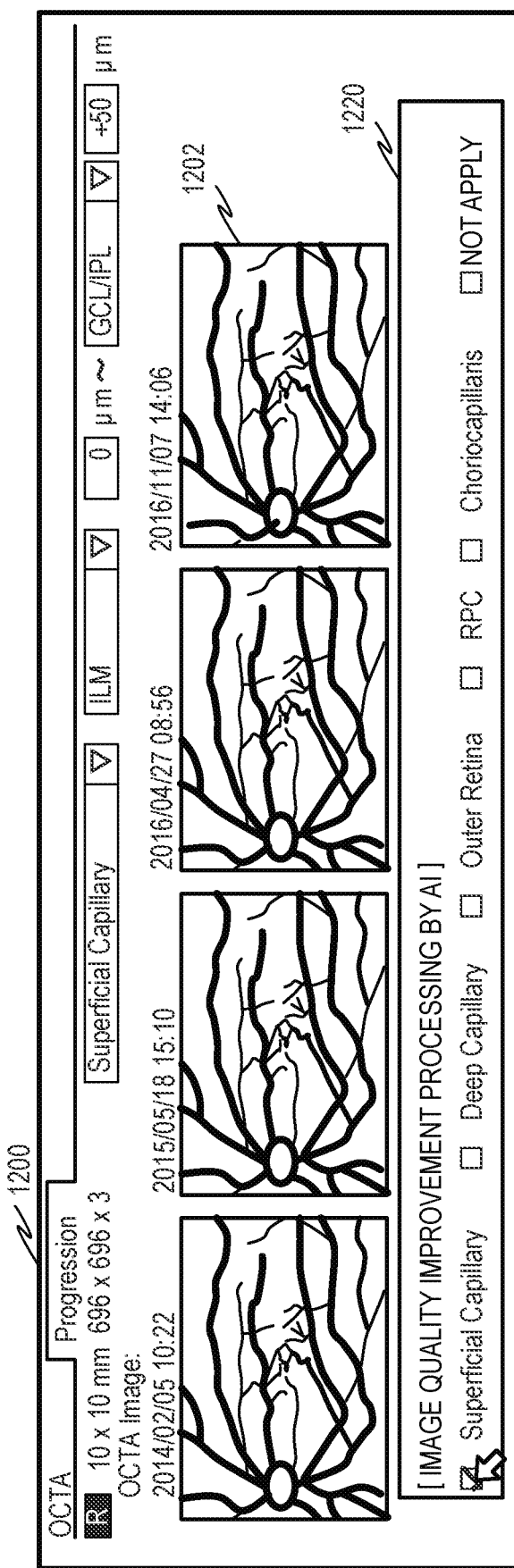
FIG. 12B is a view illustrating an example of a report screen on which a plurality of images to which image quality improving processing was applied are displayed simultaneously.

FIG. 12A and FIG. 12B each illustrate an example of a report screen that switches between and displays a plurality of images before and after image quality improving processing. On a report screen 1200 illustrated in FIG. 12A, OCTA images 1201 before image quality improving processing are shown. On the report screen 1200 illustrated in FIG. 12B, OCTA images 1202 to which image quality improving processing has been applied according to an instruction of the operator are shown. Further, on the report screen 1200 illustrated FIG. 12A and FIG. 12B, a processing specifying section 1220 for changing the image quality improving processing applied to the OCTA images is shown.

In this case, the selecting unit 925 selects a learned model in accordance with image quality improving processing with respect to which an instruction was issued using the processing specifying section 1220, as the learned model to be used by the image quality improving unit 224. The image quality improving unit 224 performs image quality improving processing on the plurality of OCTA images 1201 using the learned model selected by the selecting unit 925. The display controlling unit 250 causes a plurality of OCTA images 1202 of high image quality that were generated to be displayed at one time on the report screen 1200 as illustrated in FIG. 12B.

Note that, although image quality improving processing with respect to an OCTA image is described above, a learned model may also be selected and changed according to an instruction of the operator with respect to image quality improving processing performed on a tomographic image or an intensity en-face image or the like. Note that, a plurality of images before and after image quality improving processing may also be displayed in a juxtaposed manner or a superimposed manner on the report screen. In this case also, a plurality of images to which image quality improving processing was applied according to an instruction from the operator can be displayed at one time.

Embodiment 3

In Embodiments 1 and 2, the image quality improving unit 224 automatically executes image quality improving processing after a tomographic image or an OCTA image is imaged. However, it may sometimes take a long time to perform image quality improving processing using a learned model that the image quality improving unit 224 executes. Further, it also takes time to perform generation of motion contrast data by the motion contrast generating unit 222 and generation of an OCTA image by the en-face image generating unit 223. Consequently, in the case of displaying an image after waiting for image quality improving processing to be completed after imaging, it may take a long time to display the image after imaging.

In this regard, when imaging an eye to be examined using an OCT apparatus, in some cases the imaging is not successfully performed due to blinking or unintended movement of the eye to be examined or the like. Therefore, the convenience of the OCT apparatus can be enhanced by allowing the operator to confirm, at an early stage, whether or not imaging was successful. Thus, in Embodiment 3, an OCT apparatus is configured so that, prior to generation and display of a high quality OCTA image, confirmation of an imaged image can be performed at an early stage by displaying an intensity en-face image or OCTA image based on tomographic information obtained by imaging the eye to be examined.

Figure 13:
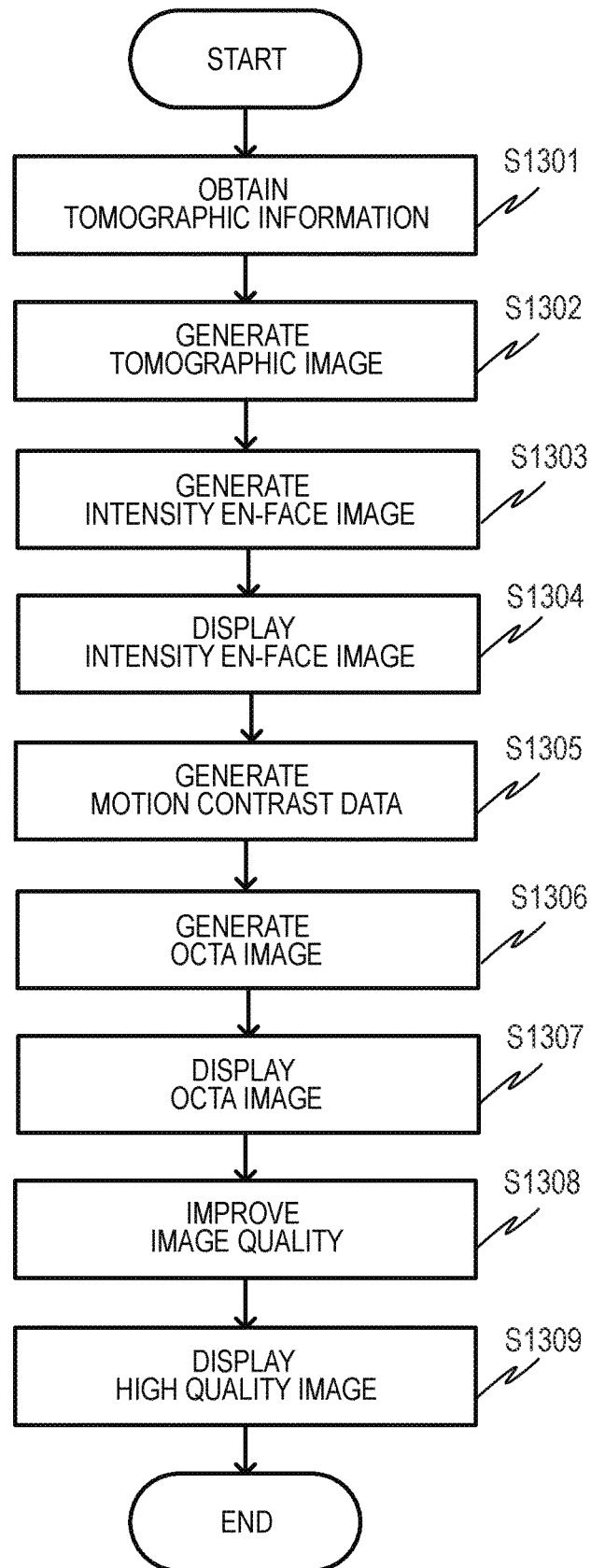
FIG. 13 is a flowchart of a series of image processing operations according to Embodiment 3.

Hereunder, the OCT apparatus according to the present embodiment is described referring to FIG. 13. Note that, since a configuration of the OCT apparatus according to the present embodiment is similar to the configuration of the OCT apparatus 1 according to Embodiment 1, components that are the same as components illustrated in FIG. 1 are denoted by the same reference numerals as in Embodiment 1, and a description of the components is omitted hereunder. Hereunder, the OCT apparatus according to the present embodiment is described centering on differences from the OCT apparatus 1 according to Embodiment 1.

FIG. 13 is a flowchart of a series of image processing operations according to the present embodiment. First, in step S1301, the obtaining unit 210 obtains a plurality of items of three-dimensional tomographic information obtained by imaging the eye to be examined E, from the OCT imaging unit 100.

Since step S1302 is the same as step S502 according to Embodiment 1, a description thereof is omitted here. Upon a three-dimensional tomographic image being generated in step S1302, the processing shifts to step S1303.

In step S1303, the en-face image generating unit 223 generates a front image (intensity en-face image) of the fundus by projecting the three-dimensional tomographic image generated in step S1302 on a two-dimensional plane. Thereafter, in step S1301, the display controlling unit 250 displays the generated intensity en-face image on the display unit 270.

Since step S1305 and step S1306 are the same as steps S503 and S501 according to Embodiment 1, a description of these steps is omitted here. Upon an OCTA image being generated in step S1306, the processing shifts to step S1307. In step S1307, the display controlling unit 250 causes the display unit 270 to switch from displaying the intensity en-face image to displaying the OCTA image before image quality improving processing that was generated in step S1306.

In step S1308, similarly to step S505 according to Embodiment 1, the image quality improving unit 224 subjects the OCTA image generated in step S1306 to image quality improving processing using a learned model to thereby generate a high quality OCTA image. In step S1309, the display controlling unit 250 causes the display unit 270 to switch from displaying the OCTA image before image quality improving processing to displaying the generated high quality OCTA image.

As described above, before obtainment of an OCTA image by the obtaining unit 210, the display controlling unit 250 according to the present embodiment causes an intensity en-face image (third image) that is a front image which was generated based on tomographic data obtained in the depth direction of the eye to be examined to be displayed on the display unit 270. Further, immediately after an OCTA image is obtained, the display controlling unit 250 causes the display unit 270 to switch from displaying the intensity en-face image to displaying the OCTA image. In addition, after a high quality OCTA image is generated by the image quality improving unit 224, the display controlling unit 250 causes the display unit 270 to switch from displaying the OCTA image to displaying the high quality OCTA image.

Thus, the operator can check a front image of eye to be examined immediately after imaging, and can immediately determine whether or not the imaging was successful. Further, since an OCTA image is displayed immediately after the OCTA image is generated, the operator can determine at an early stage whether a plurality of items of three-dimensional tomographic information for generating motion contrast data have been appropriately obtained.

Note that, with respect to a tomographic image or an intensity en-face image or the like also, by displaying the tomographic image or the intensity en-face image prior to performing image quality improving processing, the operator can determine at an early stage whether or not imaging was successful.

Although in the present embodiment the processing for generating motion contrast data (step S1305) is started after the processing for displaying an intensity en-face image (step S1304), the timing at which to start the processing for generating motion contrast data is not limited thereto. The motion contrast generating unit 222, for example, may start the processing for generating motion contrast data concurrently with the processing for generating (step S1303) or the processing for displaying an intensity en-face image (step S1304). Similarly, the image quality improving unit 224 may start the image quality improving processing (step S1308) concurrently with the processing for displaying an OCTA image (step S1307).

Embodiment 4

In Embodiment 1, an example in which OCTA images before and after image quality improving processing are switched and displayed was described. In contrast, in Embodiment 4, a comparison is made between images before and after image quality improving processing.

Figure 14:
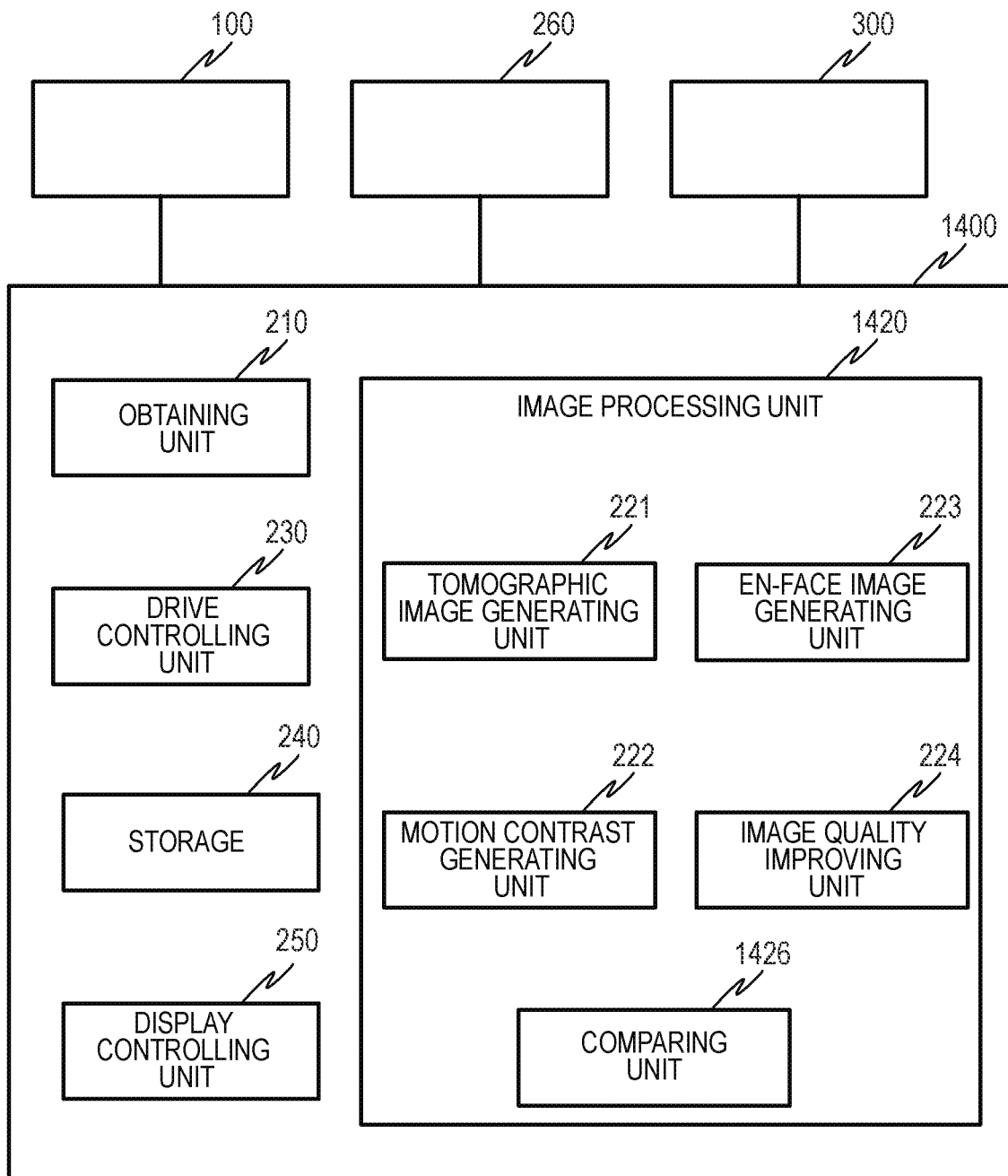
FIG. 14 is a view illustrating a schematic configuration of a controlling unit according to Embodiment 4.
Figure 15:
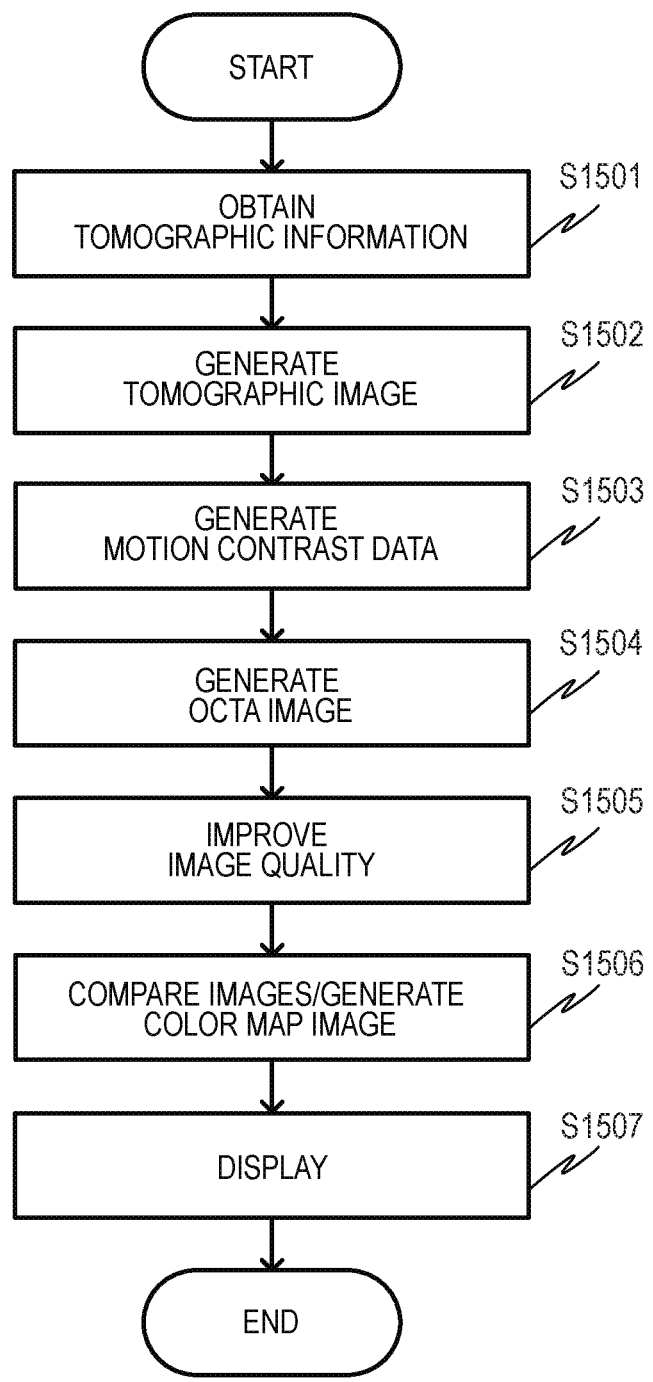
FIG. 15 is a flowchart of a series of image processing operations according to Embodiment 4.

Hereunder, an OCT apparatus according to the present embodiment is described referring to FIG. 14 and FIG. 15. Note that, since a configuration of the OCT apparatus according to the present embodiment is the same as the configuration of the OCT apparatus 1 according to Embodiment 1 with the exception of the controlling unit, components that are the same as components illustrated in FIG. 1 are denoted by the same reference numerals as in Embodiment 1, and a description of the components is omitted hereunder. Hereunder, the OCT apparatus according to the present embodiment is described centering on differences from the OCT apparatus 1 according to Embodiment 1.

FIG. 14 is a view illustrating a schematic configuration of a controlling unit 1400 according to the present embodiment. Note that, apart from an image processing unit 1420 and a comparing unit 1426, the components of the controlling unit 1400 according to the present embodiment are the same as the respective components of the controlling unit 200 according to Embodiment 1. Therefore, components that are the same as components illustrated in FIG. 2 are denoted by the same reference numerals as in Embodiment 1, and a description of the components is omitted hereunder.

In addition to the tomographic image generating unit 221, the motion contrast generating unit 222, the en-face image generating unit 223 and the image quality improving unit 224, the comparing unit 1426 is also provided in the image processing unit 1420 of the controlling unit 1400.

The comparing unit 1426 performs a comparison between the image (original image) before image quality improving processing is performed by the image quality improving unit 224 and the image after image quality improving processing is performed. More specifically, the comparing unit 1426 compares the images before and after the image quality improving processing, and calculates the respective differences between the pixel values at corresponding pixel positions in the images before and after the image quality improving processing.

The comparing unit 1426 then generates a color map image that is colored according to the magnitude of the difference values. For example, in a case where a pixel value of the image after the image quality improving processing is larger relative to a pixel value of the image before the image quality improving processing, a warm color (yellow to orange to red) tone is used, while in a case where a pixel value of the image after the image quality improving processing is smaller, a cold color (yellow-green to green to blue) tone is used. By using such a color scheme, it can be easily identified that a location indicated by a warm color on the color map image is tissue that was restored (or newly created) by the image quality improving processing. Similarly, it can be easily identified that a location indicated by a cold color on the color map image is noise that has been removed (or tissue that has been erased) by the image quality improving processing.

Note that, the color scheme of the color map image in question is one example. For example, the color scheme of the color map image may be arbitrarily set according to a desired configuration, such as applying a color scheme of color tones that differ according to the magnitude of pixel values in the image after the image quality improving processing relative to the pixel values in the image before the image quality improving processing.

The display controlling unit 250 can superimpose the color map image generated by the comparing unit 1426 on the image before the image quality improving processing or the image after the image quality improving processing, and display the resultant superimposed image on the display unit 270.

Next, a series of image processing operations according to the present embodiment is described referring to FIG. 15. Note that, since step S1501 to step S1505 are the same as step S501 to S505 according to Embodiment 1, a description of these steps is omitted here. Upon a high quality OCTA image being generated by the image quality improving unit 224 in step S1505, the processing shifts to step S1506.

In step S1506, the comparing unit 1426 compares the OCTA image generated in step S1504 with the high quality OCTA image generated in step S1505 to calculate differences between the respective pixel values, and generates a color map image based on the differences between the respective pixel values. Note that, instead of differences between pixel values in images before and after image quality improving processing, the comparing unit 1426 may perform a comparison between images using another method such as by using ratios of pixel values or correlation values between images before and after high image quality processing, and may generate a color map image based on the comparison result.

In step S1507, the display controlling unit 250 superimposes the color map image on the image before the image quality improving processing or the image after the image quality improving processing, and displays the resultant superimposed image on the display unit 270. At such time, the display controlling unit 250 can set a degree of transparency with respect to the color map so as to ensure that the color map image does not conceal the image on which the color map image is to be superimposed, and cause the color map image to be displayed in a superimposed manner on the target image.

Further, in the color map image, the display controlling unit 250 may set the degree of transparency to a high value at a location at which a difference between the images before and after image quality improving processing is small (a pixel value of the color map image is low), or may set the degree of transparency so that a location at which the difference is less than or equal to a predetermined value is completely transparent. By setting the degree of transparency in such a manner, the image displayed below the color map image, and the color map image can both be visually recognized in a favorable manner. Note that, with regard to the degree of transparency of the color map image, the comparing unit 1426 may also generate a color map image including the degree of transparency settings.

As described above, the controlling unit 1400 according to the present embodiment includes the comparing unit 1426 that compares a first image, and a second image on which image quality improving processing was performed. The comparing unit 1426 calculates a difference between the first image and the second image, and generates a color map image that was colored based on the difference. The display controlling unit 250 controls the display of the display unit 270 based on comparison result obtained by the comparing unit 1426. More specifically, the display controlling unit 250 superimposes the color map image on the first image or the second image, and displays the resulting superimposed image on the display unit 270.

Thus, a change between the images that was caused by image quality improving processing can be easily confirmed by observing the color map image superimposed on the images before and after the image quality improving processing. Therefore, even if tissue that does not actually exist is visualized in an image by the image quality improving processing or tissue which originally existed was erased from the image by the image quality improving processing, the operator can more easily identify such tissue, and can more easily determine the authenticity of the tissue. Further, in accordance with the color scheme of the color map image, the operator can easily identify whether a location is a location that was newly visualize by the image quality improving processing or is a location that was erased by the image quality improving processing.

Note that, the display controlling unit 250 can enable or disable the superimposed display of the color map image according to an instruction from the operator. An operation for turning superimposed display of the color map image on or off may be applied simultaneously to a plurality of images displayed on the display unit 270. In this case, the comparing unit 1426 can generate a color map image for each of the corresponding images before and after the image quality improving processing, and the display controlling unit 250 can superimpose and display a color map image on the corresponding image before image quality improving processing or image after image quality improving processing. Further, the display controlling unit 250 may cause the image before image quality improving processing or the image after image quality improving processing to be displayed on the display unit 270 before displaying the color map image.

Note that, although the present embodiment is described by taking an OCTA image as an example, similar processing can be performed in the case of performing image quality improving processing on a tomographic image or an intensity en-face image or the like. Further, the comparison processing and processing for displaying a color map according to the present embodiment can also be applied to the OCT apparatuses according to Embodiment 2 and Embodiment 3.

(Modification 4)

Further, the comparing unit 1426 may perform a comparison of images before and after image quality improving processing, and depending on the result of the comparison by the comparing unit 1426, the display controlling unit 250 may display a warning on the display unit 270. More specifically, in a case where a difference between pixel values in images before and after image quality improving processing which was calculated by the comparing unit 1426 is greater than a predetermined value, the display controlling unit 250 displays a warning on the display unit 270. According to such a configuration, in a case where, in a generated high quality image, tissue that does not actually exist was generated or tissue which originally existed was erased by a learned model, the attention of the operator can be drawn to that fact. Note that, the comparison between a difference and a predetermined value may be performed by the comparing unit 1426 or may be performed by the display controlling unit 250. Further, instead of a difference, a statistical value such as an average value of differences may be compared with a predetermined value.

In addition, the display controlling unit 250 may be configured so that, in a case where a difference between images before and after the image quality improving processing is greater than a predetermined value, the image after image quality improving processing was performed is not displayed on the display unit 270. In this case, in a generated high quality image, if tissue that does not actually exist was generated or tissue which originally existed was erased by a learned model, the occurrence of a misdiagnosis based on the high quality image in question can be suppressed. Note that, the comparison between a difference and a predetermined value may be performed by the comparing unit 1426 or may be performed by the display controlling unit 250. Further, instead of a difference, a statistical value such as an average value of differences may be compared with a predetermined value.

Embodiment 5

Figure 20A:
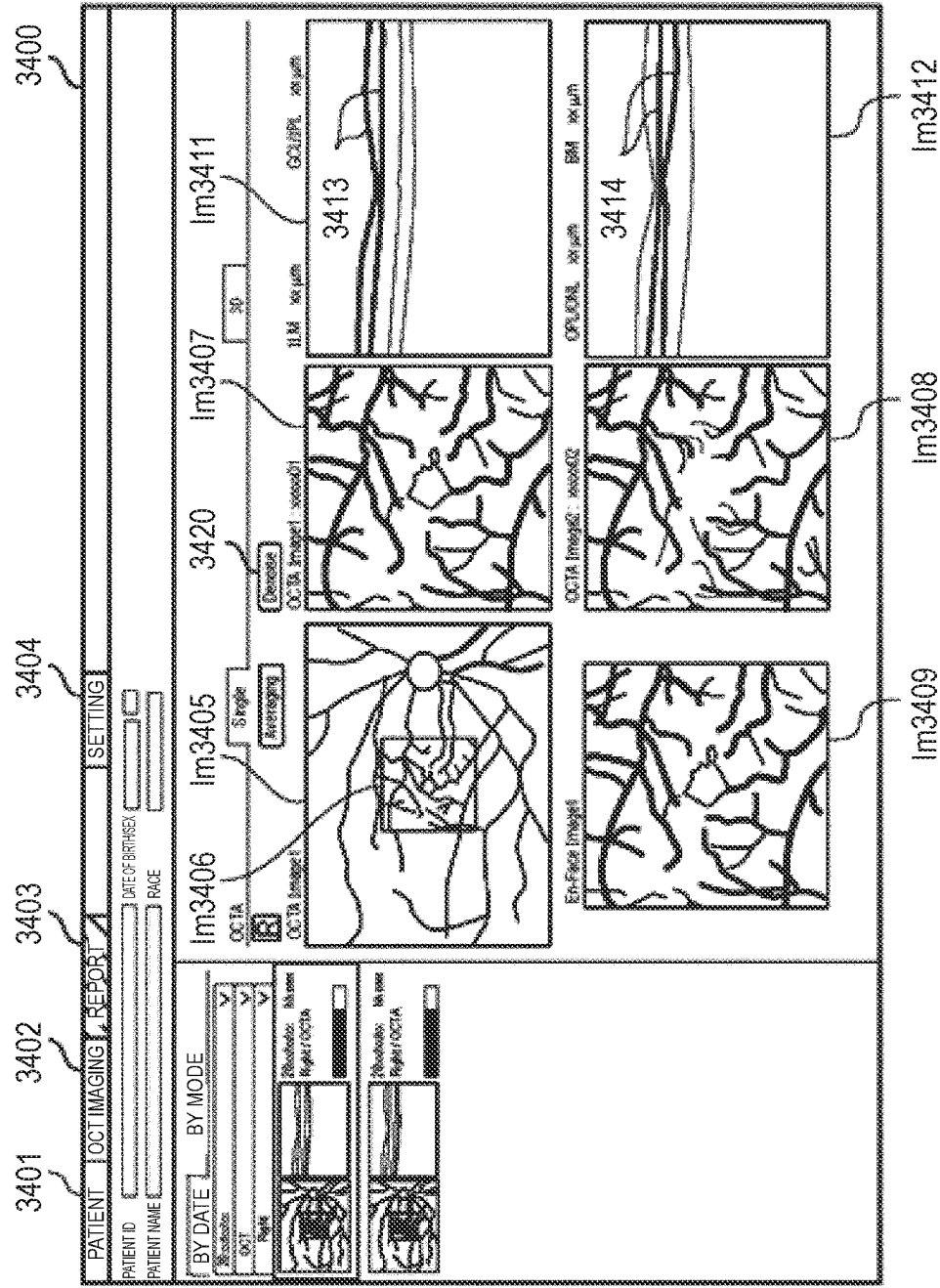
FIG. 20A is a view illustrating an example of the user interface according to Embodiment 5.
Figure 20B:
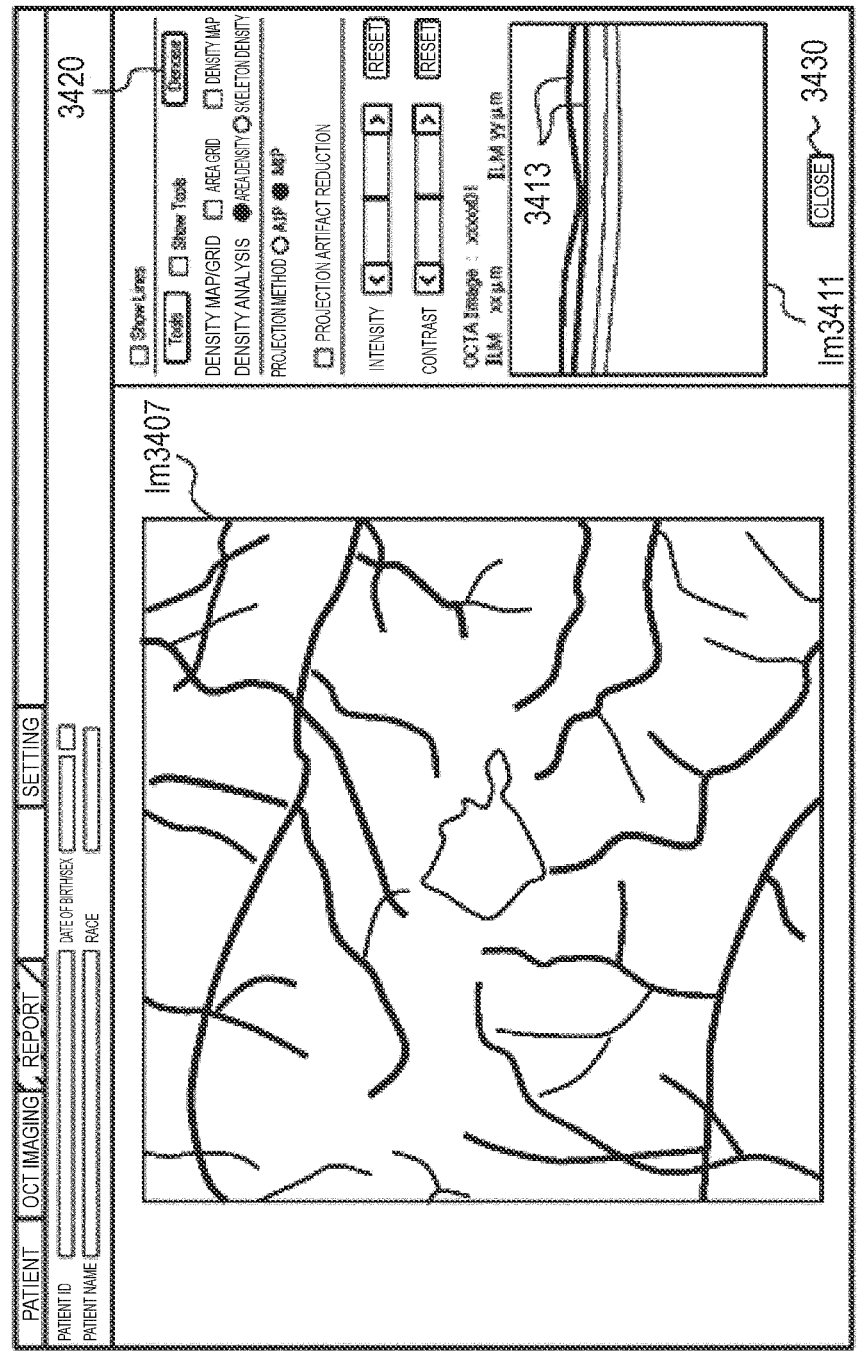
FIG. 20B is a view illustrating an example of the user interface according to Embodiment 5.

Next, an image processing apparatus (controlling unit 200) according to Embodiment 5 is described referring to FIG. 20A and FIG. 20B. In the present embodiment, an example is described in which the display controlling unit 250 displays the result of processing by the image quality improving unit 224 on the display unit 270. Note that, although the present embodiment is described using FIG. 20A and FIG. 20B, the display screens are not limited to the examples illustrated in FIG. 20A and FIG. 20B. Image quality improving processing can also be similarly applied to a display screen that displays a plurality of images side-by-side obtained at different dates and times, as when performing a follow-up observation. Further, image quality improving processing can also be similarly applied to a display screen on which the examiner confirms whether or not the imaging is successful immediately after imaging, as in the case of an imaging confirmation screen. The display controlling unit 250 can cause the display unit 270 to display a plurality of high quality images which the image quality improving unit 224 generated or a low quality image on which image quality improving was not performed. Thus, the display controlling unit 250 can output a low quality image and a high quality image, respectively, in accordance with an instruction of the examiner.

Hereunder, one example of an interface 3400 in question is described referring to FIG. 20A and FIG. 20B. Reference numeral 3400 denotes an entire screen, reference numeral 3401 denotes a "Patient" tab, reference numeral 3402 denotes an "Imaging" tab, reference numeral 3403 denotes a "Report" tab, and reference numeral 3404 denotes a "Setting" tab. Further, diagonal lines in the "Report" tab 3403 indicate an active state of a report screen. In the present embodiment an example of displaying the report screen will be described. Reference characters Im3405 denote an SLO image, and reference characters Im3406 denote an image in which an OCTA en-face image denoted by reference characters Im3407 is displayed in a superimposed manner on the SLO image Im3405. Here, the term "SLO image" refers to a front image of the fundus obtained by an SLO (Scanning Laser Ophthalmoscope) optical system (not illustrated). Reference characters Im3407 and Im3408 each denote an OCTA en-face image, reference characters Im3409 denote an intensity en-face image, and reference characters Im3411 and Im3412 each denote a tomographic image. Reference numerals 3413 and 3414 denote boundary lines of the upper and lower ranges of the OCTA en-face images denoted by Im3407 and Im3408, respectively, which are displayed in a superimposed manner on the corresponding tomographic images. A button 3420 is a button used for designating execution of image quality improving processing. Naturally, as described later, the button 3420 may be a button for inputting an instruction to display a high quality image.

In the present embodiment, execution of image quality improving processing is performed when the button 3420 is specified, or whether or not to execute image quality improving processing is determined based on information stored (saved) in a database. First, an example of switching between display of a high quality image and display of a low quality image by the button 3420 being specified in accordance with an instruction from the examiner will be described. Note that, an OCTA en-face image will be described as the target image of the image quality improving processing.

When the examiner performs an operation to specify the "Report" tab 3403 to thereby transition to the report screen, the low-quality OCTA, en-face images Im3407 and Im3408 are displayed. Thereafter, when the examiner performs an operation to specify the button 3420, the image quality improving unit 224 executes image quality improving processing on the images Im3407 and Im3408 displayed on the screen. After the image quality improving processing is completed, the display controlling unit 250 displays a high quality image which the image quality improving unit 224 generated on the report screen. Note that, since the image denoted by reference characters Im3406 is an image obtained by displaying the image Im3407 in a superimposed manner on the SLO image Im3405, the image Im3406 is also an image that has been subjected to image quality improving processing. The display of the button 3420 is then changed to an active state to provide a display from which it can be understood that image quality improving processing was executed.

Figure 19A:
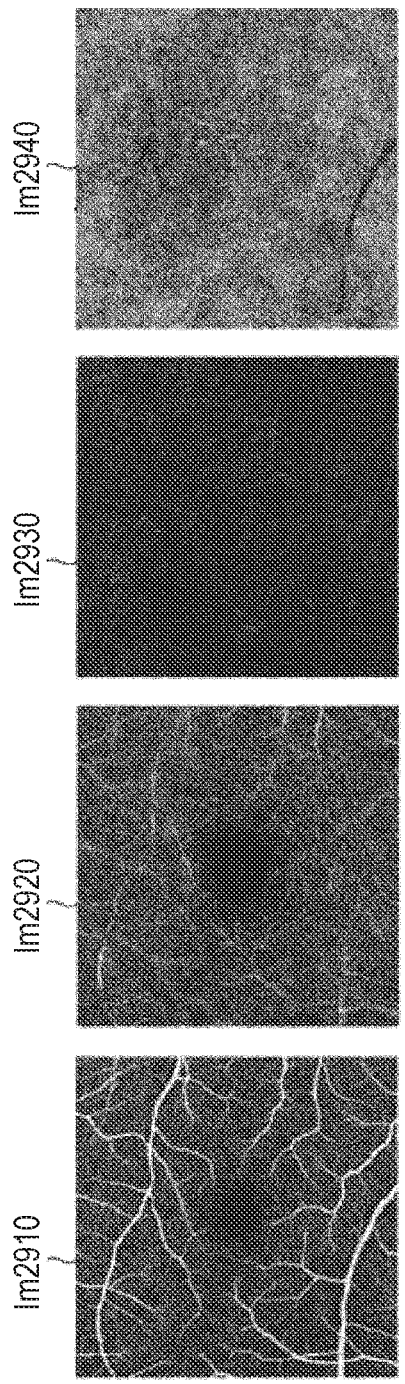
FIG. 19A is a view illustrating an example of a plurality of OCTA en-face images.
Figure 19B:
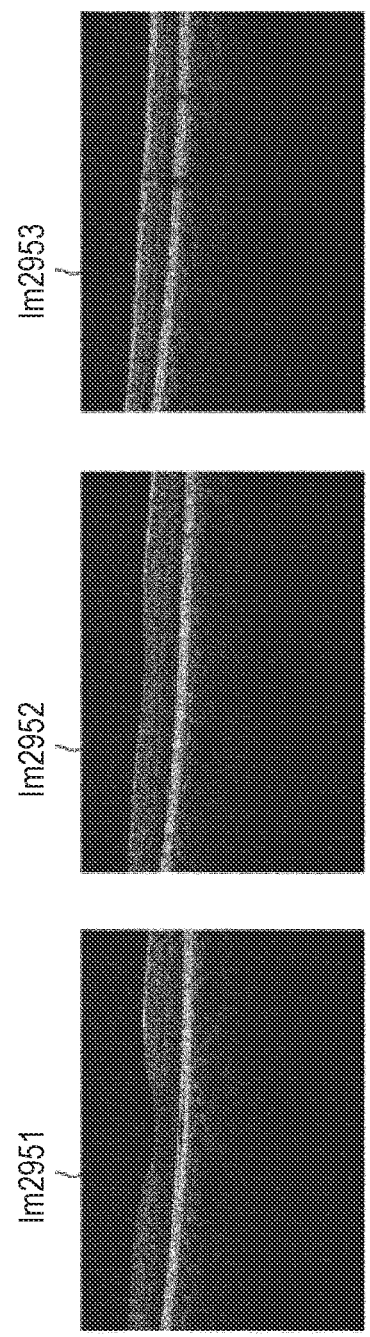
FIG. 19B is a view illustrating an example of a plurality of OCTA en-face images.

In this case, execution of processing by the image quality improving unit 224 need not be limited to the timing at which the examiner performs an operation to specify the button 3420. Since the kind of the OCTA en-face images Im3407 and Im3408 to be displayed when the report screen is opened is known in advance, image quality improving processing may be executed when transitioning to the report screen. Subsequently, at the timing at which the button 3420 is pressed, the display controlling unit 250 may display a high quality image on the report screen. In addition, it is not necessary that the number of kinds of image on which image quality improving processing is performed in response to an instruction from the examiner or when transitioning to the report screen is two. A configuration may be adopted so as to perform processing on images for which there is a high possibility of being displayed, for example, processing may be performed on a plurality of OCTA en-face images such as the surface layer (Im2910), the deep layer (Im2920), the outer layer (Im2930) and the choroidal vascular network (Im2940) illustrated in FIG. 19E and FIG. 19B. In this case, an image obtained by performing image quality improving processing may be temporarily stored in a memory or may be stored in a database.

Next, a case where image quality improving processing is executed based on information stored (saved) in a database is described. In a case where a state whereby execution of image quality improving processing is to be performed is stored in a database, upon the display transitioning to the report screen, a high quality image obtained by executing image quality improving processing is displayed by default. Further, a configuration can be adopted so that the button 3420 is displayed in an active state by default so that the examiner can thereby know that a high quality image obtained by executing image quality improving processing is being displayed, if the examiner wishes to display a low quality image in a state prior to image quality improving processing, the examiner can display the low quality image by performing an operation to specify the button 3420 to thereby release the active state. If the examiner wishes to return to the high quality image, the examiner specifies the button 3420.

It is assumed that it can be specified whether or not to execute image quality improving processing on data stored in the database commonly for all of the data stored in the database, and with respect to respective classes of data such as for each set of imaging data (for each examination). For example, in a case where a state whereby image quality improving processing is to be executed for the entire database has been stored, if the examiner stored a state whereby image quality improving processing is not to be executed with respect to an individual item of imaging data (individual examination), the next time the relevant imaging data is displayed, the imaging data will be displayed in a state in which image quality improving processing has not been executed thereon. A user interface (not illustrated) (for example, a "Store" button) may be used to store a state in which image quality improving processing has been executed for each item of imaging data (for each examination). Further, when transitioning to other imaging data (another examination) or other patient data (for example, changing to a display screen other than the report screen in accordance with an instruction from the examiner), based on the display state (for example, the state of the button 3420) a state whereby execution of image quality improving processing is to be performed may be stored. By this means, in a case in which whether or not to execute image quality improving processing in imaging data units (examination units) has not been specified, processing can be performed based on information specified with respect to the entire database, while in a case where execution of image quality improving processing in imaging data units (examination units) has been specified, processing can be executed individually based on the information in question.

Although an example has been illustrated in which images Im3407 and Im3408 are displayed as OCTA en-face images in the present embodiment, it is possible to change an OCTA en-face image to be displayed in accordance with a specification of the examiner. Therefore, a description will now be given regarding changing an image when execution of image quality improving processing has been specified (the button 3420 is in an active state).

Changing of an image is performed using a user interface (not illustrated) (for example, a combo box). For example, when the examiner changes the kind of image from a surface layer image to a choroidal vascular network image, the image quality improving unit 224 executes image quality improving processing for the choroidal vascular network image, and the display controlling unit 250 displays a high quality image which the image quality improving unit 224 generated on the report screen. In other words, in response to an instruction from the examiner, the display controlling unit 250 may change the display of a high quality image of a first depth range to the display of a high quality image of a second depth range that is at least partially different from the first depth range. At this time, by first depth range being changed to the second depth range in response to an instruction from the examiner, the display controlling unit 250 may change the display of a high quality image of the first depth range to the display of a high quality image of the second depth range. Note that, in a case where, as described above, high quality images have already been generated with respect to images for which the possibility of being displayed upon transitioning to the report screen is high, the display controlling unit 250 may display a high quality image which has already been generated.

Note that, a method for changing the kind of image is not limited to the method described above, and it is also possible to generate OCTA en-face images for which different depth ranges are set by changing the layer that serves as a reference and an offset value. In this case, when the layer that serves as a reference or an offset value is changed, the image quality improving unit 224 executes image quality improving processing with respect to an arbitrary OCTA en-face image, and the display controlling unit 250 displays a high quality image on the report screen. Changing of a layer that serves as a reference or an offset value can be performed using a user interface (not illustrated) (for example, a combo box or text box). Further, a range for generating an OCTA en-face image can be changed by dragging either of the boundary lines 3413 and 3414 (moving the layer boundary) displayed in a superimposed manner on the tomographic images Im3411 and Im3412.

In a case where a boundary line is changed by dragging, an execution command with respect to image quality improving processing is continuously issued. Therefore, the image quality improving unit 224 may always perform processing with respect to the execution command, or may be configured to execute processing after the layer boundary is changed by dragging. Alternatively, although execution of image quality improving processing is continuously issued, the image quality improving unit 224 may be configured to cancel the previous command at the time point at which the next command arrives, and execute the most recent command.

Note that, image quality improving processing takes a relatively long time in some cases. Consequently, even when the command is executed at any of the timings described above, it may take a relatively long time until a high quality image is displayed. Therefore, during a period from when a depth range for generating an OCTA en-face image is set in response to an instruction from the examiner until a high quality image is displayed, an OCTA en-face image (low quality image corresponding to the set depth range may be displayed. In other words, a configuration may be adopted so that when the aforementioned depth range is set, an OCTA en-face image (low quality image) corresponding to the set depth range is displayed, and when the image quality improving processing is completed, the display of the relevant OCTA en-face image (the low quality image) is changed to a display of the high quality image. Further, information indicating that image quality improving processing is being executed may be displayed during the period from when the aforementioned depth range is set until the high quality image is displayed. Note that, the foregoing can be applied not only to a case where it is assumed that the state is one in which execution of image quality improving processing has already been specified (the button 3420 is in an active state), and can also be applied, for example, with respect to a period until a high quality image is displayed when execution of image quality improving processing was instructed in accordance with an instruction from the examiner.

Although in the present embodiment an example was illustrated in which different layers are displayed as the images Im3407 and Im3408 as OCTA en-face images, and a low quality image and a high quality image are displayed by switching therebetween, the present invention is not limited thereto. For example, a low-quality OCTA en-face image as the image Im3407 and a high-quality OCTA en-face image as the image Im3408 may be displayed side by side. In the case of displaying the images by switching therebetween, since images are switched at the same place it is easy to make a comparison of portions at which there is a change, while in the case of displaying images side by side, it is easy to compare the entire images since the images can be displayed at the same time.

Next, FIG. 20A and FIG. 20B will be used to describe execution of image quality improving processing in the case of screen transition. FIG. 20B is an example of a screen on which the OCTA en-face image Im3407 illustrated in FIG. 20A is displayed in an enlarged manner. In FIG. 20B also, similarly to FIG. 20A, the button 3420 is displayed. A screen transition from the screen illustrated in FIG. 20A to the screen illustrated in FIG. 20B is specified, for example, by double clicking on the OCTA en-face image Im3407, and a screen transition from the screen illustrated in FIG. 20B to the screen illustrated in FIG. 20A is specified by clicking on a "Close" button 3430. Note that, with regard to screen transition, a method for transitioning from one screen to another is not limited to the method described here, and a user interface (not illustrated) may also be used.

In a case where execution of image quality improving processing has been specified (the button 3420 is active) at the time of screen transition, that state is also maintained when the screen transition occurs. In other words, in a case where the screen illustrated in FIG. 20B is transitioned to in a state in which a high quality image is displayed on the screen illustrated in FIG. 20A, the high quality image is also displayed on the screen illustrated in FIG. 20B. Further, the button 3420 is placed in an active state. The same applies in the case of transitioning from the screen illustrated in FIG. 20B to the screen illustrated in FIG. 20A. On the screen illustrated in FIG. 20B, the display can also be switched to a low quality image by specifying the button 3420.

With regard to the screen transitions, the screen transitions are not limited to the screens described here, and as long as the transition is to a screen displaying the same imaging data, such as a display screen for follow-up observation or a display screen for a panorama image, transition is performed while maintaining the display state of the high quality image. In other words, on the display screen after transition, an image is displayed that corresponds to the state of the button 3420 on the display screen before transition. For example, if the button 3420 is in an active state on the display screen before transition, a high quality image is displayed on the display screen after transition. Further, for example, if the active state of the button 3420 is released on the display screen before transition, a low quality image is displayed on the display screen after transition. Note that, a configuration may be adopted so that, if the button 3420 is in an active state on the display screen for follow-up observation, a plurality of images obtained at different dates and times (different examination days) that are displayed side by side on the display screen for follow-up observation are switched to high quality images. In other words, a configuration may be adopted so that, if the button 3420 is in an active state on the display screen for follow-up observation, switching to high quality images is collectively performed with respect to a plurality of images obtained at different dates and times.

Figure 18:
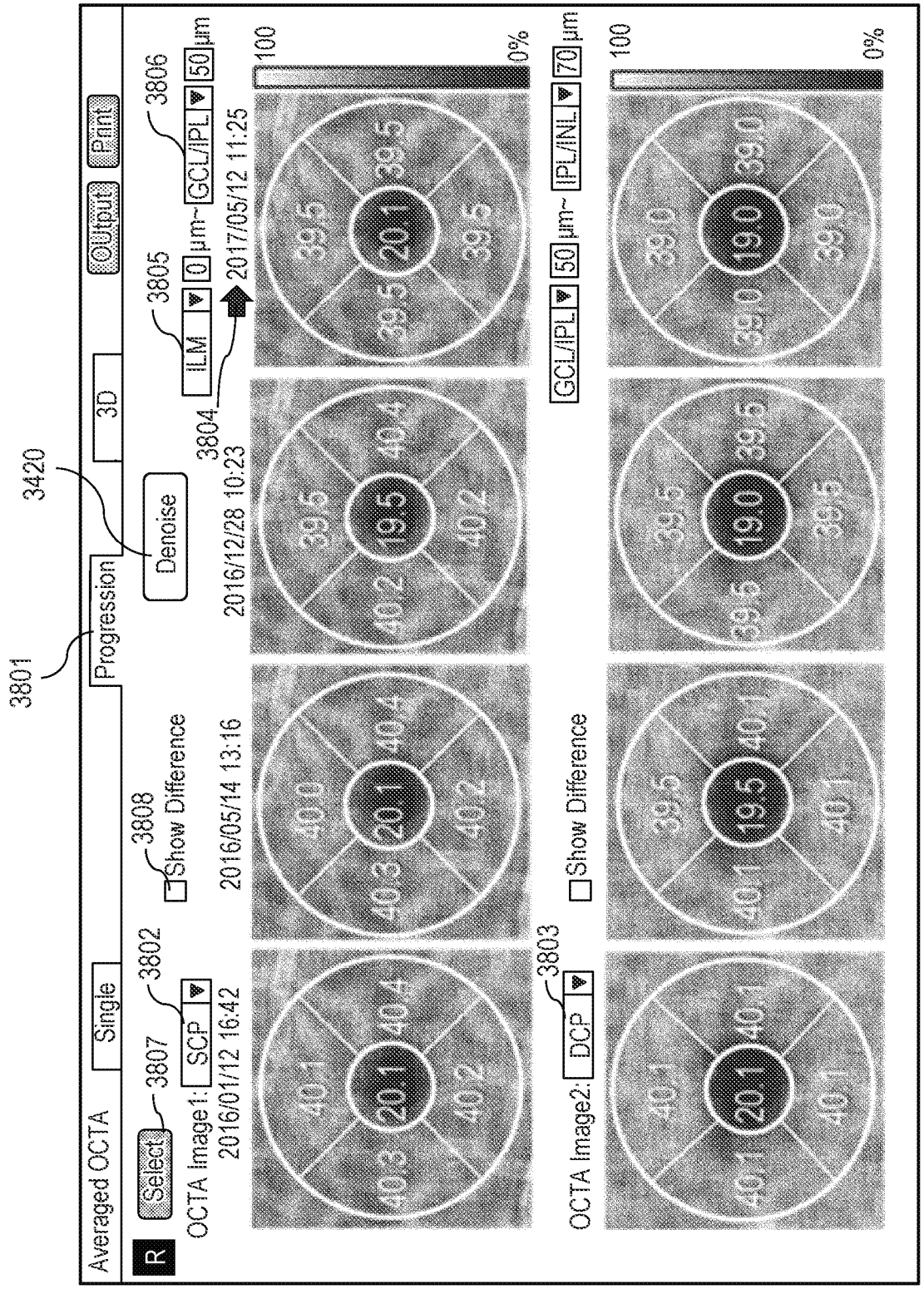
FIG. 18 is a view illustrating an example of a user interface according to Embodiment 5.

An example of a display screen for follow-up observation is illustrated in FIG. 18. Upon a tab 3801 being selected in response to an instruction from the examiner, a display screen for follow-up observation as illustrated in FIG. 18 is displayed. At this time, the depth range of an en-face image can be changed by the examiner performing an operation to select from a predefined depth range set (3802 and 3803) displayed in list boxes. For example, superficial capillary is selected in the list box 3802, and deep capillary is selected in the list box 3803. Analysis results for en-face images of the superficial capillary are displayed in a display region on the upper side, and analysis results for en-face images of the deep capillary are displayed in a display region on the lower side. In other words, when a depth range is selected, a plurality of images obtained at different dates and times are collectively changed to a parallel display of analysis results for a plurality of en-face images in the selected depth range.

At this time, if the display of analysis results is placed in a non-selected state, the display may be collectively changed to a parallel display of analysis results of a plurality of en-face images obtained at different dates and times. Further, if the button 3420 is specified in accordance with an instruction from the examiner, the display of a plurality of en-face images is collectively changed to the display of a plurality of high quality images.

Further, in a case where the display of analysis results is in a selected state, if the button 3420 is specified in accordance with an instruction from the examiner, the display of analysis results for a plurality of en-face images is collectively changed to the display of analysis results for a plurality of high quality images. Here, the display of analysis results may be performed such that the analysis results are displayed in a superimposed manner on the images with any degree of transparency. At this time, changing to the display of analysis results may be, for example, a change to a state in which the analysis results are superimposed with any degree of transparency on the images that are being displayed. Further, changing to the display of analysis results may be, for example, a change to the display of respective analysis results and images (for example, two-dimensional maps) obtained by subjecting the respective analysis results and images to blending processing with any degree of transparency.

Further, the kind of layer boundary and the offset position used to specify a depth range can each be collectively changed from user interfaces such as denoted by reference numerals 3805 and 3806. Note that, the depth ranges of a plurality of en-face images obtained at different dates and times may be collectively changed by also causing tomographic images to be displayed together therewith, and moving layer boundary data superimposed on the tomographic images, in accordance with an instruction from the examiner. At such time, a plurality of tomographic images obtained at different dates and times may be displayed side by side, and when the aforementioned movement is performed on one tomographic image, the layer boundary data may be similarly moved on the other tomographic images.

Further, the image projection method and whether or not the projection artifact removal processing is to be performed can be changed, for example, by a selection from a user interface such as a context menu.

Further, a selection button 3807 may be selected to display a selection screen, and an image selected from an image list displayed on the selection screen may be displayed. Note that, an arrow 3804 displayed at the upper part of the screen illustrated in FIG. 18 is a mark that indicates the currently selected examination, and the reference examination (baseline) is the examination (leftmost image in FIG. 18) selected at the time of follow-up imaging. Naturally, a mark indicating the reference examination may be displayed on the display unit.

Further, in a case where a "Show Difference" check box 3808 is specified, a measurement value distribution (map or sector map) with respect to the reference image is displayed on the reference image. In addition, in this case, in a region corresponding to an examination date other than the examination date of the reference image, a differential measurement value map is displayed that shows differences between the measurement value distribution calculated for the reference image and a measurement distribution value calculated for an image in which the relevant region is displayed. As a measurement result, a trend graph (a graph of measurement values with respect to images for the respective examination dates that is obtained by measuring changes over time) may be displayed on the report screen. In other words, time-series data (for example, a time-series graph) for a plurality of analysis results corresponding to a plurality of images obtained at different dates and times may be displayed. At such time, with regard to analysis results relating to dates and times other than the plurality of dates and times corresponding to the displayed plurality of images also, the analysis results may be displayed as time-series data in a state in which the analysis results can be distinguished (for example, the color of each point on a time-series graph differs according to whether or not the corresponding image is displayed) from the plurality of analysis results corresponding to the plurality of images that are being displayed. Further, a regression line (curve) of the trend graph and a corresponding mathematical expression may be displayed on the report screen.

Although a description relating to an OCTA, en-face image has been given in the present embodiment, the present invention is not limited thereto. An image relating to processing for displaying an image, image quality improving, and image analysis and the like according to the present embodiment may be an intensity en-face image. In addition, the kind of image is not limited to an en-face image, and may be a different kind of image such as a tomographic image, an SLO image, a fundus image, or a fluorescence fundus image. In this case, a user interface for executing image quality improving processing may be a user interface for instructing the execution of image quality improving processing with respect to a plurality of images of different kinds, or may be a user interface for selecting any image from a plurality of images of different kinds and instructing the execution of image quality improving processing.

According, to the foregoing configuration, the display controlling unit 250 can display an image which the image quality improving unit 224 according to the present embodiment processed on the display unit 270. At such time, as described above, in the case of a state in which at least one condition is selected among a plurality of conditions relating to the display of high quality images, the display of analysis results, the depth range of a front image to be displayed and the like, even if the display screen is transitioned to another display screen, the selected state may be maintained.

Further, as described above, in the case of a state in which at least one condition among a plurality of conditions is selected, even if another condition is changed to a selected state, the state in which the at least one condition is selected may be maintained. For example, in a case where a display of analysis results is in a selected state, in response to an instruction from the examiner (for example, when the button 3420 is specified), the display controlling unit 250 may change a display of analysis results for a low quality image to a display of analysis results for a high quality image. Further, in a case where a display of analysis results is in a selected state, in response to an instruction from the examiner (for example, when specification of the button 3420 is released), the display controlling unit 250 may change the display of analysis results for a high quality image to a display of analysis results for a low quality image.

Furthermore, in a case where a display of a high quality image is in a non-selected state, in response to an instruction from the examiner (for example, when specification of a display of analysis results is released), the display controlling unit 250 may change the display of analysis results for a low quality image to a display of a low quality image. In addition, in a case where a display of a high quality image is in a non-selected state, in response to an instruction from the examiner (for example, when the display of analysis results is specified) the display controlling unit 250 may change the display of a low quality image to a display of analysis results for a low quality image. Further, in a case where a display of a high quality image is in a selected state, in response to an instruction from the examiner (for example, when specification of a display of analysis results is released), the display controlling unit 250 may change the display of analysis results for a high quality image to a display of a high quality image. Further, in a case where a display of a high quality image is in a selected state, in response to an instruction from the examiner (for example, when the display of analysis results is specified), the display controlling unit 250 may change the display of a high quality image to a display of analysis results for a high quality image.

Furthermore, let us consider a case where the display of a high quality image is in a non-selected state and a display of a first kind of analysis results is in a selected state. In this case, in response to an instruction from the examiner (for example, when the display of a second kind of analysis results is specified), the display controlling unit 250 may change the display of the first kind of analysis results for a low quality image to a display of the second kind of analysis results for a low quality image. Further, let us consider a case where the display of a high quality image is in a selected state and a display of a first kind of analysis results is in a selected state. In this case, in response to an instruction from the examiner (for example, when the display of a second kind of analysis results is specified), the display controlling unit 250 may change the display of the first kind of analysis results for a high quality image to a display of the second kind of analysis results for a high quality image.

Note that, a configuration may be adopted so that, on the display screen for follow-up observation, as described above, changing of these displays is collectively reflected with respect to a plurality of images obtained at different dates and times. Here, the display of analysis results may be performed such that the analysis results are displayed in a superimposed manner on the images with any degree of transparency. At such time, changing to the display of analysis results may be, for example, a change to a state in which the analysis results are superimposed with any degree of transparency on the images that are being displayed. Further, changing to the display of analysis results may be, for example, a change to the display of respective analysis results and images (for example, two-dimensional maps) obtained by subjecting the respective analysis results and images to blending processing with any degree of transparency.

(Modification 5)

In the various embodiments and modifications described above, the display controlling unit 250 can cause the display unit 270 to display an image selected according to an instruction from the examiner from among a high quality image generated by the image quality improving unit 224 and an input image. Further, in response to an instruction from the examiner, the display controlling unit 250 may switch the image displayed on the display unit 270 from an imaged image (input image) to a high quality image. In other words, the display controlling unit 250 may change the display of a low quality image to the display of a high quality image in response to an instruction from the examiner. Further, the display controlling unit 250 may change the display of a high quality image to the display of a low quality image in response to an instruction from the examiner.

In addition, the image quality improving unit 224 may start (input an image to an image quality improving engine) image quality improving processing by an image quality improving engine (learned model for improving image quality) in response to an instruction from the examiner, and the display controlling unit 250 may cause the display unit 270 to display a high quality image generated by the image quality improving unit 224. In contrast, when an input image is imaged by the imaging apparatus (OCT imaging unit 100), the image quality improving engine may automatically generate a high quality image based on the input image, and the display controlling unit 250 may cause the display unit 270 to display the high quality image in response to an instruction from the examiner. Here, the term "image quality improving engine" includes a learned model that performs the image quality improving processing described above.

Note that, these processing operations can be similarly performed with respect to the output of an analysis result also. In other words, the display controlling unit 250 may change the display of an analysis result for a low quality image to the display of an analysis result for a high quality image in response to an instruction from the examiner. Further, the display controlling unit 250 may change the display of an analysis result for a high quality image to the display of an analysis result for a low quality image in response to an instruction from the examiner. Naturally, the display controlling unit 250 may change the display of an analysis result for a low quality image to the display of a low quality image in response to an instruction from the examiner. Further, the display controlling unit 250 may change the display of a low quality image to the display of an analysis result for a low quality image in response to an instruction from the examiner. Furthermore, the display controlling unit 250 may change the display of an analysis result for a high quality image to the display of a high quality image in response to an instruction from the examiner. Further, the display controlling unit 250 may change the display of a high quality image to the display of an analysis result for a high quality image in response to an instruction from the examiner.

In addition, the display controlling unit 250 may change the display of an analysis result for a low quality image to the display of a different kind of analysis result for a low quality image in response to an instruction from the examiner. Further, the display controlling unit 250 may change the display of an analysis result for a high quality image to the display of a different kind of analysis result for a high quality image in response to an instruction from the examiner.

In this case, the display of an analysis result for a high quality image may be performed such that the analysis result for the high quality image is displayed in a superimposed manner on the high quality image with any degree of transparency. Further, the display of an analysis result for a low quality image may be performed such that the analysis result for the low quality image is displayed in a superimposed manner on the low quality image with any degree of transparency. At this time, changing to the display of an analysis result may be, for example, a change to a state in which the analysis result is superimposed with any degree of transparency on the image that is being displayed. Further, changing to the display of an analysis result may be, for example, a change to the display of an image (for example, a two-dimensional map) obtained by subjecting an analysis result and an image to blending processing with any degree of transparency.

(Modification 6)

Analysis results such as the thickness of a desired layer or various blood vessel densities may be displayed on a report screen described in the various embodiments and modifications described above. Further, a parameter value (distribution) relating to a site of interest including at least one of the optic nerve head, the macular area, a vascular zone, a nerve fascicle, a vitreous region, a macular region, a choroid region, a sclera region, a lamina cribrosa region, a retinal layer boundary, a retinal layer boundary edge, a photoreceptor cell, a blood cell, a blood vessel wall, a blood vessel inner wall boundary, a blood vessel external boundary, a ganglion cell, a corneal region, a corner region, and Schlemm's canal and the like may be displayed as an analysis result. At such time, for example, an accurate analysis result can be displayed by analyzing a medical image subjected to various kinds of artifact removal processing. Note that, an artifact may be, for example, a false image region caused by light absorption by a vascular zone or the like, a projection artifact, or a band-like artifact in a front image that arises in the main scanning direction of the measurement light due to the state of the eye to be examined (movement or blinking or the like). Further, an artifact may be of any kind as long as it is an imaging failure region that, for example, randomly arises at each imaging on a medical image of a predetermined site of the subject. Further, the value (distribution) of a parameter relating to a region including at least one of the kind of artifacts (imaging failure regions) described above may be displayed as an analysis result. Furthermore, the value (distribution) of a parameter relating to a region including at least one abnormal site such as drusen, a neovascular site, leucoma (hard exudates), pseudodrusen or the like may be displayed as an analysis result.

An analysis result may be displayed using an analysis map, or using sectors which indicate statistical values corresponding to respective divided regions or the like. Note that, an analysis result may be generated using a learned model (analysis result generating engine, or a learned model for generating analysis results) obtained by learning the analysis results of a medical image as training data. At such time, the learned model may be a model obtained by learning using training data including a medical image and an analysis result for the medical image, or training data including a medical image and an analysis result for a medical image of a different kind from the relevant medical image or the like. Further, a learned model may be a model obtained by learning using training data including input data in which a plurality of medical images of different kinds of a predetermined site, such as an intensity front image and a motion contrast front image, are taken as a set. Here, an intensity front image corresponds to an intensity en-face image, and a motion contrast front image corresponds to an OCTA en-face image. Further, a configuration may be adopted so that an analysis result obtained using a high quality image generated by a learned model for improving image quality is displayed.

In addition, input data included in the training data may be a high quality image generated by a learned model for improving image quality, or may be a set composed of a low quality image and a high quality image. Further, the training data may be, for example, data obtained by labeling input data for which information including at least one kind of information among an analysis value (for example, an average value or a median value) obtained by analyzing an analysis region, a table including analysis values, an analysis map, and a position of an analysis region such as a sector in an image or the like, is adopted as correct answer data (of supervised learning). Note that, a configuration may be adopted so that an analysis result obtained by a learned model for analysis result generation is displayed in response to an instruction from the examiner.

Further, various kinds of diagnosis results such as results relating to glaucoma or age-related macular degeneration may be displayed on a report screen in the various embodiments and modifications described above. At such time, for example, an accurate diagnosis result can be displayed by analyzing a medical image subjected to various kinds of artifact removal processing as described above. Further, in the diagnosis result, the position of a specified abnormal site or the like may be displayed on the image, and the state of an abnormal site or the like may be displayed using characters or the like. Further, a classification result (for example, Curtin's classification) for an abnormal site may be displayed as a diagnosis result.

Note that, a diagnosis result may be a result generated using a learned model (diagnosis result generating engine, or a learned model for generating diagnosis results) obtained by learning using diagnosis results for medical images as training data. Further, the learned model may be a model obtained by learning using training data including a medical image and a diagnosis result for the medical image, or training data including a medical image and a diagnosis result for a medical image of a different kind from the relevant medical image or the like. Further, a configuration may be adopted so as to display a diagnosis result obtained using a high quality image generated by a learned model for improving image quality.

In addition, input data included in the training data may be a high quality image generated by a learned model for improving image quality, or may be a set composed of a low quality image and a high quality image. Further, the training data may be, for example, data obtained by labeling input data for which information including at least one kind of information among the diagnosis, a kind or state (extent) of a lesion (abnormal site), the position of a lesion in the image, the position of a lesion relative to a region of interest, the findings (interpretation findings or the like), grounds for the diagnosis (affirmative medical support information or the like), and grounds for negating the diagnosis (negative medical support information) is adopted as correct answer data (of supervised learning). Note that, a configuration may be adopted so that a diagnosis result obtained by a learned model for diagnosis result generation is displayed in response to an instruction from the examiner.

Further, an object recognition result (object detection result) or a segmentation result with respect to a site of interest, an artifact, an abnormal site or the like as described above may be displayed on a report screen in the various embodiments and modifications described above. At such time, for example, a rectangular frame or the like may be superimposed around an object on the image and displayed. Further, for example, a color or the like may be superimposed on an object on the image and displayed. Note that, an object recognition result or a segmentation result may be a result generated using a learned model obtained by learning using training data in which information that indicates object recognition or segmentation is labeled on a medical image as correct answer data. Note that, the aforementioned analysis result generation or diagnosis result generation may be realized by utilizing the aforementioned object recognition result or segmentation result. For example, processing for generating an analysis result or for generating a diagnosis result may be performed with respect to a site of interest obtained by object recognition processing or segmentation processing.

The learned model described above may be a learned model obtained by learning using training data including input data in which a plurality of medical images of different kinds that are images of a predetermined site of a subject are taken as a set. At such time, for example, input data in which a motion contrast front image of the fundus and an intensity front image (or intensity tomographic image) are taken as a set is conceivable as input data included in the training data. Further, for example, input data in which a tomographic image (B-scan image) of the fundus and a color fundus image (or fluorescence fundus image) are taken as a set is conceivable as input data included in the training data. In addition, the plurality of medical images of different kinds may be of any kind as long as the medical images were obtained by different modalities, different optical systems, or different principles or the like.

Further, the learned model described above may be a learned model obtained by learning using training data including input data in which a plurality of medical images of different sites of a subject are taken as a set. At such time, for example, input data in which a tomographic image (B-scan image) of the fundus and a tomographic image (B-scan image) of the anterior ocular segment are taken as a set is conceivable as input data included in the training data. Further, for example, input data in which a three-dimensional OCT image (three-dimensional tomographic image) of the macula of the fundus and a tomographic image obtained by circular scanning (or raster scanning) of the optic nerve head of the fundus are taken as a set is also conceivable as input data included in the training data.

Note that, the input data included in the training data may be a plurality of medical images of different sites of the subject and of different kinds. At such time, for example, input data in which a tomographic image of the anterior ocular segment and a color fundus image are taken as a set is conceivable as input data included in the training data. Further, the learned model described above may be a learned model obtained by learning using training data including input data in which a plurality of medical images of different imaging angles of view that are images of a predetermined site of the subject are taken as a set. Further, input data included in the training data may be data obtained by joining together a plurality of medical images obtained by time-dividing a predetermined site into multiple regions, such as in the case of a panorama image. At such time, by using a wide-angle image such as a panorama image as training data, the result of each processing can be enhanced since there is a possibility that a feature value of the image can be acquired with good accuracy for reasons such as the fact that the amount of information is greater than in the case of a narrow-angle image. Further, input data included in the training data may be input data in which a plurality of medical images obtained at different dates and times of a predetermined site of the subject are taken as a set.

Further, a display screen on which at least one result among an analysis result, a diagnosis result, an object recognition result and a segmentation result described above is to be displayed is not limited to the report screen. Such a display screen may be, for example, at least one display screen among an imaging confirmation screen, a display screen for follow-up observation, and a preview screen for performing various kinds of adjustments before imaging (a display screen on which various kinds of live moving images are displayed) and the like. For example, by causing the aforementioned at least one result obtained using a learned model described above to be displayed on the imaging confirmation screen, the examiner can check an accurate result even immediately after imaging. Further, changing the display between a low quality image and a high quality image described above may be, for example, changing the display between an analysis result for a low quality image and an analysis result for a high quality image.

The various learned models described above can be obtained by machine learning using training data. For example, deep learning which is composed of a multi-level neural network is one kind of machine learning. Further, for example, a convolutional neural network (CNN) can be used for at least a part of a multi-level neural network. In addition, technology pertaining to auto-encoders may be used for at least a part of a multi-level neural network. Furthermore, technology pertaining to back-propagation (error back-propagation method) may be used for learning. However, the machine learning is not limited to deep learning, and any model may be used as long as the model is capable of, by itself, extracting (representing) a feature value of training data such as an image by learning.

Furthermore, the image quality improving engine (learned model for improving image quality) may be a learned model obtained by incremental learning using training data including at least one high quality image generated by an image quality improving engine. At such time, a configuration may be adopted that enables a selection as to whether or not a high quality image is to be used as training data for incremental learning to be made by an instruction from the examiner.

(Modification 7)

A configuration may be adopted so that, on a preview screen in the various embodiments and modifications described above, a learned model described above is used for every at least one frame of a live moving image. At such time, a configuration may be adopted so that, in a case where a plurality of live moving images of different sites or different kinds are displayed on the preview screen, learned models that correspond to the respective live moving images are used. By this means, for example, since the processing time can be shortened even for a live moving image, the examiner can obtain highly accuracy information prior to the start of imaging. Therefore, for example, since failures of re-imaging and the like can be reduced, the accuracy and efficiency of diagnosis can be improved. Note that, the plurality of live moving images may include for example, a moving image of the anterior ocular segment for alignment in the XYZ-directions, and a front moving image of the fundus for focus adjustment or OCT focus adjustment of a fundus observation optical system. Further, the plurality of live moving images may also include, for example, a tomographic moving image of the fundus for coherence gate adjustment in OCT (adjustment of the optical path length difference between the measurement optical path length and the reference optical path length) and the like.

Furthermore, a moving image to which a learned model described above can be applied is not limited to a live moving image, and for example the moving image may be a moving image stored (saved) in a storage unit. At such time, for example, a moving image obtained by performing alignment with respect to every at least one frame of a tomographic moving image of the fundus stored (saved) in a storage unit may be displayed on the display screen. For example, in a case where it is desired to suitably observe the vitreous body, first, a reference frame based on conditions such as that the vitreous body is present as much as possible in the frame may be selected. At such time, each frame is a tomographic image (B-scan image) in the X-Z direction. Subsequently, a moving image in which other frames have been aligned in the X-Z direction with respect to the selected reference frame may be displayed on the display screen. At such time, for example, a configuration may be adopted so as to cause high quality images (high image quality frames) sequentially generated by the learned model for improving image quality for every at least one frame of the moving image to be consecutively displayed.

Note that, as methods for performing alignment among frames described above, the same method may be applied with respect to the method for performing alignment in the X-direction and the method for performing alignment in the Z-direction (depth direction), or the methods that are applied may all be different. In addition, alignment in the same direction may be performed a plurality of times by different methods. For example, a rough alignment may be performed, and thereafter a fine alignment may be performed. Further, the methods for alignment include, for example, (rough Z-direction) alignment using a retinal layer boundary obtained by subjecting a tomographic image (B-scan image) to segmentation processing, (fine X-direction or Z-direction) alignment using correlation information (similarity) between a plurality of regions obtained by dividing a tomographic image and a reference image, (X-direction) alignment using a one-dimensional projection image generated for each tomographic image (B scan image), and (X-direction) alignment using a two-dimensional front image. Further, a configuration may be adopted so as to perform fine alignment in sub-pixel units after rough alignment was performed in pixel units.

In this case there is a possibility that, during various kinds of adjustment, the imaging target such as the retina of the eye to be examined could not yet be successfully imaged. Thus, since there is a large difference between the medical image input to the learned model and the medical image used as training data, there is a possibility that a high quality image was not accurately obtained. Therefore, a configuration may be adopted so that when an evaluation value such as a value obtained when the image quality of a tomographic image (B scan is evaluated exceeds a threshold value, display of a high-quality moving image (consecutive display of high image quality frames) is automatically started. Further, a configuration may be adopted so that when an evaluation value such as a value obtained when the image quality of a tomographic image (B scan) is evaluated exceeds a threshold value, the image quality improving button is changed to a state (active state) in which the button can be selected by the examiner.

Further, a configuration may be adopted in which different learned models for improving image quality are prepared for each imaging mode for which scanning patterns or the like are different, and a learned model for improving image quality that corresponds to a selected imaging mode is selected. Further, one learned model for improving image quality obtained by learning using training data including various medical images obtained in different imaging modes may be used.

(Modification 8)

In the various embodiments and modifications described above, in a case where a learned model is undergoing incremental learning, there is a possibility that it will be difficult to output (infer/predict) using the learned model which is undergoing incremental learning itself. Therefore, input of a medical image to a learned model which is undergoing incremental learning may be prohibited. Further, a learned model that is the same as a learned model which is undergoing incremental learning may be prepared as another auxiliary learned model. At such time, a configuration may be adopted so that input of a medical image to the auxiliary learned model can be executed which incremental learning is being performed. Subsequently, after the incremental learning is completed, the learned model which underwent the additional learning is evaluated, and if there is no problem, it suffices to switch from the auxiliary learned model to the learned model which underwent the additional learning. Further, a configuration may be adopted so that the auxiliary learned model is used if there is a problem.

Further, a configuration may be adopted so that learned models obtained by learning for respective imaged sites can be selectively utilized. Specifically, a plurality of learned models can be prepared that include a first learned model obtained using training data including a first imaged site (lung, eye to be examined, or the like), and a second learned model obtained using training data including a second imaged site that is different from the first imaged site. Further, the controlling unit 200 may have a selecting unit for selecting any one of this plurality of learned models. At such time, the controlling unit 200 may have a control unit for executing incremental learning with respect to a selected learned model. The control unit, in response to an instruction from the examiner, can retrieve data in which an imaged site corresponding to a selected learned model and an image obtained by imaging the relevant imaged site form a pair, and execute learning in which the retrieved and obtained data is adopted as training data as incremental learning with respect to the selected learned model. Note that, an imaged site corresponding to a selected learned model may be a site obtained based on header information of data, or a site that is manually input by the examiner. Further, retrieval of data may be performed, for example, through a network from a server or the like of an external facility such as a hospital or a laboratory. By this means, incremental learning can be efficiently performed for each imaged site by using an image obtained by imaging an imaged site that corresponds to the learned model.

Note that, the selecting unit and the control unit may be constituted by a software module that is executed by a processor such as a CPU or an MPU of the controlling unit 200. Further, the selecting unit and the control unit may be constituted by a circuit that serves a specific function such as an ASIC or by an independent apparatus or the like.

Further, when obtaining training data for incremental learning through a network from a server or the like of an external facility such as a hospital or a laboratory, it is desired to reduce a decrease in reliability due to falsification or system trouble during incremental learning or the like. Therefore, the correctness of the training data for incremental learning may be detected by confirming the consistency by a digital signature or hashing. By this means the training data for incremental learning can be protected. At such time, in a case where the correctness of the training data for incremental learning could not be detected as the result of confirming the consistency by a digital signature or hashing, a warning to that fact is given and incremental learning is not performed using the training data in question. Note that, the server may be any form of server, such as a cloud server, a FOG server, or an edge server, regardless of the installation location thereof.

(Modification 9)

In the various embodiments and modifications described above, an instruction from the examiner may be a voice instruction or the like in addition to a manual instruction (for example, an instruction using a user interface or the like). At such time, for example, a machine learning model including a speech recognition model (a speech recognition engine or a learned model for speech recognition) obtained by machine learning may be used. In addition, a manual instruction may be an instruction by character input using a keyboard, a touch panel, or the like. At such time, for example, a machine learning model including a character recognition model (a character recognition engine, a learned model for character recognition) obtained by machine learning may be used. Further, an instruction from the examiner may be an instruction by a gesture or the like. At such time, a machine learning model including a gesture recognition model (a gesture recognition engine, a learned model for gesture recognition) obtained by machine learning may be used.

Further, an instruction from the examiner may be a result of detection of the line of sight of the examiner on a monitor or the like. The line-of-sight detection result may be, for example, a pupil detection result using a moving image of the examiner obtained by imaging from around the monitor. At such time, the pupil detection from the moving image may use an object recognition engine as described above. Further, an instruction from the examiner may be an instruction by brain waves, or a faint electric signal flowing through the body or the like.

In such a case, for example, the training data may be training data in which character data or voice data (waveform data) or the like indicating an instruction to display a result obtained by processing of various learned models as described above is adopted as input data, and an execution command for actually causing a result obtained by processing of various learned models to be actually displayed on a display unit is adopted as correct answer data. Further, the training data may be training data in which, for example, character data or voice data or the like indicating an instruction to display a high quality image obtained with a learned model for improving image quality is adopted as input data, and an execution command for displaying a high quality image and an execution command for changing the button 3420 to an active state are adopted as correct answer data. Naturally, any kind of training data may be used as long as, for example, the instruction content indicated by the character data or voice data or the like and the execution command content correspond with each other. Further, voice data may be converted to character data using an acoustic model or a language model or the like. Further, processing that reduces noise data superimposed on voice data may be performed using waveform data obtained with a plurality of microphones. Further, a configuration may be adopted so that a selection between an instruction issued by characters or voice or the like and an instruction input using a mouse or a touch panel or the like can be made according to an instruction from the examiner. In addition, a configuration may be adopted so that a selection can be made to turn instruction by characters or voice or the like on or off according to an instruction from the examiner.

In this case, the machine learning includes deep learning as described above, and for example, a recurrent neural network (RNN) can be used as at least a part of the multi-layer neural network. Here, as an example of the machine learning model according to the present modification, an RNN that is a neural network that handles time-series information will be described with reference to FIG.

Figure 16A:
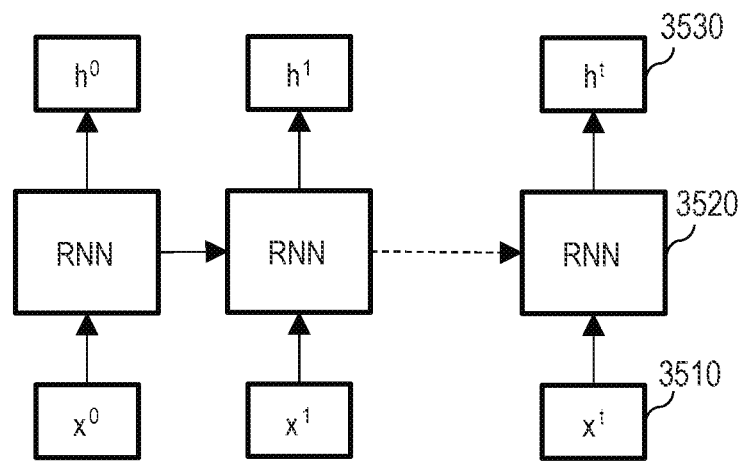
FIG. 16A is a view illustrating an example of a configuration of a neural network used as a machine learning model according to Modification 9.
Figure 16B:
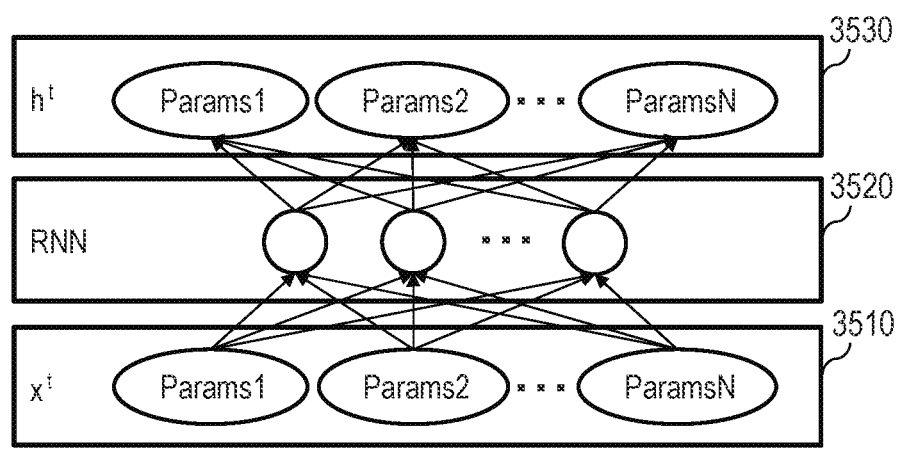
FIG. 16B is a view illustrating an example of the configuration of the neural network used as the machine learning model according to Modification 9.

16A and FIG. 16B. Further, a long short-term memory (hereinafter referred to as an "LSTM"), which is a kind of RNN, will be described with reference to FIG. 17A and FIG. 17B.

FIG. 16A illustrates a structure of an RNN that is a machine learning model. An RNN 3520 has a loop structure in the network, and inputs data $x^t$ 3510 at time t, and outputs data $h^t$ 3530. Since the RNN 3520 has a loop function in the network, the state at the current time can be taken over to the next state, and hence time-series information can be handled. FIG. 16B illustrates an example of the input/output of parameter vectors at time t. The data $x^t$ 3510 includes N pieces of data (Para ms1 to Para msN). Further, the data $h^t$ 3530 output by the RNN 3520 includes N pieces of data (Para ms1 to Para msN) corresponding to the input data.

Figure 17A:
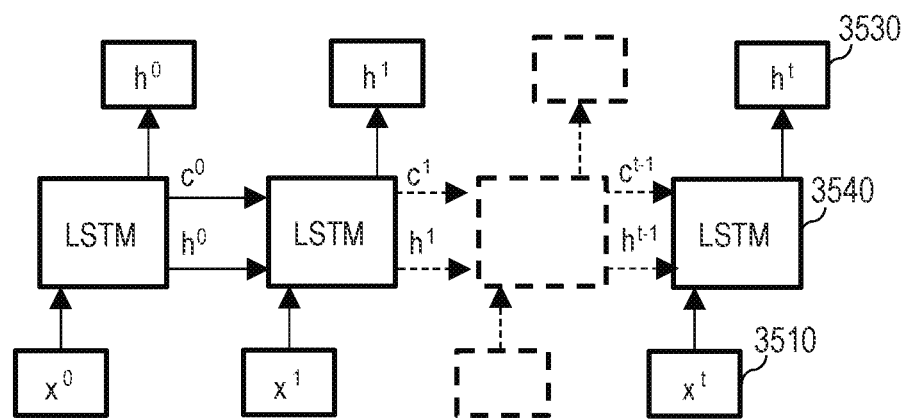
FIG. 17A is a view illustrating an example of the configuration of the neural network used as the machine learning model according to Modification 9.

However, since the RNN cannot handle long-time information during back propagation, the LSTM may be used. The LSTM can learn long-term information by providing a forget gate, an input gate, and an output gate. FIG. 17A illustrates a structure of the LSTM. In an LSTM 3540, information that the network takes over at the next time t is an internal state of the network called a cell and output data $h^{t-1}$. Note that lowercase letters (c, h, x) in the figure represent vectors.

Figure 17B:
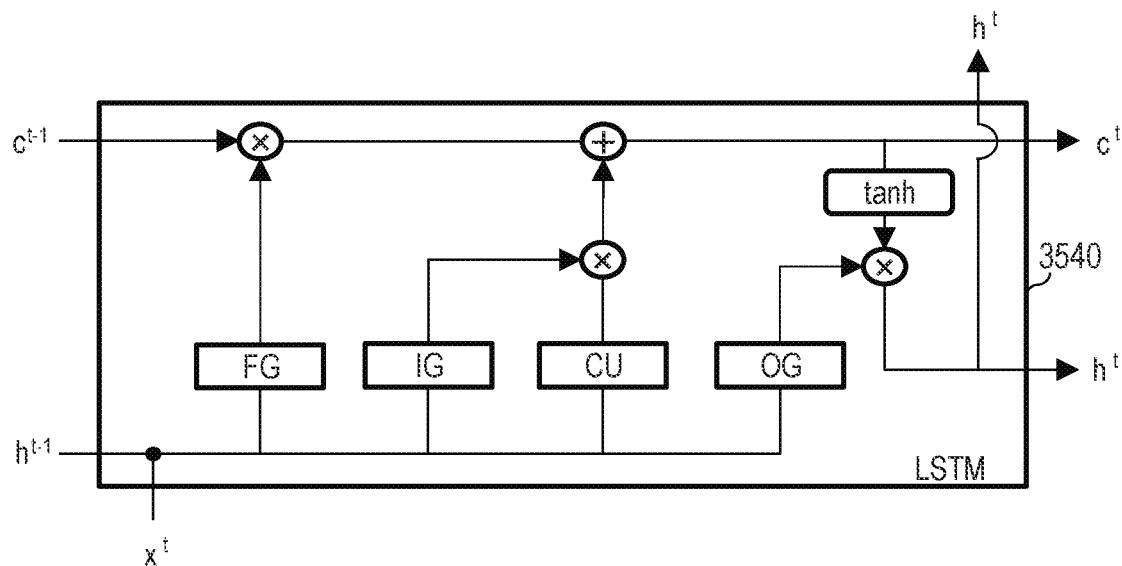
FIG. 17B is a view illustrating an example of the configuration of the neural network used as the machine learning model according to Modification 9.

Next, the LSTM 3540 is illustrated in detail in FIG. 17B. In FIG. 17B, reference characters FG denote a forget gate network, reference characters IG denote an input gate network, and reference characters OG denote an output gate network, and each of these networks is a sigmoid layer. Therefore, a vector in which each element has a value from 0 to 1 is output. The forget gate network FG determines how much past information is held, and the input gate network IG determines which value is to be updated. Reference characters CU denote a cell update candidate network, which is an activation function tanh layer. This creates a vector of new candidate values to be added to the cell. The output gate network OG selects an element of a cell candidate and selects how much information is to be transmitted at the next time.

Note that, the LSTM model described above is a basic form, and the present invention is not limited to the network illustrated here. The coupling between networks may be changed. A QRNN (quasi-recurrent neural network) may be used instead of an LSTM. In addition, the machine learning model is not limited to a neural network, and Boosting or Support Vector Machine or the like may be used. Further, in a case where an instruction from the examiner is input by characters or voice or the like, a technique relating to natural language processing (for example, Sequence to Sequence) may be applied. Further, a dialogue engine (a dialogue model or a learned model for dialogue) that responds to the examiner with an output such as text or voice may be applied.

(Modification 10)

In the various embodiments and modifications described above, a high quality image or the like may be stored in the storage in accordance with an instruction from the examiner. At such time, after the instruction from the examiner to save the high quality image or the like, when registering a file name, a file name that includes information (for example, characters) indicating that the image is an image generated by processing using a learned model for improving image quality (image quality improving processing) at any part of the file name (for example, the first part or the last part) may be displayed as a recommended file name in a state in which the file name can be edited according to an instruction from the examiner.

Further, when causing the display unit to display a high quality image on various display screens such as the report screen, a display indicating that the image being displayed is a high quality image generated by processing using a learned model for improving image quality may be displayed together with the high quality image. In this case, since a user can easily discern by the relevant display that the displayed high quality image is not the actual image obtained by imaging, misdiagnosis can be reduced and the diagnosis efficiency can be improved. Note that, a display indicating that a high quality image was generated by processing that used a learned model for improving image quality may be of any form as long as it is a display which makes it possible to distinguish between the input image and the high quality image generated by the relevant processing. Further, with regard to processing using various learned models as described above also, and not just processing using a learned model for improving image quality, a display indicating that the result which is being displayed was generated by processing using the relevant kind of learned model may be displayed together with the relevant result.

At such time, the display screen such as a report screen may be stored in the storage unit in accordance with an instruction from the examiner. For example, a report screen may be stored in the storage unit as a single image in which high quality images or the like and a display indicating that these images are high quality images generated by processing using a learned model for improving image quality are displayed side by side.

Further, with respect to the display indicating that a high quality image was generated by processing that used a learned model for improving image quality, a display indicating what kind of training data the learned model for improving image quality used when performing learning may be displayed on the display unit. The display in question may include a description of the kinds of input data and correct answer data of the training data, or any display relating to the input data and the correct answer data such as an imaged site included in the correct answer data. Note that, with regard to processing using various learned models as described above also, and not just processing using a learned model for improving image quality, a display indicating what kind of training data the relevant kind of learned model used when performing learning may be displayed on the display unit.

Further, a configuration may be adopted so that information (for example, characters) indicating that the image was generated by processing using a learned model for improving image quality may be displayed or stored in a state in which the information is superimposed on the high quality image or the like. At such time, a place at which the information is superimposed on the image may be any place as long as the place is in a region (for example, at an edge of the image) which does not overlap with a region in which the site of interest or the like that is the imaging target is displayed. Further, a non-overlapping region may be determined, and the information may be superimposed in the determined region.

Further, a configuration may be adopted so that in a case where, as an initial display screen of the report screen, the default setting is set so that the button 3420 enters an active state (image quality improving processing is set to "on"), a report image corresponding to the report screen that includes a high quality image or the like is transmitted to a server in accordance with an instruction from the examiner. Further, a configuration may be adopted so that in a case where the default setting is set so that the button 3420 enters an active state, when an examination ends (for example, in a case where the imaging confirmation screen or the preview screen is changed to the report screen in accordance with an instruction from the examiner), a report image corresponding to the report screen that includes a high quality image or the like is (automatically) transmitted to a server. At such time, a configuration may be adopted so that a report image generated based on various kinds of settings of the default settings (for example, settings relating to at least one of the depth range for generating an en-face image on the initial display screen of the report screen, whether or not to superimpose an analysis map, whether or not the image is a high quality image, and whether or not to show a display screen for follow-up observation and the like) is transmitted to a server.

(Modification 11)

in the various embodiments and modifications described above, among the various learned models described above, an image obtained with a first kind of learned model (for example, a high quality image, an image showing an analysis result such as an analysis map, an image showing an object recognition result, or an image showing a segmentation result) may be input to a second kind of learned model that is different from the first kind. At such time, a configuration may be adopted so that a result (for example, an analysis result, a diagnosis result, an object recognition result or a segmentation result) is generated by processing of the second kind of learned model.

Further, among the various learned models described above, an image to be input to a second kind of learned model that is different from a first kind of learned model may be generated from an image input to the first kind of learned model by using a result (for example, an analysis result, a diagnosis result, an object recognition result or a segmentation result) obtained by processing of the first kind of learned model. At such time, there is a high possibility that the generated image is an image that is suitable as an image for processing by the second kind of learned model. Therefore, the accuracy of an image (for example, a high quality image, an image showing an analysis result such as an analysis map, an image showing an object recognition result or an image showing a segmentation result) obtained when the generated image is input to the second kind of learned model can be enhanced.

Further, retrieval of similar images utilizing an external database that is stored in a server or the like may be performed using an analysis result or a diagnosis result or the like, as a search key, obtained by processing of the learned models as described above. Note that, in a case where a plurality of images stored in the database are already being managed in a state in which respective feature values of the plurality of images have been attached as supplementary information by machine learning or the like, a similar image search engine (a similar image searching model, or a learned model for similar image searching) that utilizes an image itself as a search key may be used.

(Modification 12)

Note that, processing for generating motion contrast data in the aforementioned embodiments and modifications is not limited to a configuration in which the processing is performed based on intensity values of a tomographic image. The various kinds of processing described above may be applied with respect to an interference signal obtained with the OCT imaging unit 100, a signal obtained by subjecting an interference signal to Fourier transformation, a signal obtained by subjecting the relevant signal to any processing, and tomographic data including a tomographic image or the like based on these signals. In these cases also, similar effects as the effects of the aforementioned configurations can be obtained.

Although a fiber optical system that uses a coupler as a splitting unit is used, a spatial optical system that uses a collimator and a beam splitter may also be used. Further, the configuration of the OCT imaging unit 100 is not limited to the above described configuration, and some of the components included in the OCT imaging unit 100 may be provided as separate components from the OCT imaging unit 100.

Further, although in the foregoing embodiments and modifications the configuration of a Mach-Zehnder interferometer is used as the configuration of the interference optical system of the OCT imaging unit 100, the configuration of the interference optical system is not limited thereto. For example, the interference optical system of the OCT apparatus 1 may have the configuration of a Michelson interferometer.

In addition, while a spectral domain OCT (SD-OCT) apparatus which uses the SLD as a light source is described as the OCT apparatus in the foregoing embodiments and modifications, the configuration of the OCT apparatus according to the present invention is not limited thereto. For example, the present invention can also be applied to a swept source OCT (SS-OCT) apparatus which uses a wavelength-swept light source capable of sweeping a wavelength of emitted light, or any other kind of OCT apparatus. Further, the present invention can also be applied to a Line-OCT apparatus that uses line light.

Further, in the foregoing embodiments and modifications, the obtaining unit 210 obtains an interference signal that was obtained by the OCT imaging unit 100, or a three-dimensional tomographic image generated by the image processing unit 220. However, a configuration with which the obtaining unit 210 obtains these signals or images is not limited to the above described configuration. For example, the obtaining unit 210 may obtain these signals from a server or an imaging apparatus connected to the controlling unit through a LAN, a WAN, the Internet, or the like.

Note that, a learned model can be provided in the controlling unit 200, 900 or 1400 that is an image processing apparatus. A learned model can be constituted, for example, by a software module that is executed by a processor such as a CPU Further, a learned model may be provided in a separate server that is connected to the controlling unit 200, 900 or 1400. In this case, the controlling unit 200, 900 or 1400 can perform image quality improving processing using the learned model by connecting to the server that includes the learned model through any network such as the Internet.

(Modification 13)

Further, images to be processed by an image processing apparatus or image processing method according to the various embodiments and modifications described above include medical images obtained using an arbitrary modality (imaging apparatus or imaging method). The medical images to be processed can include a medical image obtained by any imaging apparatus or the like, and images created by an image processing apparatus or an image processing method in accordance with the embodiments and modifications described above.

In addition, a medical image to be processed is an image of a predetermined site of a subject (examinee), and the image of the predetermined site includes at least one part of the predetermined site of the subject. The medical image may also include another site of the subject. The medical image may be a still image or a moving image, and may be a black and white image or a color image. In addition, the medical image may be an image representing the structure (form) of the predetermined site or may be an image representing a function of the predetermined site. Images that represent a function include, for example, an image representing hemodynamics (blood flow volume, blood flow velocity or the like) such as an OCTA image, a Doppler OCT image, an fMRI image, and an ultrasound Doppler image. Note that, the predetermined site of the subject may be determined according to the imaging target, and such predetermined sites include organs such as the human eye (eye to be examined), brain, lung, intestine, heart, pancreas, kidney, and liver, and any sites such as the head, chest, leas and arms.

Further, the medical image may be a tomographic image of the subject, or may be a front image. Examples of a front image include a front image of the fundus, a front image of the anterior ocular segment, a fundus image obtained by fluorescence imaging, and an en-face image generated using at least a partial range of data in the depth direction of the imaging target with respect to data obtained by OCT (three-dimensional OCT data). An en-face image may be an OCTA en-face image (motion contrast front image) generated using at least a partial range of data in the depth direction of the imaging target with respect to three-dimensional OCTA data (three-dimensional motion contrast data). Further, three-dimensional OCT data or three-dimensional motion contrast data is an example of three-dimensional medical image data.

In addition, the term "imaging apparatus" refers to an apparatus for performing imaging to obtain an image to be used for diagnosis. Examples of an imaging apparatus include an apparatus that obtains an image of a predetermined site of the subject by irradiating the predetermined site with light, radioactive rays such as X-rays, electromagnetic waves, or ultrasonic waves or the like, and an apparatus that obtains an image of a predetermined site by detecting radioactive rays emitted from the subject. More specifically, examples of an imaging apparatus according to the various embodiments and modifications described above include at least an X-ray imaging apparatus, a CT apparatus, an MRI apparatus, a PET apparatus, a SPECT apparatus, an SLO apparatus, an OCT apparatus, an OCTA apparatus, a fundus camera and an endoscope.

Note that, a time domain OCT (TD-OCT) apparatus and a Fourier domain OCT (FD-OCT) apparatus may be included as examples of an OCT apparatus. Further, examples of a Fourier domain OCT apparatus may include a spectral domain OCT (SD-OCT) apparatus and a swept source OCT (SS-OCT) apparatus. Further, an adaptive optics SLO (AO-SLO) apparatus and an adaptive optics OCT (AO-OCT) apparatus that use an adaptive optics system and the like may be included as examples of an SLO apparatus or an OCT apparatus, respectively. Furthermore, a polarization-sensitive SLO (PS-SLO) apparatus and a polarization-sensitive OCT (PS-OCT) apparatus and the like for visualizing information relating to polarization phase differences or depolarization may be included as examples of an SLO apparatus or an OCT apparatus, respectively.

According to one of the embodiments and modifications of the present invention that are described above, an image can be generated that is more suitable for image diagnosis than an image generated according to the conventional technology.

OTHER EXAMPLES

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Examples of the processor or circuit may include a central processing unit (CPU), a micro processing unit (MPU), a graphics processing unit (GPU), an application specific integrated circuit (ASIC), or a field programmable gateway (FPGA). Further, examples of the processor or circuit may include a digital signal processor (DSP), a data flow processor (DFP) or a neural processing unit (NPU).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus, comprising at least one of (a) one or more processors connected to one or more memories storing a program including instructions executed by the one or more processors or (b) circuitry configured to function as:
    an obtaining unit configured to obtain a plurality of first images of an eye to be examined obtained at different dates and times;
    a generating unit configured to generate each of a plurality of second images with at least one of lower noise and higher contrast than each of the obtained plurality of first images using each of the obtained plurality of first images as input data of a learned model; and
    a display controlling unit configured to control a display unit to change displays from one of (c) displays of the obtained plurality of first images and (d) displays of the generated plurality of second images to the other at a plurality of display areas in which a plurality of display areas of (c) and a plurality of display areas of (d) correspond to each other, according to a first instruction from an operator,
    wherein the display controlling unit controls the display unit to change the displays from the displays of the generated plurality of second images corresponding to a first depth range in the eye to be examined to the displays of the generated plurality of second images corresponding to a second depth range that is at least partially different from the first depth range by changing a depth range from the first depth range to the second depth range according to a second instruction from an operator.

2. The image processing apparatus according to claim 1, the at least one of (a) or (b) further configured to function as:
a selecting unit configured to select a learned model to be used by the generating unit from a plurality of learned models, based on an imaging condition of the obtained first image.

3. The image processing apparatus according to claim 1, wherein the first image is a front image generated based on information in a range in a depth direction of an eye to be examined,
the at least one of (a) or (b) further configured to function as a selecting unit configured to selects a learned model corresponding to a range of a depth direction for generating the obtained first image as a learned model to be used by the generating unit from a plurality of learned models.

4. The image processing apparatus according to claim 1, wherein:
the plurality of first images includes a plurality of front images generated based on information in a range in a depth direction of an eye to be examined; and
the display controlling unit simultaneously changes, upon the range in the depth direction for generating the front image being changed, the displays of the obtained plurality of first images or the displays of the generated plurality of second images to displays of a plurality of first images which are generated based on information in the changed range in the depth direction or displays of a plurality of second images that are generated from the generated plurality of first images.

5. The image processing apparatus according to claim 1, wherein:
according to an instruction from an operator, the display controlling unit controls the display unit to simultaneously change displays from one of displays of a plurality of first analysis results corresponding to the obtained plurality of first images and displays of a plurality of second analysis results corresponding to the generated plurality of second images to the other.

6. The image processing apparatus according to claim 1, the at least one of (a) or (b) further configured to function as a comparing unit configured to compare the obtained first image and the generated second image, and generate a color map image that is colored based on a comparison result,
wherein the display controlling unit causes the color map image to be displayed in a superimposed manner on the obtained first image or the generate second image on the display unit.

7. The image processing apparatus according to claim 1, wherein:
the learned model is a learned model which has been obtained using training data including a fourth image with at least one of lower noise and higher contrast than a third image of an eye to be examined; and
a fourth image included in the training data of the learned model includes one of an image obtained by performing one kind of processing among averaging processing, maximum a posteriori processing, smoothing filter processing and gradation conversion processing, an image imaged with an imaging apparatus with higher performance than an imaging apparatus used for imaging of a third image of an eye to be examined, and an image obtained by an imaging process including a number of processes that is greater than a number of processes of an imaging process for imaging a third image of an eye to be examined.

8. An image processing method, comprising:
obtaining a plurality of first images of an eye to be examined obtained at different dates and times;
generating each of a plurality of second images with at least one of lower noise and higher contrast than each of the obtained plurality of first images using each of the obtained plurality of first images as input data of a learned model; and
controlling a display unit to change displays from one of (c) displays of the obtained plurality of first images and (d) displays of the generated plurality of second images to the other at a plurality of display areas in which a plurality of display areas of (c) and a plurality of display areas of (d) correspond to each other, according to a first instruction from an operator,
wherein the controlling includes controlling the display unit to change the displays from the displays of the generated plurality of second images corresponding to a first depth range in the eye to be examined to the displays of the generated plurality of second images corresponding to a second depth range that is at least partially different from the first depth range by changing a depth range from the first depth range to the second depth range according to a second instruction from an operator.

9. A non-transitory computer readable medium having stored thereon a program for causing, when executed by a processor, the processor to execute respective steps of the image processing method according to claim 8.

10. The image processing apparatus according to claim 1, wherein:
the learned model is a learned model which has been obtained using training data including a fourth image with at least one of lower noise and higher contrast than a third image of an eye to be examined.

11. The image processing apparatus according to claim 1, wherein:
the plurality of first image includes a plurality of front images generated based on information in different ranges in a depth direction in an eye to be examined, which are obtained at the same dates and times.

* * * * *